US012663504B2

(12) United States Patent
Long et al.

(10) Patent No.: US 12,663,504 B2
(45) Date of Patent: Jun. 23, 2026

(54) LASER RADAR INTEGRATED DEVICE AND VEHICLE PROVIDED WITH SAME

(71) Applicant: WUHAN LOTUS CARS CO., LTD, Wuhan (CN)

(72) Inventors: Xiange Long, Wuhan (CN); Qunxiong Wei, Wuhan (CN); Shichao He, Wuhan (CN); Haibo Ji, Wuhan (CN); Yanhong Wang, Wuhan (CN); Zhenfeng Xiong, Wuhan (CN); Pengwu Wang, Wuhan (CN); Yucheng Zhu, Wuhan (CN)

(73) Assignee: WUHAN LOTUS CARS CO., LTD, Hubei (CN)

(*) Notice: Subject to any disclaimer, the term of this patent is extended or adjusted under 35 U.S.C. 154(b) by 278 days.

(21) Appl. No.: 18/388,842

(22) Filed: Nov. 12, 2023

(65) Prior Publication Data

US 2024/0077575 A1 Mar. 7, 2024

Related U.S. Application Data

(63) Continuation of application No. PCT/CN2022/092297, filed on May 11, 2022.

(30) Foreign Application Priority Data

May 12, 2021 (CN) .......................... 202121029038.3
Oct. 9, 2021 (CN) .......................... 202111175698.7
(Continued)

(51) Int. Cl.
 *G01S 7/02* (2006.01)
 *G01S 13/86* (2006.01)
 *G01S 13/931* (2020.01)

(52) U.S. Cl.
 CPC ............ *G01S 7/027* (2021.05); *G01S 13/865* (2013.01); *G01S 13/931* (2013.01)

(58) Field of Classification Search
 CPC ...... G01S 7/027; G01S 7/4813; G01S 13/865; G01S 13/931; G01S 2013/93274; G01S 2013/93275; G01S 17/931
 See application file for complete search history.

(56) References Cited

U.S. PATENT DOCUMENTS

| | | | | | |
|---|---|---|---|---|---|
| 4,514,068 | A | * | 4/1985 | Urquhart | ................ F16M 11/08 |
| | | | | | 352/132 |
| 10,070,023 | B2 | * | 9/2018 | Moenig | .................. H04N 23/57 |

(Continued)

FOREIGN PATENT DOCUMENTS

| | | |
|---|---|---|
| CN | 101842264 A | 9/2010 |
| CN | 104736394 A | 6/2015 |

(Continued)

OTHER PUBLICATIONS

Chinese Intellectual Property Office (ISR/CN), "International Search Report for PCT/CN2022/092297", China, Aug. 18, 2022.
(Continued)

*Primary Examiner* — Peter M Bythrow
(74) *Attorney, Agent, or Firm* — troutman pepper locke; Tim Tingkang Xia, Esq.

(57) ABSTRACT

A laser radar integrated device, including a cover plate (Q10, M10, N20, P60), a fixed support (Q20), a lifting structure (Q30), a pop-up structure (Q50), a laser radar (Q60), and a controller (Q70, D50). The cover plate (Q10, M10, N20, P60) is located on a vehicle fender (Q80, M200, N200, P200) and matches with the size of an opening in the fender (Q80, M200, N200, P200); the fixed support (Q20), the lifting structure (Q30), the pop-up structure (Q50), the laser radar (Q60) and the controller (Q70, D50) are located inside the fender (Q80, M200, N200, P200); the lifting structure (Q30) is disposed on the fixed support (Q20) and connected to the cover plate (Q10, M10, N20, P60); the laser radar (Q60) is disposed on the pop-up structure (Q50) which is
(Continued)

disposed on the fixed support (Q20). Also disclosed is a vehicle provided with a laser radar integrated device.

18 Claims, 17 Drawing Sheets

(30)        Foreign Application Priority Data

| | | |
|---|---|---|
| Oct. 9, 2021 | (CN) | 202111175705.3 |
| Oct. 9, 2021 | (CN) | 202111175708.7 |
| Oct. 9, 2021 | (CN) | 202111177107.X |
| Oct. 9, 2021 | (CN) | 202111177109.9 |
| Oct. 13, 2021 | (CN) | 202111192613.6 |
| Oct. 13, 2021 | (CN) | 202122481286.8 |

(56)        References Cited

U.S. PATENT DOCUMENTS

| | | | | |
|---|---|---|---|---|
| 10,208,525 | B2 * | 2/2019 | Schuetz | E05F 15/73 |
| 10,682,965 | B2 * | 6/2020 | Oba | G01S 15/931 |
| 10,797,384 | B2 * | 10/2020 | Singh | H01Q 1/3283 |
| 10,852,395 | B1 * | 12/2020 | Wilson | G01S 7/4813 |
| 10,889,252 | B2 * | 1/2021 | Hatakeyama | B60R 19/02 |
| 11,148,613 | B2 * | 10/2021 | Nickel | G01D 11/245 |
| 11,173,839 | B2 * | 11/2021 | Wilson | B60R 11/04 |
| 11,608,010 | B1 * | 3/2023 | Harris | B60R 11/04 |
| 2009/0040037 | A1 * | 2/2009 | Schraga | G01S 7/4017 |
| | | | | 340/459 |
| 2010/0040361 | A1 * | 2/2010 | Schuetz | H04N 23/90 |
| | | | | 396/428 |
| 2016/0219204 | A1 * | 7/2016 | Nickel | B60R 11/04 |
| 2016/0245011 | A1 * | 8/2016 | Schuetz | H04N 5/77 |
| 2017/0129393 | A1 * | 5/2017 | Johnson | F21S 41/43 |
| 2017/0222311 | A1 * | 8/2017 | Hess | G01S 13/931 |
| 2017/0244902 | A1 * | 8/2017 | DiMenichi | H04N 23/50 |
| 2018/0039273 | A1 * | 2/2018 | Delp | B60R 11/00 |
| 2019/0118728 | A1 * | 4/2019 | Oba | B60R 1/0605 |
| 2019/0267705 | A1 * | 8/2019 | Klar | H01Q 1/42 |
| 2020/0238910 | A1 * | 7/2020 | Wilson | H04N 7/18 |
| 2020/0300964 | A1 * | 9/2020 | Kasaba | G01S 17/931 |
| 2021/0031700 | A1 * | 2/2021 | Kitagawa | B62D 25/08 |
| 2021/0063532 | A1 * | 3/2021 | Slobodyanyuk | G01S 13/87 |
| 2021/0086712 | A1 * | 3/2021 | Keysberg | G01S 7/4813 |
| 2021/0148737 | A1 * | 5/2021 | Yamaji | G01S 7/4813 |
| 2021/0349180 | A1 * | 11/2021 | Han | H04N 23/57 |
| 2022/0169314 | A1 * | 6/2022 | Huelsen | B62D 29/043 |
| 2023/0062751 | A1 * | 3/2023 | Katsurada | B60Q 1/0023 |

FOREIGN PATENT DOCUMENTS

| | | | |
|---|---|---|---|
| CN | 207636769 | U | 7/2018 |
| CN | 110586578 | A | 12/2019 |
| CN | 111071165 | A | 4/2020 |
| CN | 111389778 | A | 7/2020 |
| CN | 111409739 | A | 7/2020 |
| CN | 211567820 | U | 9/2020 |
| CN | 211718512 | U | 10/2020 |
| CN | 111891045 | A | 11/2020 |
| CN | 112477768 | A | 3/2021 |
| CN | 112711258 | A | 4/2021 |
| CN | 213903784 | U | 8/2021 |
| CN | 113682238 | A | 11/2021 |
| CN | 113917404 | A | 1/2022 |
| CN | 113917438 | A | 1/2022 |
| CN | 113917468 | A | 1/2022 |
| CN | 113917489 | A | 1/2022 |
| CN | 113928230 | A | 1/2022 |
| CN | 215706204 | U | 2/2022 |
| CN | 216052167 | U | 3/2022 |
| KR | 20180060110 | A | 6/2018 |

OTHER PUBLICATIONS

SIPO, "1st CN Office Action and Search Report for CN Application No. 202111175708.7", China.

SIPO, "CN Office Action and Search Report for CN Application No. 202111175705.3", China.

SIPO, "CN Office Action and Search Report for CN Application No. 202111177107.X", China.

SIPO, "CN Office Action and Search Report for CN Application No. 202111175698.7", China.

SIPO, "CN Office Action and Search Report for CN Application No. 202111177109.9", China.

* cited by examiner

M100

N442

N441

N44

N443

N41

N444

P201

P200

P100

P300

C100

C100

LASER RADAR INTEGRATED DEVICE AND VEHICLE PROVIDED WITH SAME

CROSS-REFERENCE TO RELATED PATENT APPLICATION

This application is a continuation application of PCT Patent Application No. PCT/CN2022/092297 filed May 11, 2022, which claims priority to and the benefit of Chinese Application No. 202111177109.9 filed Oct. 9, 2021, Chinese Application No. 202111177107.X filed Oct. 9, 2021, Chinese Application No. 202111175705.3 filed Oct. 9, 2021, Chinese Application No. 202122481286.8 filed Oct. 13, 2021, Chinese Application No. 202111192613.6 filed Oct. 13, 2021, Chinese Application No. 202111175698.7 filed Oct. 9, 2021, Chinese Application No. 202111175708.7 filed Oct. 9, 2021, and Chinese Application No. 202121029038.3 filed May 12, 2021, which are incorporated herein in their entireties by reference.

FIELD OF THE INVENTION

The present invention relates to the field of vehicle technologies, and particularly to a laser radar integrated device and a vehicle provided with same.

BACKGROUND OF THE INVENTION

A laser radar is an important sensor for realizing high-level intelligent driving and automatic driving, and defects of a camera and a millimeter wave radar can be overcome by using the laser radar: compared with the camera, a more true 3D environment can be constructed, the laser radar does not depend on ambient light, and compared with the millimeter wave radar, the laser radar has a higher resolution and a more accurate object recognition capability.

Currently, the laser radar is limited by a volume of a laser device and an area of a laser emission (receiving) mirror surface, an overall size of the laser radar is larger than overall sizes of the camera and the millimeter wave radar, an arrangement of the laser radar on a finished automobile is difficult, and the laser radar is prone to be limited by the arrangement and styling.

The laser radar generally has a horizontal visual field angle (a vision field range for point cloud information sensing) of about 120 degrees, and in order to sense a 360-degree horizontal vision field, 4-5 laser radars are usually required to perform vision field splicing in the prior art. As the name suggests, corner laser radars are generally mounted at corners or side edges or lower positions of two sides of a front bumper and a rear bumper of a vehicle body, and are responsible for sensing lateral vision fields which serve as a supplement of vision fields of a forward laser radar and a backward laser radar, so as to achieve the 360-degree horizontal vision field of the laser radars.

BRIEF DESCRIPTION OF THE INVENTION

In view of the above problems, the present invention is made to provide a laser radar integrated device and a vehicle having the same which overcome or at least partially solve the above problems.

An object of the present invention is to provide a support, which solves the problems that a device for fixing a laser radar on a vehicle body in the prior art has a simple appearance, has a great influence on styling, cannot reflect a technological sense of an automatic driving use scenario, and may bring a laser radar heat dissipation problem;

the present invention further aims at solving the technical problem that a horizontal visual field angle of the laser radar is generally about 120 degrees, the arrangement solution of 4-5 laser radars may waste the visual field angle, and such an arrangement is not favorable for a cost of a finished automobile since the laser radars are expensive, and a cost of a single laser radar is usually more than 5,000 RMB;

the present invention further aims at solving the technical problem that the laser radars are arranged at lower positions of corners of front and rear bumpers, the positions are regions with a high collision probability, and the arrangement is not favorable for maintenance economy of the finished automobile due to the characteristic of the high cost of the laser radar;

the present invention further aims at solving the technical problem that a fixed solution is adopted for the laser radar, a lens is exposed, the lens of the laser radar is mostly made of PC or glass which has a smaller hardness than sand and stone, and a scratching risk of the lens is high in a using process.

In an embodiment, an object of the present invention is to provide a vehicle including the above laser radar integrated device.

In an embodiment, there is provided a laser radar integrated device, at least including a cover plate, a fixed support, a lifting structure, a pop-up structure, a laser radar, and a controller, wherein the cover plate is located on a vehicle body fender and has a size matched with a size of an opening in the fender; the fixed support, the lifting structure, the pop-up structure, the laser radar and the controller are all located inside the fender; the lifting structure is disposed on the fixed support and connected to the cover plate, and can drive the cover plate to move up and down under control of the controller; the laser radar is disposed on the pop-up structure; and the pop-up structure is disposed on the fixed support, and can move outwards relative to the fixed support under control of the controller, so as to push the laser radar out of the fender.

In an implementation, the fixed support includes first fixed plates and a connecting plate, the first fixed plates are located on two sides of the connecting plate, and the first fixed plates are fixed to a front vehicle body longitudinal beam on an inner side of the fender through bolts.

In an implementation, the lifting structure at least includes a first motor, a transmission shaft, a first gear, a lead screw, a lifting rod, a sliding rail, a fixed block and a second fixed plate, and the sliding rail is inclined inwards from a position below the fixed support to a position above the fixed support, and has a bottom end fixed to the connecting plate and a top end provided with the fixed block; the lead screw penetrates through the fixed block to be provided in parallel with the sliding rail, and has a lower end provided with the lifting rod, the first gear is fixed at a top of the lead screw, and the lifting rod is connected with the cover plate; and the first motor and the controller are fixed on the second fixed plate, the transmission shaft is connected to the first motor, and the transmission shaft is meshed with the first gear.

In an implementation, the fixed block is in threaded connection with the lead screw, the lifting rod includes a first lifting rod and a second lifting rod, the lower end of the lead screw is sleeved with and in threaded connection with the first lifting rod, and the second lifting rod has one end connected with the first lifting rod and the other end fixedly connected with a bottom end of one side of the cover plate.

In an implementation, the laser radar integrated device further includes a cleaning structure, the cleaning structure and the laser radar being provided on the pop-up structure together.

In an implementation, the cleaning structure at least includes a fixed frame, an electromagnetic valve, a nozzle, a connecting portion and a water inlet, one end of the electromagnetic valve is connected with the connecting portion, the other end of the electromagnetic valve is connected with the water inlet, and a pipeline connected with the water inlet is connected with a finished automobile water path; the nozzle is connected with the connecting portion and has an extending-retracting function.

In an implementation, the pop-up structure at least includes a second motor, a speed reducer, a second gear, a movable plate, a moving rod and a sealing strip, an output shaft of the second motor is connected with the speed reducer, the speed reducer is connected with the second gear, the movable plate is placed on the connecting plate of the fixed support and forms a set angle relative to an outer edge of the connecting plate, the laser radar and the cleaning structure are mounted on the movable plate, and the sealing strip is mounted on a front side of the movable plate.

In an implementation, the movable plate is further provided with a hole, the moving rod includes a first moving rod and a second moving rod, the second moving rod is connected with the first moving rod at a set angle, a convex column is further provided below one end of the first moving rod and clamped to the hole, the second moving rod has an arc shape, teeth are provided on one section of an outer side of the second moving rod, and the teeth are meshed with the second gear.

In an implementation, a mirror surface is fixed on one side of the laser radar, the other side of the laser radar is provided with a second wiring harness, and the second wiring harness is connected with an automatic driving domain controller or an advanced assistant driving domain controller.

In an implementation, the present invention further provides a vehicle including the laser radar integrated device according to any one of the above implementations.

For the laser radar integrated device according to the present invention, a hidden solution is adopted, and the laser radar can be retracted into the vehicle body in a standby state, thus avoiding influencing the appearance and styling, and reducing the risk of being scratched by sand and stone; when an automatic driving function is activated, the laser radar is rotated out to a working position, thus increasing the technological sense; the hidden cleaning structure is integrated and can keep the mirror surface of the laser radar clean all the time in an automatic driving process, thus greatly reducing an artificial cleaning frequency and improving user experience; the number of the corner laser radars is reduced from 4-5 to 2, thus achieving a cost advantage; the laser radar integrated device is arranged at a front fender, thus reducing a collision risk compared with an arrangement at the front and rear bumpers.

In an implementation, there is further provided a radar integrated system provided at a fender of a vehicle, the fender being provided with a first opening, the radar integrated system including: a cover plate;

a cover plate driving mechanism connected with the cover plate and configured to controllably move to drive the cover plate to open or close the first opening;

a radar device located near the first opening;

a radar driving mechanism connected with the radar device and configured to controllably move to drive the radar device to extend out of or retract into the fender from the first opening; and a control device connected with the cover plate driving mechanism, the radar driving mechanism and the radar device, the control device being configured to, when receiving an instruction of starting the radar device, control the cover plate driving mechanism to drive the cover plate to open the first opening, and control the radar driving mechanism to drive the radar device to be turned over to extend out of the fender from the first opening, and when receiving an instruction of stopping the radar device, control the cover plate driving mechanism to drive the cover plate to close the first opening, and control the radar driving mechanism to drive the radar device to be turned over to retract into the fender from the first opening.

In an implementation, a preset angle is formed between a vertical line of a plane where a motion track of the radar device is located and a vertical line of a plane where a motion track of the cover plate is located, and the preset angle is 90±15 degrees.

In an implementation, the control device is configured to control the radar driving mechanism to drive the radar device to be turned over to extend out of the fender from the first opening after it has controlled the cover plate driving mechanism to drive the cover plate to open the first opening for a first preset time, and control the radar driving mechanism to drive the radar device to be turned over to retract into the fender from the first opening after it has controlled the cover plate driving mechanism to drive the cover plate to close the first opening for a second preset time.

In an implementation, the radar integrated system further includes a cleaning device provided on an inner side of the fender, located on a side of the radar device apart from the fender, and configured to be controllably started to clean the radar device.

In an implementation, the cleaning device includes:

a water storage box configured to store cleaning liquid required for cleaning the radar device;

a duct having one end communicated with the water storage box and located in the cleaning liquid, a water pump being provided on the duct; and a nozzle connected with the other end of the duct, an electromagnetic valve being provided at the nozzle, and the water pump and the electromagnetic valve being controllably started to spray the cleaning liquid in the water storage box to the radar device.

In an implementation, the control device is further connected with both the water pump and the electromagnetic valve, and the control device is configured to control the electromagnetic valve and the water pump to be started after receiving an instruction that the radar device is required to be cleaned, such that the cleaning liquid is sprayed from the nozzle, and to control the water pump and the electromagnetic valve to be stopped after a third preset time.

In an implementation, a flow sensor is further provided at the nozzle, and the flow sensor is connected with the control device and configured to detect a flow rate of the liquid flowing through the nozzle;

the radar integrated system further includes an alarm device connected with the control device;

the control device is configured to control the alarm device to give an alarm when the flow sensor monitors that the flow rate of the liquid flowing through the nozzle is less than a preset flow rate.

In an implementation, the radar integrated system further includes a housing provided with a second opening, wherein the housing is provided on the inner side of the fender, and the second opening is provided corresponding to the first opening;

the cover plate, the cover plate driving mechanism, the radar device, the radar driving mechanism, the control device and the cleaning device are all provided in the housing.

In an implementation, the radar integrated system further includes a fixed frame, wherein the cover plate driving mechanism and the radar driving mechanism are provided at the fixed frame, and the fixed frame is provided inside the housing.

In an implementation, the present invention further provides a vehicle including the radar integrated system according to any one of the above implementations.

The radar integrated system according to the present invention may include the cover plate, the cover plate driving mechanism, the radar device, the radar driving mechanism and the control device. The control device controls the cover plate driving mechanism to drive the cover plate to open and close the first opening, and further controls the radar driving mechanism to drive a radar to extend out of and retract into the fender and meanwhile drive the radar device to be turned over, such that the radar integrated system according to the present invention has an adjustable detection angle, extends out of the fender when used, and retracts into the fender when not used, and the radar device is protected by the cover plate, thus avoiding that the radar device is rubbed and bumped by the outside or contaminated by outside contaminants to influence use, and prolonging a service life of the radar device.

In the present invention, a structural design of the cover plate driving mechanism and the radar driving mechanism and control of the movement time of the driving mechanisms avoid interference between the cover plate and the radar device in movement, such that the radar integrated system is more intelligent while guaranteeing functions.

In an implementation, the present invention further provides a radar integrated system with a cover plate capable of being turned over for opening and closing, the radar integrated system being provided at a fender of a vehicle, the fender being provided with a first opening, and the radar integrated system including:

a fixed frame fixedly connected with the fender, a sliding groove being formed in the fixed frame;

the cover plate configured to controllably open and close the first opening;

a cover plate driving mechanism including a driving motor and a moving mechanism, one end of the moving mechanism being connected with the driving motor and driven by the driving motor, the other end of the moving mechanism being connected with the cover plate, and the moving mechanism being driven by the driving motor to drive the cover plate to move along the sliding groove and meanwhile drive the cover plate to rotate to open and close the first opening; and a radar assembly configured to controllably extend out of the fender from the first opening when the first opening is opened.

In an implementation, the moving mechanism includes:

a crank having one end fixedly connected with an output shaft of the driving motor to rotate with the output shaft; and a first connecting rod having one end rotatably connected with an end of the crank apart from the output shaft and the other end connected with the cover plate, a rotating axis of the first connecting rod being parallel to a rotating axis of the crank; a side edge of the first connecting rod being provided with a cam, the cam being clamped at the sliding groove, and when the crank rotates with the output shaft, the cam moving along the sliding groove, such that the cover plate moves along a track parallel to the sliding groove.

In an implementation, two sliding grooves are provided, the two sliding grooves are oppositely arranged in a mirrored mode, and the first connecting rod is located between the two sliding grooves;

two cams are provided and arranged on two opposite side surfaces of the first connecting rod facing the two sliding grooves, and each cam is provided corresponding to one sliding groove.

In an implementation, the moving mechanism further includes a second connecting rod, one end of the second connecting rod is rotatably connected with the fixed frame, and the other end of the second connecting rod is rotatably connected with the cover plate;

a second axis of the second connecting rod is parallel to a first axis of the first connecting rod, such that the cover plate rotates under an action of the second connecting rod when the cover plate moves along the sliding groove under driving of the driving motor; the second axis is an axis of a rotating shaft at a rotatable connection position of the second connecting rod and the cover plate, and the first axis is an axis of a rotating shaft at a rotatable connection position of the first connecting rod and the cover plate.

In an implementation, the radar integrated system further includes a hinge rod which is fixedly connected with the cover plate and extends along a direction parallel to the axis of the rotating shaft of the second connecting rod, and one end portion of the second connecting rod is rotatably connected with one end of the hinge rod, such that the cover plate and the hinge rod rotate together relative to the second connecting rod;

the hinge rod is located on one side of the cover plate, such that when the cover plate closes the first opening, the hinge rod is located inside the fender.

in an implementation, two second connecting rods are provided, the two second connecting rods are parallel to each other and are located at two ends of the hinge rod respectively, and the two second connecting rods and the hinge rod form a U-shaped structure.

In an implementation, the radar assembly includes:

a radar device; and a radar driving mechanism provided at the fixed frame, the radar driving mechanism being connected with the radar device and configured to move controllably to drive the radar device to extend out of or retract into the fender from the first opening.

In an implementation, the radar integrated system further includes a housing provided with a second opening, wherein the housing is provided on the inner side of the fender, and the second opening is provided corresponding to the first opening; the fixed frame is located in the housing.

In an implementation, the radar integrated system further includes a cleaning device provided in the housing, located on a side of the radar device apart from the fender, and configured to be controllably started to clean the radar device.

In an implementation, the present invention further provides a vehicle including the above-mentioned radar integrated system with a cover plate capable of being turned over for opening and closing.

In the radar integrated system with a cover plate capable of being turned over for opening and closing according to the present invention, due to a design of the cover plate and the cover plate driving mechanism, when the radar assembly is required to extend out of the fender from the first opening, the cover plate driving mechanism drives the cover plate to close the first opening, and normal use of the radar assembly is not influenced. When the radar assembly retracts into the fender from the first opening, the cover plate driving mechanism drives the cover plate to close the first opening, so as to avoid that the radar assembly is directly exposed for a long time and thus contaminated by external dust or sewage, thus influencing use; meanwhile, the cover plate also prevents the radar assembly from being rubbed and bumped by the outside, thus preventing the radar assembly from being damaged, and prolonging a service life of the radar assembly.

The cover plate driving mechanism in the present invention only includes the cover plate driving motor and the moving mechanism, the moving mechanism only includes the crank and the first connecting rod, the cover plate driving mechanism has a simple structure, a single driving force and a simple moving process, and the purpose that the cover plate opens and closes the first opening to protect the radar assembly can be achieved.

In an implementation, the present invention further provides a radar integrated system with a radar capable of being turned over, the radar integrated system being provided at a fender of a vehicle, the fender being provided with a first opening, and the radar integrated system including:

a radar device located near the first opening; and a radar driving mechanism including a driving motor and a double-connecting-rod mechanism, the double-connecting-rod mechanism having one end rotatably connected with the radar device and the other end rotatably connected with the fender, and when the driving motor controllably drives the double-connecting-rod mechanism to move, the double-connecting-rod mechanism driving the radar device to be turned over relative to the fender to extend out of or retract into the fender from the first opening.

In an implementation, the double-connecting-rod mechanism includes:

a first rotating shaft rotatably connected with the fender, the first rotating shaft being connected with the driving motor to rotate under driving of the driving motor;

a first swing arm having one end fixedly connected with the first rotating shaft to rotate around an axis of the first rotating shaft when the first rotating shaft rotates, and the other end rotatably connected with the radar device;

a second rotating shaft rotatably connected with the fender and provided in parallel with the first rotating shaft; and a second swing arm having one end rotatably connected with the radar device and the other end fixedly connected with the second rotating shaft;

when the first rotating shaft is driven by the driving motor to rotate, the radar device is driven to be turned over under a combined action of the first swing arm, the second swing arm and the second rotating shaft.

In an implementation, two first swing arms are provided, the two first swing arms are arranged in parallel, and the two first swing arms are rotatably connected with an upper side surface and a lower side surface of the radar device respectively.

In an implementation, two second swing arms are provided, the two second swing arms are arranged in parallel, and the two second swing arms are rotatably connected with the upper side surface and the lower side surface of the radar device respectively.

In an implementation, a length of the second swing arm is different from a length of the first swing arm, or a distance between the first rotating shaft and the second rotating shaft is different from a target distance, and the target distance is a distance between a hinged point of the first swing arm and the radar mechanism and a hinged point of the second swing arm and the radar mechanism.

In an implementation, the length of the first swing arm is greater than the length of the second swing arm, and the distance between the first rotating shaft and the second rotating shaft is smaller than the target distance.

In an implementation, the radar integrated system further includes:

a housing provided with a second opening, wherein the housing is fixedly provided on an inner side of the fender, and the second opening is provided corresponding to the first opening; and a fixed frame provided in the housing, the first rotating shaft and the second rotating shaft being both rotatably connected with the fixed frame.

In an implementation, the radar integrated system further includes:

a cover plate;

a cover plate driving mechanism located in the housing, the cover plate driving mechanism being connected with the cover plate and configured to controllably move to drive the cover plate to open or close the first opening.

In an implementation, the radar integrated system further includes a cleaning device provided in the housing, located on a side of the radar device apart from the fender, and configured to be controllably started to clean the radar device.

In an implementation, the present invention further provides a vehicle including the above-mentioned radar integrated system with a radar capable of being turned over.

The radar integrated system with a radar capable of being turned over according to the present invention can include the radar device and the radar driving mechanism, the radar driving mechanism can include the radar driving motor and the double-connecting-rod mechanism, the double-connecting-rod mechanism is driven to move by the radar driving motor, and the double-connecting-rod mechanism drives the radar device to move, such that the radar device can rotate relative to the fender to extend out of or retract into the fender from the first opening. In the present invention, the radar device is driven to move and rotate by the radar driving motor, and when the radar device is located at the first opening, the radar device may be driven to rotate by the radar driving motor, thereby increasing a detection angle of the radar device. Furthermore, the radar driving motor can also allow the radar device to extend out of the fender from the first opening when required and retract into the fender from the first opening when not required, thereby avoiding that the radar device is exposed outside the fender all the time and dirtied to affect use and sensitivity.

The radar driving mechanism in the present invention includes the double-connecting-rod mechanism, and the double-connecting-rod mechanism only includes the first rotating shaft, the first swing arm, the second rotating shaft and the second swing arm, and has a simple structure and a clear movement process. Furthermore, the double-connecting-rod mechanism is connected with the radar device, and the double-connecting-rod mechanism can drive the radar device to move under driving of the radar driving motor, thus realizing simultaneous movement and rotation of the radar device, ensuring that the detection angle of the radar device meets requirements, and meanwhile achieving the purpose of hiding the radar device.

In an implementation, the present invention provides a turnover radar integrated box provided at a preset opening of a target vehicle body, including:

a tray connected with the target vehicle body and located below the preset opening;

a protective shell matched with the preset opening, a side of the protective shell facing the inside of a vehicle being fixedly connected with a radar;

a mounting fixed base fixed at the tray and pivotally connected with the protective shell or the radar; and a rotating mechanism mounted at the mounting fixed base and configured to controllably drive the radar and the protective shell to rotate relative to the mounting fixed base, so as to expose the radar outside the vehicle or hide the radar in the vehicle.

In an implementation, the turnover radar integrated box further includes an outer sealing assembly including an outer sealing support and an outer sealing strip, the outer sealing support is hermetically connected with the target vehicle body and used for mounting the outer sealing strip, and the outer sealing strip is located between the protective shell and the target vehicle body and used for sealing a gap between the protective shell and the sealing support.

In an implementation, the outer sealing support includes an annular main body and connecting legs connected with the main body, the main body is hermetically connected with the target vehicle body and fixedly connected with the outer sealing strip, one end of the outer sealing strip abuts against the protective shell, and a bottom end of each connecting leg is connected with the tray.

In an implementation, the main body includes a flat plate portion provided in parallel with the target vehicle body, and the flat plate portion is bonded at the target vehicle body.

In an implementation, the main body further includes a vertical clamping portion configured to clamp the outer sealing strip, the vertical clamping portion is connected to a side of the flat plate portion close to the protective shell and is perpendicular to the flat plate portion, a bent portion pointing to the flat plate portion is formed at the preset opening of the target vehicle body, the flat plate portion abuts against the bent portion, and a vertical portion is located between the bent portion and the protective shell.

In an implementation, the turnover radar integrated box further includes:

a flexible waterproof film provided between a bottom of the main body and an outer side of the protective shell and configured to form a sealed space between the main body and the protective shell.

In an implementation, the protective shell is further provided with a water flowing pipe, the water flowing pipe is communicated with the sealed space and located at a lowest position of the sealed space, and the water flowing pipe is communicated with a drain pipe of the vehicle through a hose.

In an implementation, the target vehicle body is a roof of the vehicle, and the tray is connected to a roof crossrail assembly of the vehicle by fasteners.

In an implementation, the present invention further provides a vehicle including the turnover radar integrated box according to any one of the above descriptions.

The present invention provides the turnover radar integrated box which includes the protective shell for fixing the radar, the protective shell and the radar can be both turned over relative to the fixed mounting fixed base, and the protective shell is matched with the preset opening of the vehicle body, such that a state in which the protective shell and the vehicle body are of an integral appearance can be formed in the closed state, so as to improve attractiveness and an aerodynamic performance of the vehicle; dust is not prone to be accumulated, and the radar and the protective shell can be controlled to be turned out to an outer side of the vehicle body in use, thereby facilitating adjustment of an angle of the radar.

Further, the turnover radar integrated box according to the present invention further includes the outer sealing assembly, and the outer sealing assembly includes the outer sealing support and the outer sealing strip. The outer sealing support is hermetically connected with the target vehicle body and used for mounting the outer sealing strip. The outer sealing strip is located between the protective shell and the target vehicle body and used for sealing the gap between the protective shell and the sealing support. The arrangement of the outer sealing strip can achieve a sealing effect when the radar integrated box is in the closed state.

Further, in the present invention, a staggered structure formed by the bent portion of the target vehicle body and the vertical clamping portion of the outer sealing support can further achieve the sealing effect in cooperation with an annular adhesive tape between the outer sealing support and the target vehicle body.

Further, the waterproof film is provided between the protective shell and the outer sealing support, such that water can be effectively prevented from flowing into the vehicle, thereby achieving a perfect sealing effect.

Further, the arrangement of the water flowing pipe and the hose can ensure that water in the waterproof film can be discharged through a drainage system of the vehicle, such that water is prevented from being accumulated in the waterproof film. The water flowing pipe is fixedly provided on the protective shell and can thus move with the protective shell, and the water flowing pipe is communicated with the drain pipe of the vehicle by providing the hose, such that a moving condition of the water flowing pipe can be adapted.

In an implementation, the present invention further provides a cleaning device for a radar, including:

a housing having a liquid channel provided therein, one end of the liquid channel being connected with a water supply device;

a nozzle provided at an end of the liquid channel apart from the water supply device, at least part of the nozzle being located in the housing, and the nozzle being configured to spray water to a mirror surface of the radar;

an electromagnetic valve provided on the liquid channel and configured to open or close the liquid channel under control, so as to allow the cleaning device to be in a water spraying state or an off state; and a water pump connected with the liquid channel and configured to be started cooperatively when the electromagnetic valve is opened, so as to drive liquid of the liquid channel to flow and allow the liquid to be sprayed out of the nozzle.

In an implementation, the nozzle is configured to be extendable and retractable so that the nozzle is located in the housing when the cleaning device is in the off state, and at least part of the nozzle extends out of the housing when the cleaning device is in the water spraying state.

In an implementation, a sliding block is provided on the nozzle, and a sliding groove fitted with the sliding block is formed in the housing, such that the sliding block slides along the sliding groove when a water pressure in the liquid channel reaches a preset water pressure, thereby causing the nozzle to extend out of the housing.

In an implementation, a plurality of water spraying holes are formed in a side of the nozzle apart from the liquid channel, such that the liquid flowing out of the liquid channel is sprayed out from the plurality of water spraying holes.

In an implementation, the cleaning device further includes:
    a control unit fixedly connected with the housing, connected with the electromagnetic valve and configured to control the electromagnetic valve to be opened or closed.

In an implementation, the cleaning device further includes a detection unit connected with the control unit and configured to detect whether an outer surface of the radar is dirty.

In an implementation, the nozzle has a square cross section.

In an implementation, the present invention further provides a radar system for a vehicle, the radar system is provided with a radar and the cleaning device.

In an implementation, two cleaning devices are provided, and the two cleaning devices are arranged on two sides of the radar respectively.

In an implementation, the present invention further provides a vehicle having the above radar system mounted thereon.

In the present invention, the cleaning device for a radar includes the housing, the nozzle, the electromagnetic valve and the water pump, the liquid channel is provided in the housing, and one end of the liquid channel is connected with the water supply device. The nozzle is provided at the end of the liquid channel apart from the water supply device, at least part of the nozzle is located in the housing, and the nozzle is configured to spray water to the mirror surface of the radar. The electromagnetic valve is provided on the liquid channel and configured to open or close the liquid channel under control, so as to allow the cleaning device to be in the water spraying state or the off state. The water pump is connected with the liquid channel and configured to be started cooperatively when the electromagnetic valve is opened, so as to drive the liquid of the liquid channel to flow and allow the liquid to be sprayed out of the nozzle. Therefore, in the present invention, when the radar is required to be cleaned, only the electromagnetic valve and the water pump are required to be started simultaneously, automatic cleaning of the radar can be realized, and manual cleaning after parking is not required, thus guaranteeing continuity of automatic driving.

In the present invention, the plurality of water spraying holes are formed in the side of the nozzle apart from the liquid channel, such that the liquid flowing out of the liquid channel is sprayed out from the plurality of water spraying holes. The present invention is equivalent to splitting a water spraying hole with a larger cross sectional area into a plurality of water spraying holes with smaller cross sectional areas, which reduces the cross sectional area, thereby increasing a water spraying pressure and further improving a cleaning performance.

In an implementation, the present invention further provides a vehicle-borne radar system, including:
    a radar assembly including a radar;

a driving mechanism connected with the radar assembly and configured to controllably drive the radar assembly to rotate or lift relative to a vehicle body, so as to expose an emission end of the radar outside a vehicle or hide the radar assembly in the vehicle; and
    a cleaning unit configured to controllably extend out when the emission end is exposed out of the vehicle and spray cleaning liquid to a mirror surface of the emission end.

In an implementation, the radar assembly further includes a radar box, a first opening and a second opening are formed in a side of the radar box where the emission end of the radar is, the first opening is configured to expose the emission end, and the second opening is configured to provide an extending/retracting passage for the cleaning unit.

In an implementation, the cleaning unit includes:
    a washing kettle configured to store the cleaning liquid;
    a washing pump connected with the washing kettle through a first water pipe and configured to pump out the cleaning liquid in the washing kettle;
    an extendable and retractable cleaning actuator provided in the radar box and including a nozzle connected with the washing pump through a second water pipe, the nozzle being configured to spray the cleaning liquid to the mirror surface, and the second water pipe being provided with an electromagnetic valve configured to control opening or closing of the second water pipe; and
    a cover plate connected with the nozzle, matched with the second opening and configured to close the second opening when the cleaning actuator retracts into the inside of the radar box.

In an implementation, a first sealing strip is provided on a periphery of the cover plate and configured to seal the cover plate and the second opening.

In an implementation, the vehicle-borne radar system further includes an analog-to-digital converter as well as a central electronic module and an integrated box controller connected with the analog-to-digital converter, the analog-to-digital converter is further connected with the radar, the radar is configured to send an analog signal to the analog-to-digital converter when the mirror surface is detected to be dirty, the analog-to-digital converter processes the analog signal into a digital signal and then sends the digital signal to the central electronic module and the integrated box controller, the central electronic module is configured to generate a first control signal according to the digital signal and send the first control signal to the washing pump, so as to control the washing pump to work, and the integrated box controller is configured to generate a second control signal according to the digital signal and send the second control signal to the electromagnetic valve, so as to control the electromagnetic valve to be opened.

In an implementation, the integrated box controller is further connected with the driving mechanism and configured to control an action of the driving mechanism, and the analog-to-digital converter is further connected with an infotainment host of the vehicle through an in-vehicle gateway, such that when the infotainment host receives a signal for starting an intelligent driving function, the integrated box controller controls the driving mechanism to drive the radar assembly to act, so as to expose the emission end of the radar outside the vehicle.

In an implementation, the vehicle-borne radar system further includes a sealing structure including:
    a mounting support fixedly connected with the vehicle body; and a second sealing strip connected with the mounting support and located between the radar box and a third opening of the vehicle body, the radar box having a shape matched with a shape of the third opening and moving out of the vehicle through the third opening.

In an implementation, the sealing structure further includes:

a soft sealing film provided around the radar box, two ends of the sealing film being connected with a side wall of the radar box and a lower side of the mounting support respectively; and a water outlet penetrating through the sealing film, a side of the water outlet apart from the radar box being communicated with a drain pipe of the vehicle.

In an implementation, the vehicle-borne radar system further includes:

a fixed bottom plate having a bottom fixedly connected with the vehicle body and an edge provided with a plurality of connecting arms extending upwards, the connecting arms being connected with a bottom of the mounting support; and a fixed base provided at the fixed bottom plate and used for placing the cleaning unit and a driving source of the driving mechanism.

In an implementation, the present invention further provides a vehicle including the above vehicle-borne radar system.

The vehicle-borne radar system according to the present invention can realize the turnover or lifting of the radar assembly relative to the vehicle body, such that the radar can be controlled to extend out of the vehicle for detection work, or hidden in the vehicle, and dust is not prone to be accumulated on the radar. In addition, the vehicle-borne radar system further includes the cleaning unit, and the mirror surface of the radar can be cleaned, thus further guaranteeing cleanness of the radar, so as to guarantee accuracy of intelligent driving.

Further, the cleaning unit in the present invention includes the cover plate matched with the second opening; that is, the second opening of the radar box can be closed through the structure of the cleaning unit without additionally providing an opening-closing door, such that a structure is simple and a cost is low.

Further, in the present invention, automatic control of a working process of the cleaning unit is realized through communication among the radar, the analog-to-digital converter, the central electronic module and the integrated box controller. The infotainment host of the vehicle is in communication connection with the vehicle-borne radar system, thus realizing automatic control of the movement of the radar assembly.

Further, in the present invention, omnidirectional sealing protection of the vehicle-borne radar system can be realized by providing the first sealing strip, the second sealing strip and the sealing film.

In an implementation, the present invention further provides a hidden vehicle-borne radar mounting assembly provided at a mounting opening of a vehicle body, including:

a fixed assembly connected with the vehicle body and configured as a recess;

a radar enclosure provided in the recess and pivotally connected to the fixed assembly, an accommodating space for placing a radar being provided in the radar enclosure, a window for revealing the radar being provided on a side wall of the radar enclosure, and the radar enclosure being configured to form a closed state where the radar enclosure is hidden in the recess and an open state where the window of the radar enclosure is completely exposed out of the recess when the radar enclosure rotates relative to the fixed assembly; and a sealing assembly including a flexible sealing film, the sealing film being provided around the radar enclosure and having one side hermetically connected with a target vehicle body directly or indirectly and the other side hermetically connected with an outer side of the radar enclosure, so as to form a sealed water storage space between the target vehicle body and the radar enclosure, the target vehicle body being a vehicle body part on a peripheral side of the mounting opening, and a lowest position of the sealing film when the radar enclosure is in the closed state being communicated with a drain pipe of a vehicle, so as to drain liquid in the water storage space.

In an implementation, the sealing assembly further includes:

a sealing strip provided around the radar enclosure and between the target vehicle body and the radar enclosure.

In an implementation, the sealing assembly further includes:

a sealing support having one side connected with the target vehicle body and the other side configured to fix the sealing film.

In an implementation, the sealing support is bonded to a bottom of the target vehicle body by double-sided adhesive tape.

In an implementation, an annular flange extending out from an outer wall of the radar enclosure is provided at the outer wall of the radar enclosure, and two ends of the sealing film are connected with the sealing support and the annular flange respectively.

In an implementation, a height of a side of the outer wall of the radar enclosure provided with the window is larger than that of the opposite side, and the annular flange is provided at a bottom of the outer wall of the radar enclosure.

In an implementation, a drainage duct communicated with the water storage space and the drain pipe is formed in the radar enclosure, and the sealing film is provided with a channel through which the drainage duct passes.

In an implementation, the fixed assembly includes:

a fixed bottom plate; and a plurality of connecting supports, two ends of each connecting support being connected with the target vehicle body and a periphery of the fixed bottom plate respectively.

In an implementation, the fixed bottom plate includes:

a flat plate portion; and a plurality of connecting legs located at a periphery of the flat plate portion, each connecting leg extending towards the target vehicle body and being connected with the connecting support. In an implementation, the present invention further provides a vehicle including the above hidden vehicle-borne radar mounting assembly.

The present invention provides the hidden radar mounting assembly, the radar enclosure with the radar can be turned out of the vehicle when the radar is required to be used, so as to expose the emission end from the window of the radar enclosure, and the radar enclosure is restored to the position inside the vehicle when the radar is not required to be used, thus guaranteeing attractiveness of an appearance of the vehicle.

Further, the radar mounting assembly is further provided with the sealing assembly following the radar enclosure, such that the sealing assembly can adapt to the turnover radar enclosure, so as to achieve a real-time waterproof sealing effect. In addition, since the sealing film of the sealing assembly is communicated with the drain pipe of the vehicle, and the communicated position is the lowest position of the sealing film when the radar enclosure is in the closed state, accumulated water can be drained in the closed state, and the sealing film is prevented from being soaked in water for a long time.

Further, the sealing assembly further includes the sealing strip provided around the radar enclosure and between the target vehicle body and the radar enclosure. Due to the arrangement of the sealing strip, when the radar enclosure is in the closed state, the gap between the radar enclosure and the target vehicle body is sealed, a waterproof effect is achieved when the radar is not used, and rainwater or other liquid is prevented from entering the assembly.

It will be appreciated that the various implementations described above may be combined with one another, and the combined solutions also have corresponding beneficial effects. The foregoing description merely briefly describes the technical solutions of the present invention. To more clearly understand the technical means of the present invention and thus practice the present invention according to content of the specification, and to make the foregoing and other objects, features and advantages of the present invention more comprehensible, particular embodiments of the present invention are described below.

According to the following detailed description of specific embodiments of the present invention in conjunction with drawings, those skilled in the art will better understand the aforementioned and other objects, advantages and features of the present invention.

BRIEF DESCRIPTION OF THE DRAWINGS

Some specific embodiments of the present invention will be described below in detail in an exemplary rather than restrictive manner with reference to the drawings. Identical reference numerals in the drawings represent identical or similar components or parts. Those skilled in the art should understand that these drawings are not necessarily drawn to scale. In the drawings.

DETAILED DESCRIPTION

Figure 1A:
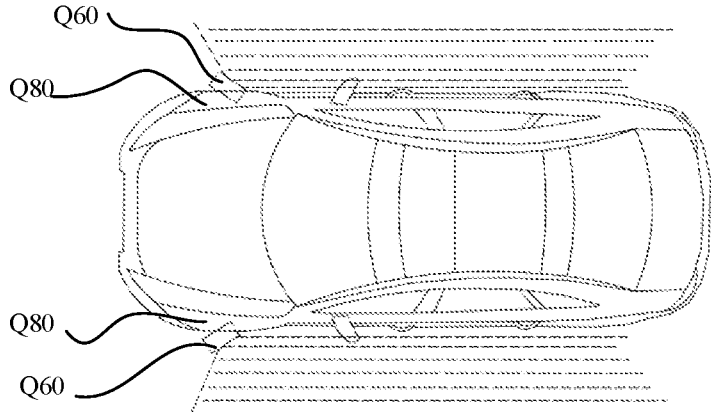
FIG. 1A is a schematic diagram of a mounting position of a laser radar integrated device according to the present invention on a vehicle body.

Exemplary embodiments of the present disclosure will be described in more detail below with reference to the accompanying drawings. While exemplary embodiments of the present disclosure are shown in the drawings, it should be understood that the present disclosure may be embodied in various forms and should not be limited by the embodiments set forth herein. Rather, these embodiments are provided such that this disclosure will be thoroughly understood, and will fully convey the scope of the disclosure to those skilled in the art.

Figure 1B:
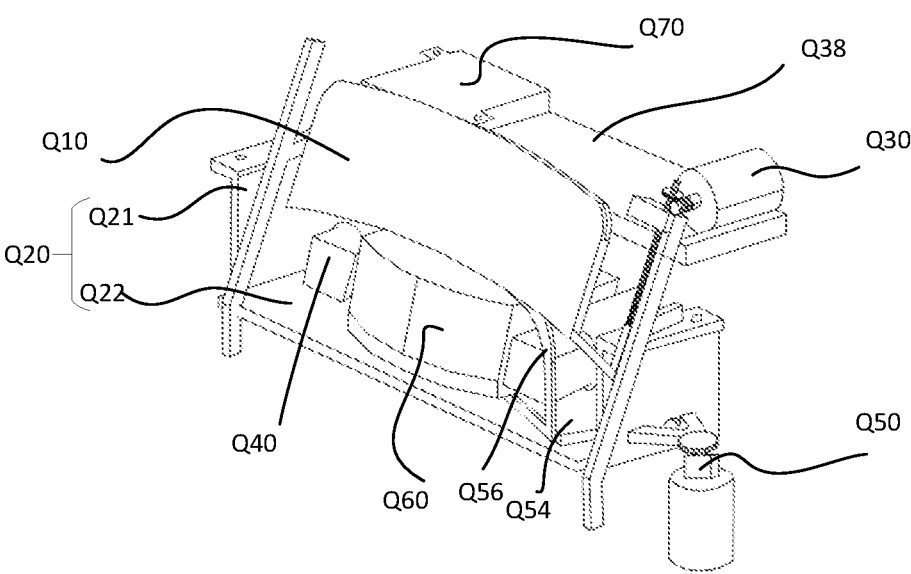
FIG. 1B is a schematic overall structure diagram of the laser radar integrated device according to the present invention.

As an embodiment of the present invention, referring to FIGS. 1A and 1B, the present invention provides a laser radar integrated device, at least including a cover plate Q10, a fixed support Q20, a lifting structure Q30, a cleaning structure Q40, a pop-up structure Q50, a laser radar Q60 and a controller Q70, wherein the cover plate Q10 is located on a vehicle body fender Q80 and has a size matched with a size of an opening in the fender Q80, the fixed support Q20, the lifting structure Q30, the cleaning structure Q40, the pop-up structure Q50, the laser radar Q60 and the controller Q70 are all located inside the fender Q80, the lifting structure Q30 is provided on the fixed support Q20 and connected with the cover plate Q10 and can drive the cover plate Q10 to move up and down under control of the controller Q70, the laser radar Q60 is provided on the pop-up structure Q50, and the pop-up structure Q50 is provided on the fixed support Q20 and can move outwards relative to the fixed support Q20 under control of the controller Q70, so as to push the laser radar Q60 out of the fender Q80; the cleaning structure Q40 and the laser radar Q60 are provided on the pop-up structure Q50 together, and the controller Q70 is located above the laser radar Q60 and connected with an automatic driving or advanced assistant driving domain controller through a first wiring harness.

Specifically, referring to FIG. 1B again, the fixed support Q20 includes first fixed plates Q21 and a connecting plate Q22, the first fixed plates Q21 are located on two sides of the connecting plate Q22, and the first fixed plates Q21 are fixed to a front vehicle body longitudinal beam on an inner side of the fender Q80 through bolts.

Figure 1C:
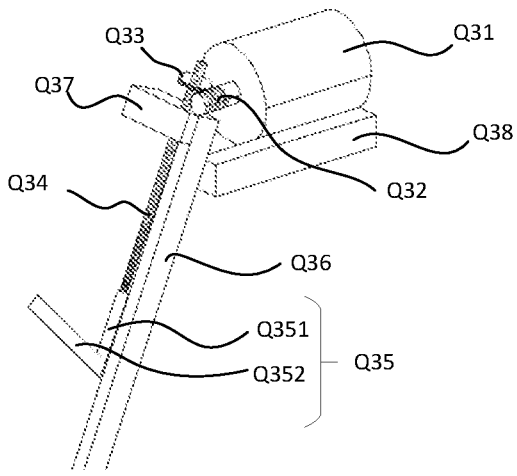
FIG. 1C is a schematic structural diagram of a lifting structure in the present invention.

In an embodiment, referring to FIGS. 1B and 1C, the lifting structure Q30 at least includes a first motor Q31, a transmission shaft Q32, a first gear Q33, a lead screw Q34, a lifting rod Q35, a sliding rail Q36, a fixed block Q37 and a second fixed plate Q38.

In an embodiment, the sliding rail Q36 obliquely extends inwards from a position below the fixed support Q20 to a position above the fixed support, and has a bottom end fixed to the connecting plate Q22 and a top end provided with the fixed block Q37; the lead screw Q34 penetrates through the fixed block Q37 to be provided in parallel with the sliding rail Q36, the fixed block Q37 is in threaded connection with the lead screw Q34, a lower end of the lead screw Q34 is provided with the lifting rod Q35, the first gear Q33 is fixed at a top end of the lead screw Q34, the lifting rod Q35 includes a first lifting rod Q351 and a second lifting rod Q352, the lower end of the lead screw Q34 is sleeved with and in threaded connection with the first lifting rod Q35, and the second lifting rod Q352 has one end connected with the first lifting rod Q351 at a set angle and the other end fixedly connected with a bottom end of one side of the cover plate Q10; the first motor Q31 and the controller Q70 are fixed on the second fixed plate Q38, the transmission shaft Q32 is connected to the motor Q31, and the transmission shaft Q32 is meshed with the first gear Q33; when the first motor Q31 rotates forwards, the transmission shaft Q32 is driven to rotate, the transmission shaft Q32 drives the first gear Q33 to rotate, the first gear Q33 drives the lead screw Q34 to rotate, the first lifting rod Q351 moves upwards relative to the lead screw Q34, so as to drive the second lifting rod Q352 and the cover plate Q10 to move upwards, the cover plate Q10 is opened, and the laser radar Q60 and the cleaning structure Q40 are ejected out of the fender Q80 under driving of the pop-up structure Q50; when the first motor Q31 rotates reversely, a movement process is opposite to that of a forward rotation, the cover plate Q10 moves downwards, and the laser radar Q60 and the cleaning structure Q40 are driven by the pop-up structure Q50 to retract into the fender Q80.

It should be noted that the lifting structure Q30 is not limited to the lifting structure Q30 described in the present embodiment, and any device having a lifting function may replace the lifting structure Q30 described in the present embodiment, and a specific structure of the lifting structure in the prior art is not repeated in the present invention.

Figure 1D:
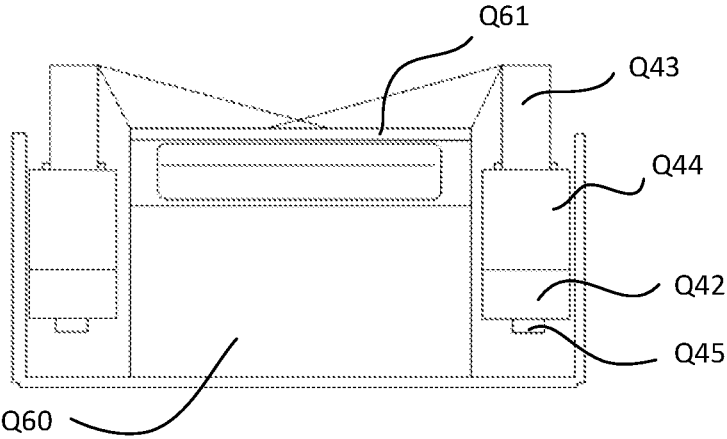
FIG. 1D is a schematic diagram of a cleaning structure in the present invention.
Figure 1E:
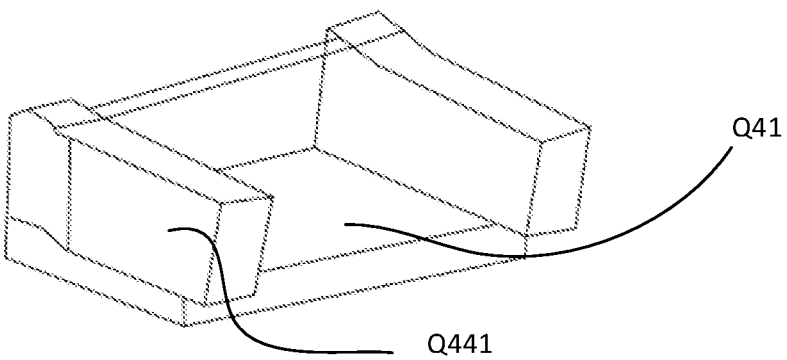
FIG. 1E is a schematic structural diagram of a fixed frame in the present invention.

In an embodiment, referring to FIGS. 1B, 1C and 1E, the cleaning structure Q40 at least includes a fixed frame Q41, an electromagnetic valve Q42, a nozzle Q43, a connecting portion Q44, and a water inlet Q45; the laser radar Q60 is provided on the fixed frame Q41, and each of two sides of the fixed frame Q41 is provided with a combined structure Q411 of the electromagnetic valve Q42, the nozzle Q43, the connecting portion Q44, and the water inlet Q45. Specifically, one end of the electromagnetic valve Q42 is connected with the connecting portion Q44, and the other end of the electromagnetic valve Q32 is connected with the water inlet Q45, so as to control opening and closing of the water inlet Q45; a pipeline connected with the water inlet Q45 is connected with a finished automobile water path. The nozzle Q43 is connected with the connecting portion Q44, and the nozzle Q43 has an extending-retracting function, retracts into the connecting portion Q44 when not used, and extends out of the connecting portion Q44 under an action of a water pressure when used.

It should be noted that the nozzle Q43 may be of a telescopic structure that the nozzle can extend out of or retract into the connecting portion Q44, or of a fixed structure that the nozzle is directly fixed to the connecting portion Q44 and cannot move relative to the connecting portion Q44, and in the present embodiment, the nozzle Q43 is telescopic.

Figure 1F:
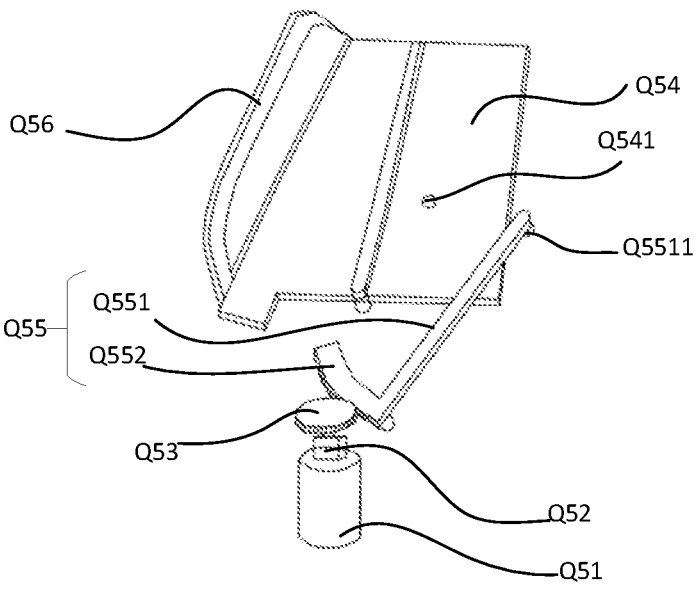
FIG. 1F is a schematic diagram of a pop-up structure in the present invention.

In an embodiment, referring to FIGS. 1B and 1F, the pop-up structure Q50 at least includes a second motor Q51, a speed reducer Q52, a second gear Q53, a movable plate Q54, a moving rod Q55 and a sealing strip Q56.

Further, the second motor Q51 is fixed inside the fender Q80, an output shaft of the second motor Q51 is connected with the speed reducer Q52, the speed reducer Q52 is connected with the second gear Q53, the movable plate Q54 is placed on the connecting plate Q22 of the fixed support Q20 and can swing inwards and outwards relative to the fixed support Q20, and when the movable plate Q54 rotates out relative to the fixed support Q20, the movable plate Q54 forms a set angle (30 degrees in the present embodiment) relative to an outer edge support of the connecting plate Q22; the laser radar Q60 and the cleaning structure Q40 are mounted on the movable plate Q54, a hole Q541 is further provided in the movable plate Q54, the moving rod Q55 includes a first moving rod Q551 and a second moving rod Q552, and the first moving rod Q551 penetrates through a slotted hole on the first fixed plate Q21 close to the first moving rod Q551 and can swing relative to the first fixed plate Q21. A convex column Q5511 is provided below an end of the first moving rod Q551, the convex column Q5511 is clamped to the hole Q541 on the movable plate Q54, the second moving rod Q552 has an arc shape, teeth are arranged on a section of an outer side of the second moving rod Q552 and meshed with the second gear Q53, the second moving rod Q552 is connected with the first moving rod Q551 at a set angle, and the sealing strip Q56 can be mounted on a front side of the movable plate Q54 or fixed on a periphery of an inner opening of the fender Q80; in the present embodiment, the sealing strip Q56 is mounted on the front side of the movable plate Q54, and when the second motor Q51 rotates forwards, the second gear Q53 rotates under driving of the second motor Q51 and the speed reducer Q52, so as to drive the second moving rod Q552 to rotate, and then drive the first moving rod Q551 to rotate, the movable plate Q54 connected with the first moving rod Q551, the laser radar Q60 and the cleaning structure Q40 rotate out to be ejected outside the fender Q80, and at this point, the sealing strip Q56 abuts against the periphery of the opening in the fender Q80, and the sealing strip Q56 has a waterproof function and can prevent sewage from being splashed into the fender Q80 when the cleaning structure S40 works; when the second motor Q51 rotates, the movable plate Q54, the laser radar Q60 and the cleaning structure Q40 retract into the fender Q80.

It should be noted that the pop-up structure Q50 is not limited to the pop-up structure Q50 described in the present embodiment, and any device having a pop-up function may replace the pop-up structure Q50 described in the present embodiment, and a specific structure of the pop-up structure in the prior art is not repeated in the present invention.

Figure 1G:
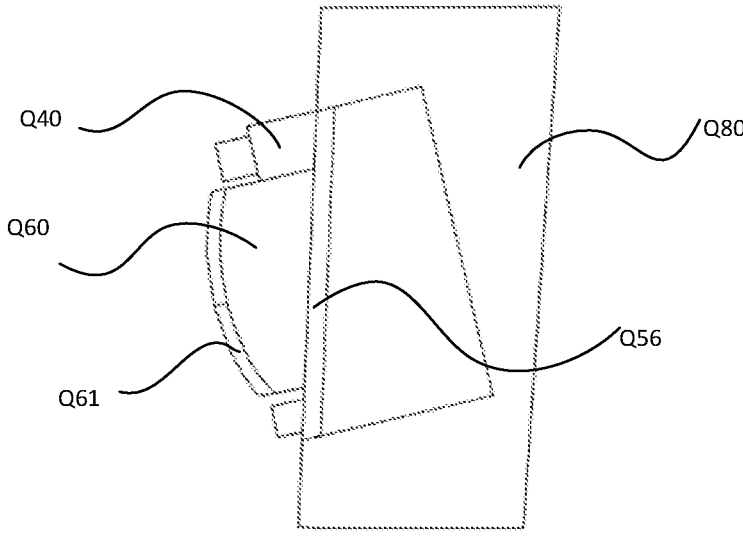
FIG. 1G is a top view of a laser radar in the present invention in a started state.

In an embodiment, referring to FIGS. 1D and 1G, a mirror surface Q61 is fixed on a working side of the laser radar Q60, the other side of the laser radar is connected with a second wiring harness, and the second wiring harness is connected with an automatic driving or advanced assistant driving domain controller; when the laser radar Q60 detects that the mirror surface Q61 is affected by dirt, the second wiring harness can transmit a signal to the automatic driving or advanced assistant driving domain controller, the automatic driving or advanced assistant driving domain controller sends a cleaning signal to the electromagnetic valve Q42, the electromagnetic valve Q42 is opened, and the nozzle Q43 sprays water to the mirror surface Q61 for cleaning. FIG. 1D shows the nozzle Q43 in an extended state, and the dotted line indicates a water spraying range; that is, the water sprayed from the nozzles Q43 on both sides can cover the whole mirror surface Q61.

It should be noted that, referring to FIGS. 1A and 1G, the laser radar integrated device according to the present invention is mounted on the fenders Q80 on both sides of a front end of a vehicle body, a working angle is 30 degrees from a forward direction of the vehicle body, and a horizontal vision field of 120 degrees can be sensed.

The laser radar integrated device according to the present embodiment has the following working principle: when a user has a driving demand, the automatic driving or advanced assistant driving domain controller sends an opening signal of the corner laser radar integrated device, the controller Q70 in the integrated device firstly drives the first motor Q31 to rotate forwards, the lifting structure Q30 starts to work, and under rotation of the transmission shaft Q32, the first gear Q33 and the lead screw Q34, the first lifting rod Q351 and the second lifting rod Q352 drive the cover plate Q10 to ascend to open the hiding opening, the controller Q70 then drives the second motor Q51 to rotate forwards, the pop-up structure Q50 starts to work, and under driving of the speed reducer Q52 and the second gear Q53, the second moving rod Q552 rotates, the first moving rod Q551 drives the movable plate Q54 to move, the laser radar Q60 and the cleaning structure Q40 are ejected out of the fender Q80 and form an angle of 30 degrees relative to an advancing direction of the vehicle body, and the laser radar Q60 starts to work; when detecting that the mirror surface Q61 is affected by dirt, the laser radar Q60 sends a dirt signal to the automatic driving or advanced assistant driving domain controller, the automatic driving or advanced assistant driving domain controller sends a cleaning signal to the controller Q70 inside the integrated device, the automatic driving or advanced assistant driving domain controller drives a cleaning water pump to pressurize a water path, and after a period of time, the controller Q70 inside the integrated device drives the cleaning structure Q40 to start to work, the electromagnetic valve Q42 is opened, the nozzle Q43 sprays water to clean the mirror surface Q61 of the laser radar Q60, and after cleaning is finished, the electromagnetic valve Q42 is closed; when a driving function is quit, the automatic driving or advanced assistant driving domain controller sends a closing signal of the laser radar integrated device, the controller Q70 in the integrated device drives the first motor Q31 and the second motor Q51 to rotate reversely, and the corner laser radar integrated device is closed and hidden into the fender Q80.

As can be seen from the above description, the laser radar integrated device according to the present invention has the following advantages: a hidden solution is adopted, and the laser radar can be retracted into the vehicle body in a standby state, thus avoiding influencing an appearance and styling, and reducing a risk of being scratched by sand and stone; when an automatic driving function is activated, the laser radar is rotated out to a working position, thus increasing a technological sense; the hidden cleaning structure is integrated and can keep the mirror surface of the laser radar clean all the time in an automatic driving process, thus greatly reducing an artificial cleaning frequency and improving user experience; the number of the corner laser radars is reduced from 4-5 to 2, thus achieving a cost advantage; the laser radar integrated device is arranged at the front fender, thus reducing a collision risk compared with an arrangement at front and rear bumpers.

The present invention further provides a vehicle which includes the above laser radar integrated device, and for other technical features of the vehicle, reference is made to the prior art, and the technical features are not repeated herein.

Figure 2A:
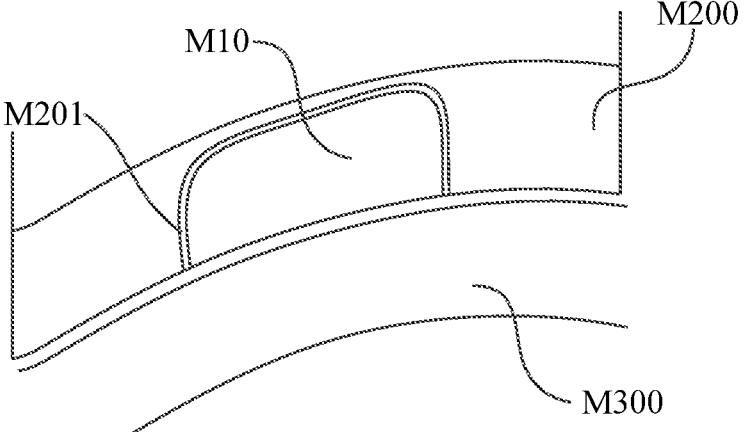
FIG. 2A is a schematic structural diagram of a radar integrated system according to an embodiment of the present invention provided at a fender.
Figure 2B:
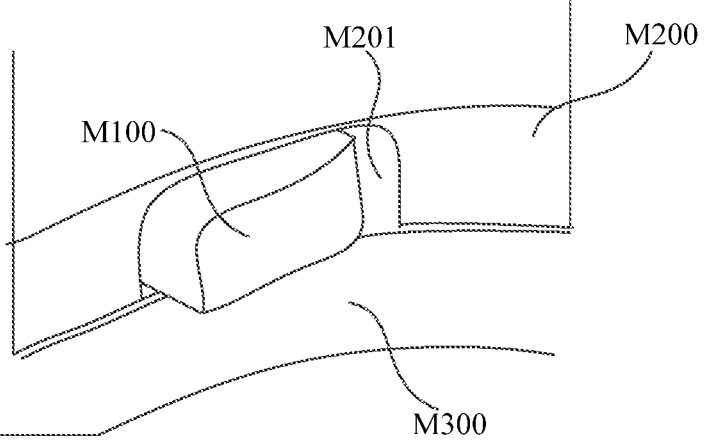
FIG. 2B is a schematic structural diagram in which a cover plate opens a first opening and a radar device extends out of the fender from the first opening in an embodiment of the present invention.

In an embodiment, the present invention further provides a radar integrated system, and FIG. 2A is a schematic structural diagram of the radar integrated system according to an embodiment of the present invention provided at a fender; FIG. 2B is a schematic structural diagram in which a cover plate opens a first opening and a radar device extends out of the fender from the first opening in an embodiment of the present invention.

As an embodiment of another structure of the radar integrated system according to the present invention, the present embodiment provides a radar integrated system M100, the radar integrated system M100 being provided at a fender M200 of a vehicle. In an embodiment, the vehicle has plural fenders M200, and in a typical car, four fenders M200 are provided and located above four tires respectively. A first opening M201 is provided at each fender M200, and the first opening M201 is located above a wheel brow 300. One radar integrated system M100 may be provided at each first opening M201. The following description is given by taking one radar integrated system M100 as an example.

Figure 2C:
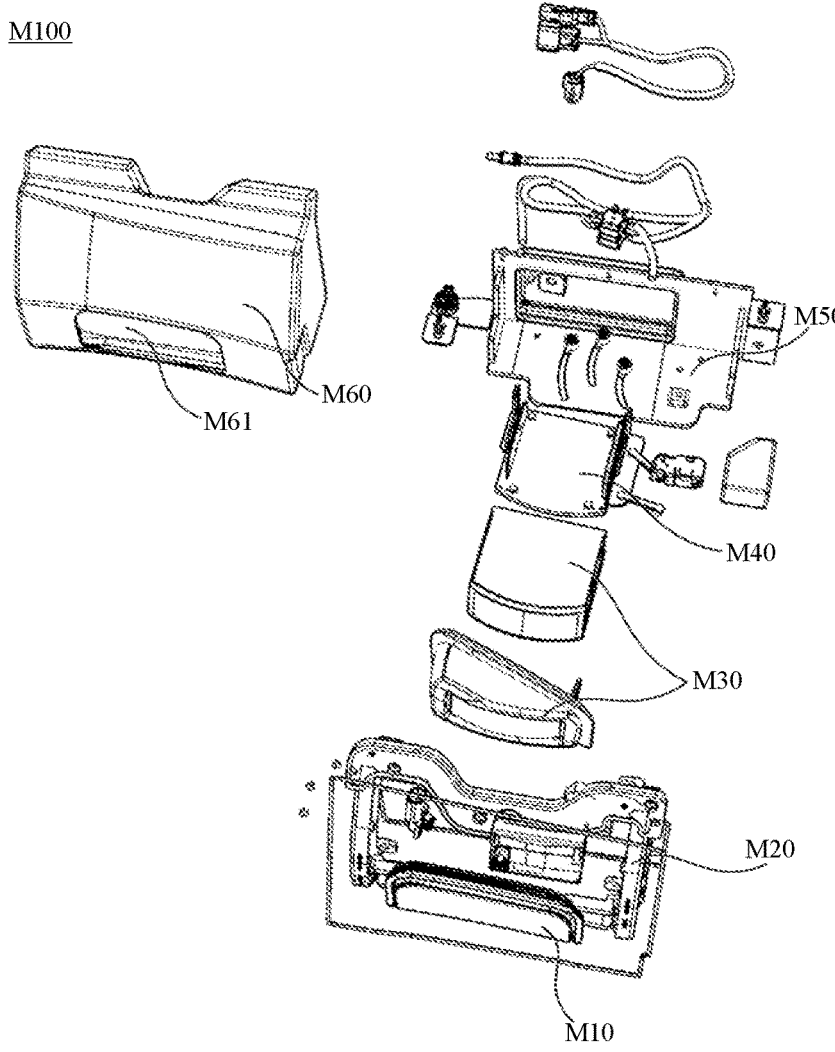
FIG. 2C is a schematic exploded diagram of the radar integrated system according to an embodiment of the present invention.

FIG. 2C is a schematic exploded diagram of the radar integrated system according to an embodiment of the present invention. As a specific embodiment of the present invention, the radar integrated system M100 according to the present embodiment may include a cover plate M10, a cover plate driving mechanism M20, a radar device M30, a radar driving mechanism M40 and a control device M70. The cover plate driving mechanism M20 is connected with the cover plate M10 and configured to controllably move to drive the cover plate M10 to open or close the first opening M201. The radar device M30 is located near the first opening M201. The radar driving mechanism M40 is connected with the radar device M30 and configured to controllably move to drive the radar device M30 to extend out of or retract into the fender M200 from the first opening M201. The control device M70 is connected with the cover plate driving mechanism M20, the radar driving mechanism M40 and the radar device M30, and the control device M70 is configured to, when receiving an instruction of starting the radar device M30, control the cover plate driving mechanism M20 to drive the cover plate M10 to open the first opening M201, and control the radar driving mechanism M40 to drive the radar device M30 to extend out of the fender M200 from the first opening M201, and when receiving an instruction of stopping the radar device M30, control the cover plate driving mechanism to drive the cover plate M10 to close the first opening M201, and control the radar driving mechanism M40 to drive the radar device M30 to retract into the fender M200 from the first opening M201.

The radar integrated system M100 according to the present embodiment may include the cover plate M10, the cover plate driving mechanism M20, the radar device M30, the radar driving mechanism M40 and the control device M70. The control device M70 controls the cover plate driving mechanism M20 to drive the cover plate M10 to open and close the first opening M201, and further controls the radar driving mechanism M40 to drive a radar to extend out of and retract into the fender M200 and meanwhile drive the radar device M30 to be turned over, such that the radar integrated system M100 according to the present embodiment has an adjustable detection angle, extends out of the fender M200 when used, and retracts into the fender M200 when not used, and the radar device M30 is protected by the cover plate M10, thus avoiding that the radar device M30 is rubbed and bumped by the outside or contaminated by outside contaminants to influence use, and prolonging a service life of the radar device M30.

As a specific embodiment of the present invention, since the cover plate M10 and the radar device M30 are both required to move from the first opening M201 into the fender M200, in order to avoid movement interference, a direction of movement of the cover plate M10 and a direction of movement of the radar are not set at a same angle or in a same plane as much as possible. In the present embodiment, the cover plate M10 and the radar device M30 both perform translation and turnover motions, but motion tracks of the cover plate M10 and the radar device M30 are almost formed on one plane. In order to avoid interference, a preset angle is formed between a vertical line of the plane where the motion track of the radar device M30 is located and a vertical line of the plane where the motion track of the cover plate M10 is located, and the preset angle is 90±15 degrees. For example, the preset angle may be just 90 degrees, or may be any angle between 75 degrees and 105 degrees. In the present embodiment, the description is given with the preset angle of 90 degrees.

In an embodiment, the motion track of the cover plate M10 in the present embodiment is located at a vertical plane, and when moving from a first angle into the fender M200, the cover plate M10 specifically moves towards an upper portion inside the fender M200, and is turned over while translating. The motion track of the radar device M30 is located in a horizontal plane, and similarly, when moving from the first opening M201 into the fender M200, the radar device specifically moves towards a left or right side inside the fender M200, and meanwhile is turned over counterclockwise or clockwise.

As a specific embodiment of the present invention, the control device M70 is configured to control the radar driving mechanism M40 to drive the radar device M30 to be turned over to extend out of the fender M200 from the first opening M201 after it has controlled the cover plate driving mechanism M20 to drive the cover plate M10 to open the first opening M201 for a first preset time, and control the radar driving mechanism M40 to drive the radar device M30 to be turned over to retract into the fender M200 from the first opening M201 after it has controlled the cover plate driving mechanism M20 to drive the cover plate M10 to close the first opening M201 for a second preset time.

In the present embodiment, the first preset time may be 0 s to 5 s. When the first preset time is 0 s, opening of the first opening M201 by the cover plate M10 and movement of the radar device M30 to the first opening M201 are performed at the same time. When the first preset time is not 0 s, the cover plate M10 opens the first opening M201, and after the first preset time, the radar device M30 moves to the first opening M201. Such a design is intended to avoid interference between the radar device M30 and the cover plate M10 during movement. Similarly, the second preset time in the present embodiment may be 0 s to 5 s, and when the second preset time is 0 s, closing of the first opening M201 by the cover plate M10 and movement of the radar device M30 from the first opening M201 into the fender M200 are performed at the same time. When the second preset time is not 0 s, the radar device M30 moves into the fender M200 from the first opening M201, and after the second preset time, the cover plate M10 moves to close the first opening M201. Such a design is also intended to avoid interference between the radar device M30 and the cover plate M10 during movement.

In the present invention, a structural design of the cover plate driving mechanism M20 and the radar driving mechanism M40 and control of the movement time of the two driving mechanisms by the control device M70 avoid interference between the cover plate M10 and the radar device M30 in movement, such that the radar integrated system M100 is more intelligent while guaranteeing functions.

Figure 2D:
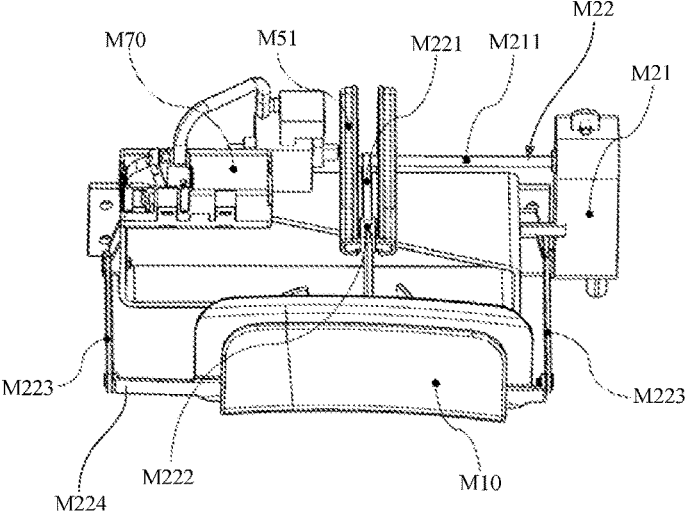
FIG. 2D is a schematic structural diagram of connection of a cover plate and a cover plate driving mechanism in an embodiment of the present invention.
Figure 2E:
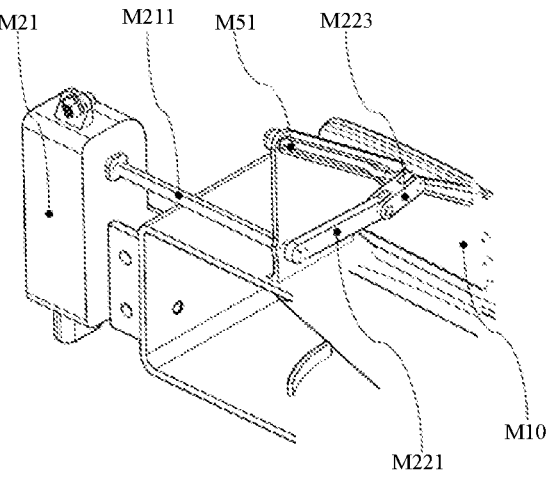
FIG. 2E is a schematic partial structural diagram of the connection of the cover plate and the cover plate driving mechanism in an embodiment of the present invention.

FIG. 2D is a schematic structural diagram of connection of the cover plate and the cover plate driving mechanism in an embodiment of the present invention; FIG. 2E is a schematic partial structural diagram of the connection of the cover plate and the cover plate driving mechanism in an embodiment of the present invention. In an embodiment, as shown in FIGS. 2D to 2E, the radar integrated system M100 according to the present embodiment may include a fixed frame M50, the cover plate M10, and the cover plate driving mechanism M20. The fixed frame M50 is fixedly connected with the fender M200, and a sliding groove M51 is formed in the fixed frame M50.

In an embodiment, the cover plate driving mechanism M20 may include a cover plate driving motor M21 and a moving mechanism M22, and the moving mechanism M22 has one end connected with the cover plate driving motor M21 and the other end connected with the cover plate M10. The cover plate driving motor M21 is controlled by the control device M70 to move, the moving mechanism M22 is connected with the cover plate driving motor M21, and when the cover plate driving motor M21 moves, the moving mechanism M22 is driven to move, and the moving mechanism M22 drives the cover plate M10 to move. Furthermore, the moving mechanism M22 is restricted by the sliding groove M51, drives the cover plate M10 to move along the sliding groove M51, and meanwhile drives the cover plate M10 to rotate to open and close the first opening M201.

In the present embodiment, the cover plate M10 and the cover plate driving mechanism M20 can open or close the first opening M201 due to the presence of the first opening M201.

As an embodiment of the present invention, the moving mechanism M22 may include a crank M221 and a first connecting rod M222. The crank M221 has one end fixedly connected with an output shaft M211 of the cover plate driving motor M21 to rotate with the output shaft M211. In an embodiment, when the control device M70 controls the cover plate driving motor M21 to move, the output shaft M211 of the cover plate driving motor M21 rotates, and the crank M221 connected to the output shaft M211 rotates accordingly. The first connecting rod M222 has one end rotatably connected with an end of the crank M221 apart from the output shaft M211 and the other end connected with the cover plate M10. Therefore, when the crank M221 rotates, the first connecting rod M222 is also driven, and since the first connecting rod M222 is connected with the cover plate M10, the cover plate M10 is also driven to move. In the present embodiment, a rotating axis of the first connecting rod M222 is parallel to a rotating axis of the crank M221. A side edge of the first connecting rod M222 is provided with a cam, the cam is clamped at the sliding groove M51, and when the crank M221 rotates with the output shaft M211, the cam moves along the sliding groove M51, such that the cover plate M10 runs along a track parallel to the sliding groove M51.

The output shaft M211 of the cover plate driving motor M21 in the present embodiment is directly and fixedly connected with one end of the crank M221, and the crank M221 rotates with the output shaft M211 of the cover plate driving motor M21. One end of the first connecting rod M222 is rotatably connected with the other end of the crank M221, and the other end of the first connecting rod M222 is connected with the cover plate M10, such that when the output shaft M211 of the cover plate driving motor M21 rotates, the cover plate M10 is driven by the crank M221 and the first connecting rod M222 to move. In the present embodiment, the first connecting rod M222 is connected with a middle of the cover plate M10 in a rotatable connection manner. Since the cam is provided at the first connecting rod M222 and restricted by the sliding groove M51, the cover plate M10 also moves along a track parallel to the sliding groove M51. When the sliding groove M51 just extends from the first opening M201 into the fender M200, the cover plate M10 is driven by the crank M221 and the first connecting rod M222 to reciprocate between the first opening M201 and the inside of the fender M200.

The cover plate driving mechanism M20 in the present embodiment only includes the cover plate driving motor M21 and the moving mechanism M22, the moving mechanism M22 only includes the crank and the first connecting rod, the cover plate driving mechanism M20 has a simple structure, a single driving force and a simple moving process, and the purpose that the cover plate M10 opens and closes the first opening M201 can be achieved.

In an embodiment, two sliding grooves M51 are provided, the two sliding grooves M51 are oppositely arranged in a mirrored mode, and the first connecting rod M222 is located between the two sliding grooves M51. Two cams are provided and arranged on two opposite side surfaces of the first connecting rod M222 facing the two sliding grooves M51, and each cam is provided corresponding to one sliding groove M51.

Specifically, in the present embodiment, the cams are provided on left and right sides of the first connecting rod M222, and the sliding grooves M51 are also located on the left and right sides of the first connecting rod M222. The cams are clamped into the sliding grooves M51. When the first connecting rod M222 moves, positions of the first connecting rod M222 provided with the cams can only move along the sliding grooves M51 under an action of the sliding grooves M51. The design of the two sliding grooves M51 and the two cams in the present embodiment is more beneficial to stability of movement of the cover plate M10, and avoids tilting or jamming in the movement process.

In fact, in the actual radar integrated system M100, the fender M200 does not have a straight fender structure, and a bent structure may exist. For example, the fender M200 is bent inwards at a position above the first opening M201, and when the cover plate M10 is driven to move along the sliding groove M51, since the cover plate M10 has a certain size, interference friction, or the like, with other peripheral components is prone to occurring. Therefore, if the cover plate M10 moves upwards, the cover plate M10 is required to rotate inwards to an angle where the cover plate is parallel to a plane of the fender M200, which is more beneficial for space saving.

As a specific embodiment of the present invention, the moving mechanism M22 may further include a second connecting rod M223, one end of the second connecting rod M223 is rotatably connected with the fixed frame M50, and the other end of the second connecting rod is rotatably connected with the cover plate M10. In the present embodiment, the second connecting rod M223 is mainly configured to drive the cover plate M10 to rotate in the process that the cover plate M10 moves along the sliding groove M51. A second axis of the second connecting rod M223 is parallel to a first axis of the first connecting rod M222, such that when the cover plate M10 moves along the sliding groove M51 under driving of the cover plate driving motor M21, the cover plate M10 rotates under an action of the second connecting rod M223. The second axis is an axis of a rotating shaft at a rotatable connection position of the second connecting rod M223 and the cover plate M10, and the first axis is an axis of a rotating shaft at a rotatable connection position of the first connecting rod M222 and the cover plate M10.

Since the cover plate M10 is driven by the second connecting rod M223 to be turned over in the present embodiment, the cover plate M10 cannot move when the first axis coincides with the second axis, and therefore, the first axis and the second axis have to be provided in parallel in the present embodiment. In the present embodiment, in the radar integrated system M100, only one second connecting rod M223 is connected at the cover plate M10, and under a combined action of the first connecting rod M222 and the second connecting rod M223, the cover plate M10 is driven by the cover plate driving motor M21 to be turned over while moving along the track parallel to the sliding groove M51, such that the cover plate M10 conveniently opens and closes the first opening M201.

As a specific embodiment of the present invention, the radar integrated system M100 may further include a hinge rod M224 which is fixedly connected with the cover plate M10 and extends along a direction parallel to the axis of the rotating shaft of the second connecting rod M223, and one end portion of the second connecting rod M223 is rotatably connected with one end of the hinge rod M224, such that the cover plate M10 and the hinge rod M224 rotate together relative to the second connecting rod M223. The hinge rod M224 is located on an inner side of the cover plate M10, such that when the cover plate M10 closes the first opening M201, the hinge rod M224 is located inside the fender M200, and the whole cover plate M10 covers the first opening M201, and thus an attractive effect is achieved, and the cover plate M10 and the first opening M201 are in a sealed state.

In an embodiment, two second connecting rods M223 may be provided, the two second connecting rods M223 are parallel to each other and are located at two ends of the hinge rod M224 respectively, and the two second connecting rods M223 and the hinge rod M224 form a U-shaped structure.

In the present embodiment, the hinge rod M224 is laterally provided on the inner side of the cover plate M10, the two second connecting rods M223 are rotatably connected to left and right end portions of the hinge rod M224 respectively, the first connecting rod M222 is rotatably connected to the middle of the inner side of the cover plate M10, and a plane where the first connecting rod M222 is located is parallel to a plane where the second connecting rods M223 are located. The cover plate M10 is more stable in the process of movement and turnover through the design of the two connecting rods.

As a specific embodiment of the present invention, the radar device M30 is located near the first opening M201. The radar driving mechanism M40 may include a radar driving motor M41 and a double-connecting-rod mechanism. Similarly, the radar driving motor M41 is connected with the control device M70, and the control device M70 controls the driving motor to operate when receiving an instruction. The double-connecting-rod mechanism has one end rotatably connected with the radar device M30 and the other end rotatably connected with the fender M200, and when the radar driving motor M41 controllably drives the double-connecting-rod mechanism to move, the double-connecting-rod mechanism drives the radar device M30 to rotate relative to the fender M200 to extend out of or retract into the fender M200 from the first opening M201.

Figure 2F:
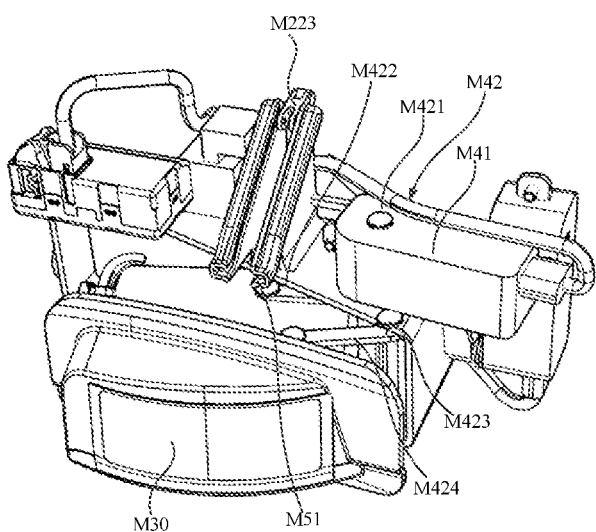
FIG. 2F is a schematic structural diagram of connection of a radar device and a radar driving mechanism in an embodiment of the present invention.
Figure 2G:
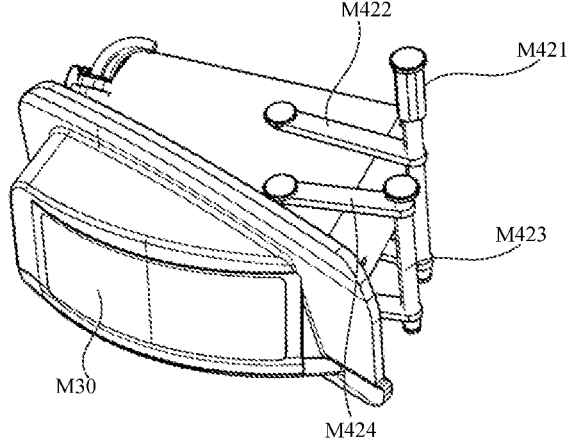
FIG. 2G is a schematic structural diagram of connection of the radar device and a double-connecting-rod mechanism in an embodiment of the present invention.

FIG. 2F is a schematic structural diagram of connection of the radar device and the radar driving mechanism in an embodiment of the present invention. FIG. 2G is a schematic structural diagram of connection of the radar device and the double-connecting-rod mechanism in an embodiment of the present invention.

In the present embodiment, as shown in FIGS. 2F to 2G, the radar integrated system M100 can include the radar device M30 and the radar driving mechanism M40, the radar driving mechanism M40 can include the radar driving motor M41 and the double-connecting-rod mechanism M42, the double-connecting-rod mechanism M42 is driven to move by the radar driving motor M41, and the double-connecting-rod mechanism M42 drives the radar device M30 to move, such that the radar device M30 can rotate relative to the fender M200 to extend out of or retract into the fender M200 from the first opening M201, and therefore, the radar device M30 can extend out of the fender M200 in use and rotate by an angle, thereby ensuring that a measurement angle of the radar device M30 is not limited.

As a specific embodiment of the present invention, the double-connecting-rod mechanism M42 may include a first rotating shaft M421, a first swing arm M422, a second rotating shaft M423 and a second swing arm M424. The first rotating shaft M421 is rotatably connected with the fender M200, and the first rotating shaft M421 is connected with the radar driving motor M41 to rotate under driving of the radar driving motor M41. The first swing arm M422 has one end fixedly connected with the first rotating shaft M421 to rotate around an axis of the first rotating shaft M421 when the first rotating shaft M421 rotates, and the other end rotatably connected with the radar device M30. The second rotating shaft M423 is rotatably connected with the fender M200 and provided in parallel with the first rotating shaft M421. The second swing arm M424 has one end rotatably connected with the radar device M30 and the other end fixedly connected with the second rotating shaft M423. When the first rotating shaft M421 is driven by the radar driving motor M41 to rotate, the radar device M30 is driven to be turned over under a combined action of the first swing arm M422, the second swing arm M424 and the second rotating shaft M423.

In the present embodiment, the double-connecting-rod mechanism M42 only includes the first rotating shaft M421, the first swing arm M422, the second rotating shaft M423 and the second swing arm M424, and has a simple structure and a clear movement process. Furthermore, the double-connecting-rod mechanism M42 is connected with the radar device M30, and the double-connecting-rod mechanism M42 can drive the radar device M30 to move under driving of the radar driving motor M41, thus realizing simultaneous movement and rotation of the radar device M30, ensuring that the detection angle of the radar device M30 meets requirements, and meanwhile achieving the purpose of hiding the radar device M30.

As a specific embodiment of the present invention, two first swing arms M422 are provided, the two first swing arms M422 are arranged in parallel, and the two first swing arms M422 are rotatably connected with an upper side surface and a lower side surface of the radar device M30 respectively.

In an embodiment, the two first swing arms M422 are both fixedly connected with the first rotating shaft M421 and arranged up and down. When the first rotating shaft M421 rotates, the two first swing arms M422 move simultaneously, thereby pushing the radar device M30 to move. Due to a design of the two first swing arms M422, larger torque can be more stably transmitted, and movement of the radar is more stable.

As a specific embodiment of the present invention, two second swing arms M424 are provided, the two second swing arms M424 are arranged in parallel, and the two second swing arms M424 are rotatably connected with the upper side surface and the lower side surface of the radar device M30 respectively. The number of the second swing arms M424 is designed to be two, which may also make connection between the radar device M30 and the second rotating shaft M423 firmer.

In an embodiment, the two second swing arms M424 are located on sides of the two first swing arms M422 respectively, and when the first swing arms M422 are driven by a driving device to move, the first swing arms M422 drive the radar device M30 to move, the radar device M30 then drives the second swing arms M424 to move, and the second swing arms M424 rotate relative to the second rotating shaft M423, thereby realizing turnover of the radar device M30.

As a specific embodiment of the present invention, a length of the second swing arm M424 is different from a length of the first swing arm M422, or a distance between the first rotating shaft M421 and the second rotating shaft M423 is different from a target distance, and the target distance is a distance between a hinged point of the first swing arm M422 and the radar mechanism and a hinged point of the second swing arm M424 and the radar mechanism.

In an embodiment, since a double-hinge mechanism is finally required to realize the turnover of the radar device M30, when the length of the first swing arm M422 is equal to the length of the second swing arm M424, the distance between the first rotating shaft M421 and the second rotating shaft M423 cannot be equal to the target distance. Or, when the distance between the first rotating shaft M421 and the second rotating shaft M423 is equal to the target distance, the length of the first swing arm M422 cannot be equal to the length of the second swing arm M424. If the length of the first swing arm M422 is equal to the length of the second swing arm M424 and the distance between the first rotating shaft M421 and the second rotating shaft M423 is equal to the target distance, the radar device M30 can only translate but not rotate.

Furthermore, the motion track of the radar device M30 is related to not only the lengths of the swing arms and a distance between end portions of the swing arms, but also relative positions of the radar device M30, the rotating shaft and the first opening M201. For example, in the present embodiment, the radar device M30 is located on a left side of the first rotating shaft M421, and when the first rotating shaft M421 rotates counterclockwise, the radar device M30 moves towards the outside of the fender M200 as a whole, and when the first rotating shaft M421 rotates clockwise, the radar device M30 moves towards the inside of the fender M200 as a whole. If the radar device M30 is located on a right side of the first rotating shaft M421, when the first rotating shaft M421 rotates counterclockwise, the radar device M30 moves towards the inside of the fender M200 as a whole, and when the first rotating shaft M421 rotates clockwise, the radar device M30 moves towards the outside of the fender M200 as a whole.

In another embodiment, the length of the first swing arm M422 is greater than the length of the second swing arm M424, and the distance between the first rotating shaft M421 and the second rotating shaft M423 is smaller than the target distance.

In the present embodiment, since the length of the first swing arm M422 is greater than the length of the second swing arm M424, when the first swing arm M422 rotates counterclockwise as viewed from top to bottom, the radar device M30 moves outwards from the inside of the fender M200, and meanwhile, the radar device M30 also rotates counterclockwise as viewed from top to bottom.

Figure 2H:
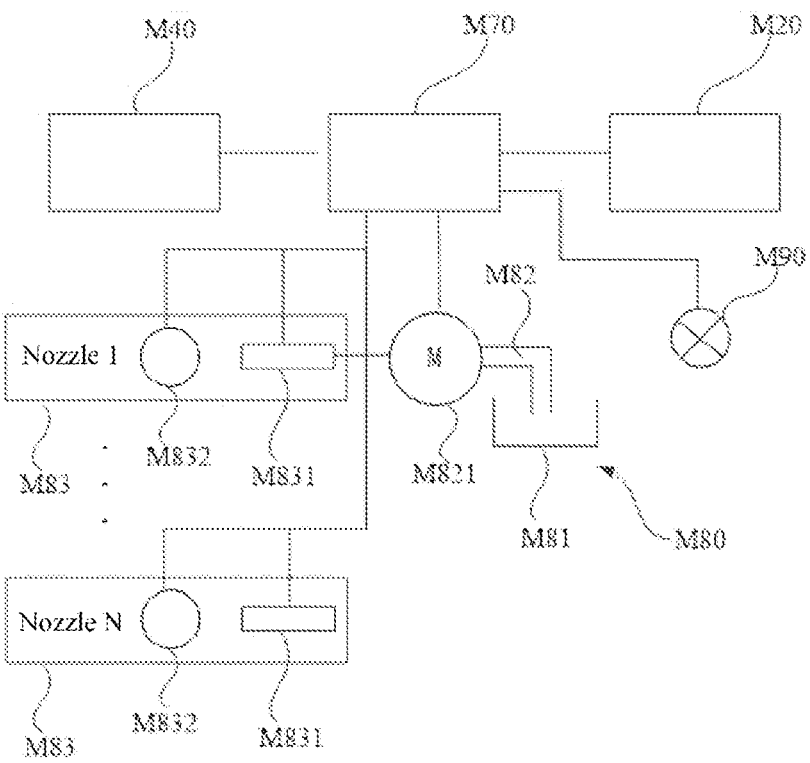
FIG. 2H is a schematic structural diagram of connection of a control device and controlled devices in an embodiment of the present invention.

FIG. 2H is a schematic structural diagram of connection of the control device and controlled devices in an embodiment of the present invention. As a specific embodiment of the present invention, the radar integrated system M100 may further include a cleaning device M80 provided on an inner side of the fender M200, located on a side of the radar device M30 apart from the fender M200, and configured to be controllably started to clean the radar device M30.

In the present embodiment, when retracting into the fender M200, the radar device M30 also rotates to the inner side of the fender M200. If dirtied by dust, sewage, or the like, in a use process, the radar device M30 can be cleaned by the cleaning device M80, thereby ensuring that the radar device M30 can better detect an environment around the vehicle, and avoiding erroneous judgment, or the like.

As a specific embodiment of the present invention, the cleaning device M80 may include a water storage box M81, a duct M82 and a nozzle M83. The water storage box M81 is configured to store cleaning liquid required for cleaning the radar device M30. The duct M82 has one end communicated with the water storage box M81 and located in the cleaning liquid, and a water pump M821 is further provided at the duct M82. The nozzle M83 is connected with the other end of the duct M82, and an electromagnetic valve M831 is provided at the nozzle M83. The water pump M821 and the electromagnetic valve M831 are controllably started to spray the cleaning liquid in the water storage box M81 at the radar device M30.

In the present embodiment, the control device M70 is further connected with both the water pump M821 and the electromagnetic valve M831, and the control device M70 is configured to control the electromagnetic valve M831 and the water pump M821 to be started after receiving an instruction that the radar device M30 is required to be cleaned, such that the cleaning liquid is sprayed from the nozzle M83, and to control the water pump M821 and the electromagnetic valve M831 to be stopped after a third preset time.

Certainly, as a preferred embodiment, after the control device M70 receives the instruction that the radar device M30 is required to be cleaned, before the electromagnetic valve M831 and the water pump M821 are controlled to be started, the radar driving mechanism M40 may be controlled to drive the radar device M30 to rotate to a position facing the cleaning device. Then, the water pump M821 and the electromagnetic valve M831 are controlled to be started to clean the radar device M30. After cleaned, the radar device M30 is controlled to rotate to an original position.

As a specific embodiment of the present invention, a flow sensor M832 is further provided at the nozzle M83, and the flow sensor M832 is connected with the control device M70 and configured to detect a flow rate of the liquid flowing through the nozzle M83. The radar integrated system M100 further includes an alarm device M90, and the alarm device M90 is connected with the control device M70. The control device M70 is configured to control the alarm device M90 to give an alarm when the flow sensor M832 monitors that the flow rate of the liquid flowing through the nozzle M83 is less than a preset flow rate.

When the flow rate of the liquid at the nozzle M83 is low, which indicates that the liquid in the water storage box is insufficient, the alarm device M90 gives an alarm to remind a person to add cleaning liquid.

As a specific embodiment of the present invention, the radar integrated system M100 may further include a housing M60. The housing M60 is provided with a second opening M61, the housing M60 is fixedly provided on the inner side of the fender M200, and the second opening M61 is provided corresponding to the first opening M201. The fixed frame M50 is provided in the housing M60, and the first rotating shaft M421 and the second rotating shaft M423 are rotatably connected with the fixed frame M50.

In the present embodiment, since the fixed frame M50 is provided in the housing M60 and the housing M60 is fixedly provided at the fender M200, rotatable connection of the first rotating shaft M421 and the second rotating shaft M423 relative to the fixed frame M50 equivalently means that the first rotating shaft M421 and the second rotating shaft M423 are rotatably connected with the fender M200 through the fixed frame M50 and the housing M60.

Except for the second opening M61, the housing M60 in the present embodiment has a sealed structure at other parts when the housing M60 and the fixed frame M50 are combined together. The housing M60 is provided at a position where the first opening M201 and the second opening M61 are fitted with each other and sealed, such that when the cover plate M10 is located at the first opening M201, external dust or sewage cannot enter the housing M60, and no component in the housing M60 can be contaminated, thereby avoiding influencing the components in the housing M60 and prolonging the service life thereof.

Furthermore, in the present embodiment, an inner plate fitted with the second opening M61 may be further provided on the inner side of the cover plate M10, and the inner plate and the cover plate M10 may move simultaneously and are both driven by the cover plate driving mechanism M20. The inner plate just closes the second opening M61 while the cover plate driving mechanism M20 drives the cover plate M10 to close the first opening M201, such that double-layer protection is realized, and external contaminants are prevented from entering the housing M60.

When the radar integrated system M100 according to the present embodiment is assembled and mounted, the cover plate M10 and the cover plate driving mechanism M20 are set to be in an open state by an apparatus, and then, a worker lifts the radar device M30 from bottom to top to a mounting position by lifting tooling and temporarily fixes the radar device M30 to a vehicle body shotgun by a pre-hanging structure, and then, the worker connects a front cabin wiring harness with a wiring harness of the radar device, and then adaptively fastens the radar device M30 to the vehicle body shotgun by adaptive nuts, the cover plate M10 is closed by electrifying the apparatus, and finally, the worker adjusts the adaptive nuts to adjust a gap surface difference between the cover plate M10 and the fender M200.

As a specific embodiment of the present invention, the present embodiment further provides a vehicle which may include the radar integrated system M100 described above.

Figure 3A:
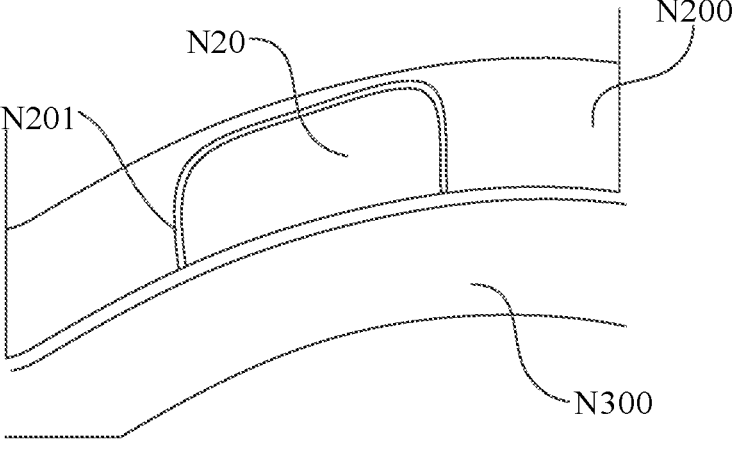
FIG. 3A is a schematic structural diagram of a radar integrated system with a cover plate capable of being turned over for opening and closing according to an embodiment of the present invention provided at a fender.
Figure 3B:
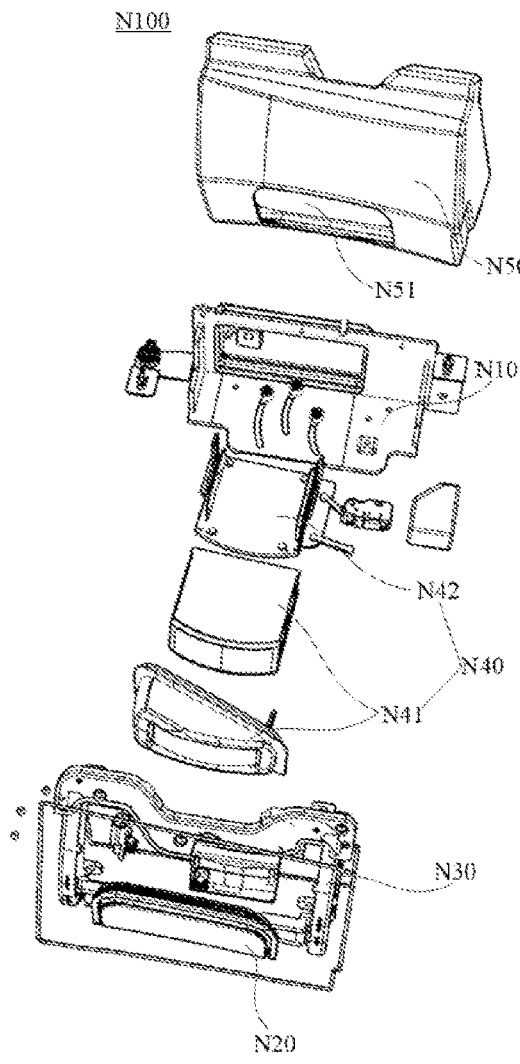
FIG. 3B is a schematic exploded diagram of the radar integrated system with a cover plate capable of being turned over for opening and closing according to an embodiment of the present invention.

In an embodiment, FIG. 3A is a schematic structural diagram of a radar integrated system with a cover plate capable of being turned over for opening and closing according to an embodiment of the present invention provided at a fender; FIG. 3B is a schematic exploded diagram of the radar integrated system with a cover plate capable of being turned over for opening and closing according to an embodiment of the present invention.

As an embodiment of another radar integrated system according to the present invention, as shown in FIGS. 3A and 3B, the present embodiment provides a radar integrated system N100 with a cover plate capable of being turned over for opening and closing, which is provided at a fender N200 of a vehicle. In an embodiment, the vehicle has plural fenders N200, and in a typical car, four fenders N200 are provided and located above four tires respectively. A first opening N201 is provided at each fender N200, and the first opening N201 is located above a wheel brow. One radar integrated system N100 with a cover plate capable of being turned over for opening and closing may be provided at each first opening N201. The following description is given by taking one radar integrated system N100 with a cover plate capable of being turned over for opening and closing as an example.

In an embodiment, the radar integrated system N100 with a cover plate capable of being turned over for opening and closing may include a fixed frame N10, a cover plate N20, a cover plate driving mechanism N30, and a radar assembly N40. The fixed frame N10 is fixedly connected with the fender N200, and a sliding groove N11 is formed in the fixed frame N10. The cover plate driving mechanism N30 is located in the fixed frame N10, and the cover plate driving mechanism N30 is connected with the cover plate N20 and configured to controllably move to drive the cover plate N20 to open or close the first opening N201.

Figure 3C:
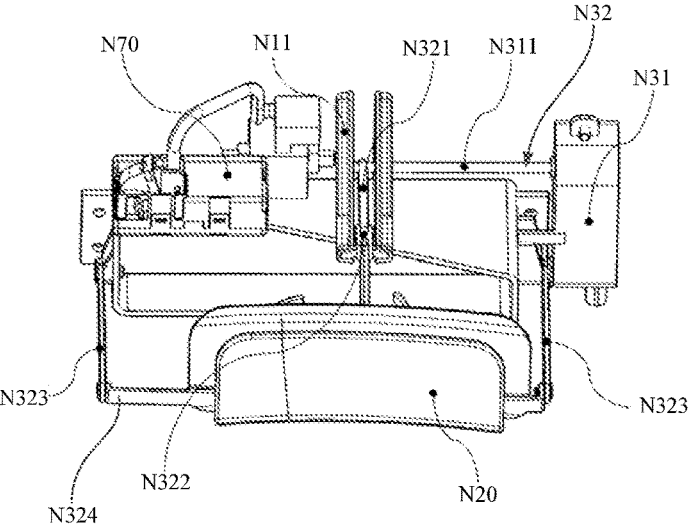
FIG. 3C is a schematic structural diagram of connection of a cover plate and a cover plate driving mechanism in an embodiment of the present invention.
Figure 3D:
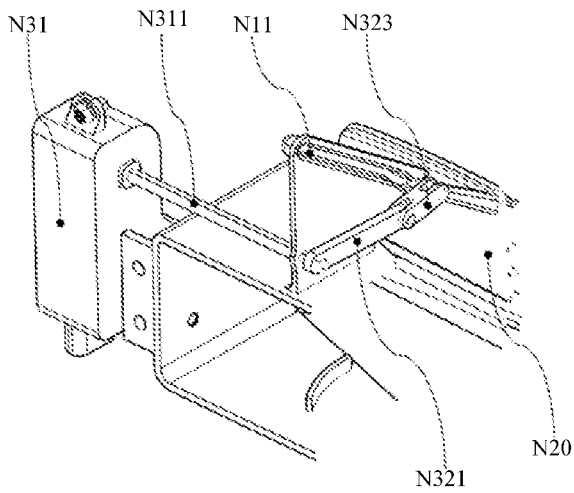
FIG. 3D is a schematic partial structural diagram of the connection of the cover plate and the cover plate driving mechanism in an embodiment of the present invention.

FIG. 3C is a schematic structural diagram of connection of the cover plate and the cover plate driving mechanism in an embodiment of the present invention; FIG. 3D is a schematic partial structural diagram of the connection of the cover plate and the cover plate driving mechanism in an embodiment of the present invention. In an embodiment, as shown in FIGS. 3C and 3D, the cover plate driving mechanism N30 may include a cover plate driving motor N31 and a moving mechanism N32, one end of the moving mechanism N32 is connected with the cover plate driving motor N31 and driven by the cover plate driving motor N31, the other end of the moving mechanism N32 is connected with the cover plate N20, and the moving mechanism N32 is driven by the cover plate driving motor N31 to drive the cover plate N20 to move along the sliding groove N11 and meanwhile drive the cover plate N20 to rotate to open and close the first opening N201. The radar assembly N40 is configured to controllably extend out of the fender N200 from the first opening N201 when the first opening N201 is opened.

In an embodiment, due to existence of the first opening N201, the cover plate N20 and the cover plate driving mechanism N30 can open and close the first opening N201, such that the radar assembly N40 can extend outside the fender N200 only when the first opening N201 is opened, and therefore, through the design of the cover plate N20 and the cover plate driving mechanism N30, when the radar assembly N40 is required to extend out of the fender N200 from the first opening N201, the cover plate driving mechanism N30 drives the cover plate N20 to close the first opening N201, and normal use of the radar assembly N40 is not affected. When the radar assembly N40 retracts into the fender N200 from the first opening N201, the cover plate driving mechanism N30 drives the cover plate N20 to close the first opening N201, so as to avoid that the radar assembly N40 is directly exposed for a long time and thus contaminated by external dust or sewage, thus influencing use; meanwhile, the cover plate N20 also prevents the radar assembly from being rubbed and bumped by the outside, thus preventing the radar assembly N40 from being damaged, and prolonging a service life of the radar assembly N40.

As a specific embodiment of the present invention, the moving mechanism N32 may include a crank N321 and a first connecting rod N322. The crank N321 has one end fixedly connected with an output shaft N311 of the cover plate driving motor N31 to rotate with the output shaft N311. The first connecting rod N322 has one end rotatably connected with an end of the crank N321 apart from the output shaft N311 and the other end connected with the cover plate N20, and a rotating axis of the first connecting rod N322 is parallel to a rotating axis of the crank N321. A side edge of the first connecting rod N322 is provided with a cam, the cam is clamped at the sliding groove N11, and when the crank N321 rotates with the output shaft N311, the cam moves along the sliding groove N11, such that the cover plate N20 runs along a track parallel to the sliding groove N11.

The output shaft N311 of the cover plate driving motor N31 in the present embodiment is directly and fixedly connected with one end of the crank N321, and the crank N321 rotates with the output shaft N311 of the cover plate driving motor N31. One end of the first connecting rod N322 is rotatably connected with the other end of the crank N321, and the other end of the first connecting rod N322 is connected with the cover plate N20, such that when the output shaft N311 of the cover plate driving motor N31 rotates, the cover plate N20 is driven by the crank N321 and the first connecting rod N322 to move. Since the cam is provided at the first connecting rod N322 and restricted by the sliding groove N11, the cover plate N20 also moves along a track parallel to the sliding groove N11. When the sliding groove N11 just extends from the first opening N201 into the fender N200, the cover plate N20 is driven by the crank N321 and the first connecting rod N322 to reciprocate between the first opening N201 and the inside of the fender N200.

The cover plate driving mechanism N30 in the present embodiment only includes the cover plate driving motor N31 and the moving mechanism N32, the moving mechanism N32 only includes the crank N321 and the first connecting rod N322, the cover plate driving mechanism N30 has a simple structure, a single driving force and a simple moving process, and the purpose that the cover plate N20 opens and closes the first opening N201 can be achieved.

In an embodiment, two sliding grooves N11 are provided, the two sliding grooves N11 are oppositely arranged in a mirrored mode, and the first connecting rod N322 is located between the two sliding grooves N11. Two cams are provided and arranged on two opposite side surfaces of the first connecting rod N322 facing the two sliding grooves N11, and each cam is provided corresponding to one sliding groove N11.

Specifically, in the present embodiment, the cams are provided on left and right sides of the first connecting rod N322, and the sliding grooves N11 are also located on the left and right sides of the first connecting rod N322. The cams are clamped into the sliding grooves N11. When the first connecting rod N322 moves, positions of the first connecting rod N322 provided with the cams can only move along the sliding grooves N11 under an action of the sliding grooves N11. The design of the two sliding grooves N11 and the two cams in the present embodiment is more beneficial to stability of movement of the cover plate N20, and avoids tilting or jamming in the movement process.

In fact, in the actual radar integrated system N100 with a cover plate capable of being turned over for opening and closing, the fender N200 does not have a straight fender structure, and a bent structure may exist. When the cover plate N20 is driven to move along the sliding groove N11, since the cover plate N20 has a certain size, interference friction, or the like, with other peripheral components is prone to occurring. Therefore, in practical use, the cover plate N20 is also required to rotate during translation, so as to facilitate opening and closing the first opening N201 by the cover plate N20.

As a specific embodiment of the present invention, the moving mechanism N32 may further include a second connecting rod N323, one end of the second connecting rod N323 is rotatably connected with the fixed frame, and the other end of the second connecting rod is rotatably connected with the cover plate N20. A second axis of the second connecting rod N323 is parallel to a first axis of the first connecting rod N322, such that the cover plate N20 rotates under an action of the second connecting rod N323 when the cover plate N20 moves along the sliding groove N11 under driving of the cover plate driving motor N31; the second axis is an axis of a rotating shaft at a rotatable connection position of the second connecting rod N323 and the cover plate N20, and the first axis is an axis of a rotating shaft at a rotatable connection position of the first connecting rod N322 and the cover plate N20.

Since the cover plate N20 is driven by the second connecting rod N323 to be turned over in the present embodiment, the cover plate N20 cannot move if the first axis coincides with the second axis, and therefore, the first axis and the second axis have to be provided in parallel in the present embodiment. In the present embodiment, only one second connecting rod N323 is connected at the cover plate N20, and under a combined action of the first connecting rod N322 and the second connecting rod N323, the cover plate N20 is driven by the cover plate driving motor N31 to be turned over while moving along the track parallel to the sliding groove N11, such that the cover plate N20 conveniently opens and closes the first opening N201. As a specific embodiment of the present invention, the radar integrated system N100 with a cover plate capable of being turned over for opening and closing may further include a hinge rod N324 which is fixedly connected with the cover plate N20 and extends along a direction parallel to the axis of the rotating shaft of the second connecting rod N323, and one end portion of the second connecting rod N323 is rotatably connected with one end of the hinge rod N324, such that the cover plate N20 and the hinge rod N324 rotate together relative to the second connecting rod N323. The hinge rod N324 is located on one side of the cover plate N20, such that when the cover plate N20 closes the first opening N201, the hinge rod N324 is located inside the fender N200.

In an embodiment, two second connecting rods N323 may be provided, the two second connecting rods N323 are parallel to each other and are located at two ends of the hinge rod N324 respectively, and the two second connecting rods N323 and the hinge rod N324 form a U-shaped structure.

In the present embodiment, the hinge rod N324 is laterally provided on the inner side of the cover plate N20, the two second connecting rods N323 are rotatably connected to left and right end portions of the hinge rod N324 respectively, the first connecting rod N322 is rotatably connected to the middle of the inner side of the cover plate N20, and a plane where the first connecting rod N322 is located is parallel to a plane where the second connecting rods N323 are located. The cover plate N20 is more stable in the process of movement and turnover through the design of the two connecting rods.

Figure 3E:
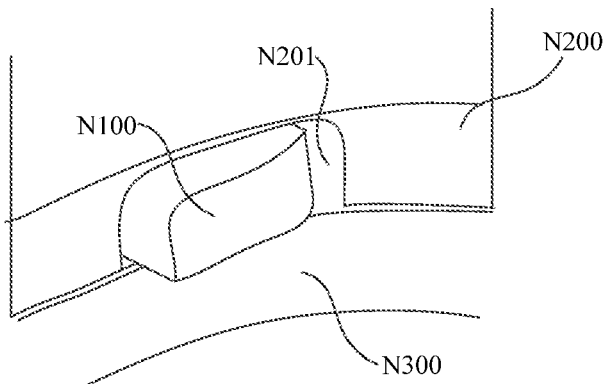
FIG. 3E is a schematic structural diagram in which the cover plate opens a first opening and a radar device extends out of the fender from the first opening in an embodiment of the present invention.
Figure 3F:
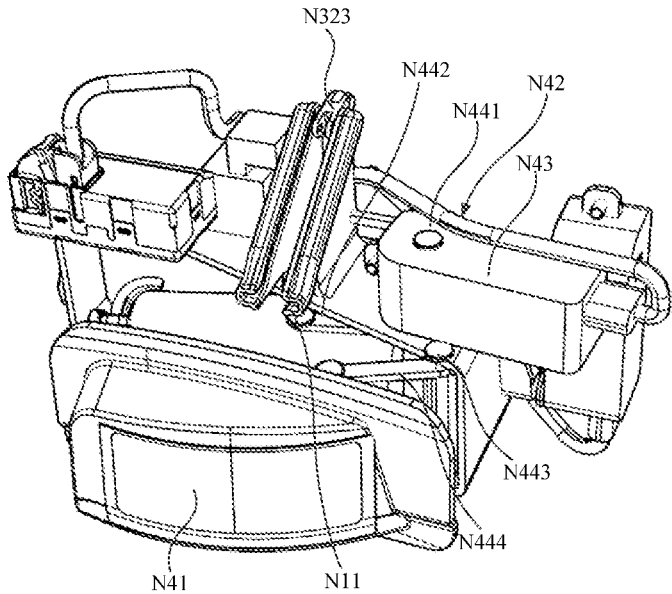
FIG. 3F is a schematic structural diagram of connection of the radar device and a radar driving mechanism in an embodiment of the present invention.
Figure 3G:
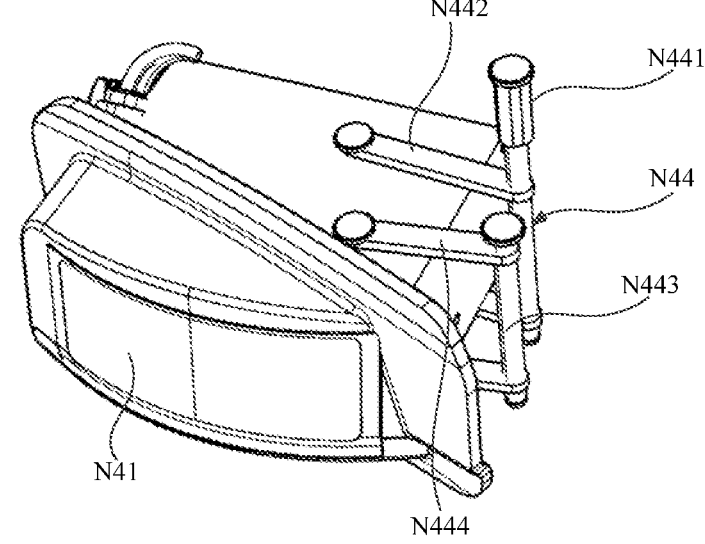
FIG. 3G is a schematic structural diagram of connection of the radar device and a double-connecting-rod mechanism in the embodiment of the present invention.

FIG. 3E is a schematic structural diagram in which the cover plate opens the first opening and a radar device extends out of the fender from the first opening in an embodiment of the present invention; FIG. 3F is a schematic structural diagram of connection of the radar device and a radar driving mechanism in an embodiment of the present invention; FIG. 3G is a schematic structural diagram of connection of the radar device and a double-connecting-rod mechanism in an embodiment of the present invention. As a specific embodiment of the present invention, as shown in FIGS. 3F and 3G, the radar assembly N40 of the radar integrated system N100 with a cover plate capable of being turned over for opening and closing may include a radar device N41 and a radar driving mechanism N42. The radar device N41 is located near the first opening N201. The radar driving mechanism N42 may include a radar driving motor N43 and a double-connecting-rod mechanism, the double-connecting-rod mechanism has one end rotatably connected with the radar device N41 and the other end rotatably connected with the fender N200, and when the radar driving motor N43 controllably drives the double-connecting-rod mechanism to move, the double-connecting-rod mechanism drives the radar device N41 to rotate relative to the fender N200 to extend out of or retract into the fender N200 from the first opening N201.

In the present embodiment, the radar integrated system N100 with a cover plate capable of being turned over for opening and closing can include the radar device N41 and the radar driving mechanism N42, the radar driving mechanism N42 can include the radar driving motor N43 and the double-connecting-rod mechanism N44, the double-connecting-rod mechanism N44 is driven to move by the radar driving motor N43, and the double-connecting-rod mechanism N44 drives the radar device N41 to move, such that the radar device N41 can rotate relative to the fender N200 to extend out of or retract into the fender N200 from the first opening N201.

As a specific embodiment of the present invention, the double-connecting-rod mechanism N44 may include a first rotating shaft N441, a first swing arm N442, a second rotating shaft N443 and a second swing arm N444. The first rotating shaft N441 is rotatably connected with the fender N200, and the first rotating shaft N441 is connected with the radar driving motor N43 to rotate under driving of the radar driving motor N43. The first swing arm N442 has one end fixedly connected with the first rotating shaft N441 to rotate around an axis of the first rotating shaft N441 when the first rotating shaft N441 rotates, and the other end rotatably connected with the radar device N41. The second rotating shaft N443 is rotatably connected with the fender N200 and provided in parallel with the first rotating shaft N441. The second swing arm N444 has one end rotatably connected with the radar device N41 and the other end fixedly connected with the second rotating shaft N443. When the first rotating shaft N441 is driven by the radar driving motor N43 to rotate, the radar device N41 is driven to be turned over under a combined action of the first swing arm N442, the second swing arm N444 and the second rotating shaft N443.

In the present embodiment, the double-connecting-rod mechanism N44 only includes the first rotating shaft N441, the first swing arm N442, the second rotating shaft N443 and the second swing arm N444, and has a simple structure and a clear movement process. Furthermore, the double-connecting-rod mechanism N44 is connected with the radar device N41, and the double-connecting-rod mechanism N44 can drive the radar device N41 to move under driving of the radar driving motor N43, thus realizing simultaneous movement and rotation of the radar device N41, ensuring that the detection angle of the radar device N41 meets requirements, and meanwhile achieving the purpose of hiding the radar device N41.

As a specific embodiment of the present invention, two first swing arms N442 are provided, the two first swing arms N442 are arranged in parallel, and the two first swing arms N442 are rotatably connected with an upper side surface and a lower side surface of the radar device N41 respectively.

In an embodiment, the two first swing arms N442 are both fixedly connected with the first rotating shaft N441 and arranged up and down. When the first rotating shaft N441 rotates, the two first swing arms N442 move simultaneously, thereby pushing the radar device N41 to move.

As a specific embodiment of the present invention, two second swing arms N444 are provided, the two second swing arms N444 are arranged in parallel, and the two second swing arms N444 are rotatably connected with the upper side surface and the lower side surface of the radar device N41 respectively.

In an embodiment, the two second swing arms N444 are located on sides of the two first swing arms N442 respectively, and when the first swing arms N442 are driven by a driving device to move, the first swing arms N442 drive the radar device N41 to move, the radar device N41 then drives the second swing arms N444 to move, and the second swing arms N444 rotate relative to the second rotating shaft N443, thereby realizing turnover of the radar device N41.

As a specific embodiment of the present invention, a length of the second swing arm N444 is different from a length of the first swing arm N442, or a distance between first rotating shaft N441 and the second rotating shaft N443 is different from a target distance, and the target distance is a distance between a hinged point of the first swing arm N442 and the radar mechanism and a hinged point of the second swing arm N444 and the radar mechanism.

Since a double-hinge mechanism is finally required to realize the turnover of the radar device N41, when the length of the first swing arm N442 is equal to the length of the second swing arm N444, the distance between the first rotating shaft N441 and the second rotating shaft N443 cannot be equal to the target distance. Or, when the distance between the first rotating shaft N441 and the second rotating shaft N443 is equal to the target distance, the length of the first swing arm N442 cannot be equal to the length of the second swing arm N444. If the length of the first swing arm N442 is equal to the length of the second swing arm N444 and the distance between the first rotating shaft N441 and the second rotating shaft N443 is equal to the target distance, the radar device N41 can only translate but not rotate.

Furthermore, the motion track of the radar device N41 is related to not only the lengths of the swing arms and a distance between end portions of the swing arms, but also relative positions of the radar device N41, the rotating shaft and the first opening N201. For example, in the present embodiment, the radar device N41 is located on a left side of the first rotating shaft N441, and when the first rotating shaft N441 rotates counterclockwise, the radar device N41 moves towards the outside of the fender N200 as a whole, and when the first rotating shaft N441 rotates clockwise, the radar device N41 moves towards the inside of the fender N200 as a whole. If the radar device N41 is located on a right side of the first rotating shaft N441, when the first rotating shaft N441 rotates counterclockwise, the radar device N41 moves towards the inside of the fender N200 as a whole, and when the first rotating shaft N441 rotates clockwise, the radar device N41 moves towards the outside of the fender N200 as a whole.

In an embodiment, the length of the first swing arm N442 is greater than the length of the second swing arm N444, and the distance between the first rotating shaft N441 and the second rotating shaft N443 is smaller than the target distance.

In the present embodiment, since the length of the first swing arm N442 is greater than the length of the second swing arm N444, when the first swing arm N442 rotates counterclockwise as viewed from top to bottom, the radar device N41 moves outwards from the inside of the fender N200, and meanwhile, the radar device N41 also rotates counterclockwise as viewed from top to bottom.

As a specific embodiment of the present invention, the radar integrated system N100 with a cover plate capable of being turned over for opening and closing may further include a housing N50. The housing N50 is provided with a second opening N51, the housing N50 is fixedly provided on the inner side of the fender N200, and the second opening N51 is provided corresponding to the first opening N201. The fixed frame N10 is provided in the housing N50, and the first rotating shaft N441 and the second rotating shaft N443 are rotatably connected with the fixed frame N10.

In the present embodiment, since the fixed frame N10 is provided in the housing N50 and the housing N50 is fixedly provided at the fender N200, rotatable connection of the first rotating shaft N441 and the second rotating shaft N443 relative to the fixed frame N10 equivalently means that the first rotating shaft N441 and the second rotating shaft N443 are rotatably connected with the fender N200 through the fixed frame N10 and the housing N50.

Except for the second opening N51, the housing N50 in the present embodiment has a sealed structure at other parts when the housing N50 and the fixed frame N10 are combined together. The housing N50 is provided at a position where the first opening N201 and the second opening N51 are fitted with each other and sealed, such that when the cover plate N20 is located at the first opening N201, external dust or sewage cannot enter the housing N50, and no component in the housing N50 can be contaminated, thereby avoiding influencing the components in the housing N50 and prolonging the service life thereof.

As a specific embodiment of the present invention, the radar integrated system N100 with a cover plate capable of being turned over for opening and closing may further include a cleaning device (not shown) which is provided in the housing N50, located on a side of the radar device N41 apart from the fender N200, and configured to be controllably started to clean the radar device N41.

In the present embodiment, when retracting into the fender N200, the radar device N41 also rotates to the inner side of the fender N200. If dirtied by dust, sewage, or the like, in a use process, the radar device N41 can be cleaned by the cleaning device, thereby ensuring that the radar device N41 can better detect an environment around the vehicle, and avoiding erroneous judgment, or the like.

As a specific embodiment of the present invention, the cleaning device may include a water storage box, a duct and a nozzle. The water storage box is configured to store cleaning liquid required for cleaning the radar device N41. The duct has one end communicated with the water storage box and located in the cleaning liquid, and a water pump is further provided at the duct. The nozzle is connected with the other end of the duct, and an electromagnetic valve is provided at the nozzle. The water pump and the electromagnetic valve are controllably started to spray the cleaning liquid in the water storage box at the radar device N41.

In the present embodiment, the nozzle faces the radar device N41, and when the radar device N41 is required to be cleaned, the radar device N41 may further rotate to the position facing the nozzle, so as to ensure that the liquid sprayed from the nozzle can smoothly reach the radar device N41.

When the radar integrated system N100 with a cover plate capable of being turned over for opening and closing according to the present embodiment is assembled and mounted, the cover plate N20 and the cover plate driving mechanism N30 are set to be in an open state by an apparatus, and then, a worker lifts the radar device N41 from bottom to top to a mounting position by lifting tooling and temporarily fixes the radar device N41 to a vehicle body shotgun by a pre-hanging structure, and then, the worker connects a front cabin wiring harness with a wiring harness of the radar device N41, and then adaptively fastens the radar device N41 to the vehicle body shotgun by adaptive nuts, the cover plate N20 is closed by electrifying the apparatus, and finally, the worker adjusts the adaptive nuts to adjust a gap surface difference between the cover plate N20 and the fender N200.

As an embodiment of the present invention, the present embodiment further provides a vehicle which may include the above radar integrated system N100 with a cover plate capable of being turned over for opening and closing.

Figure 4A:
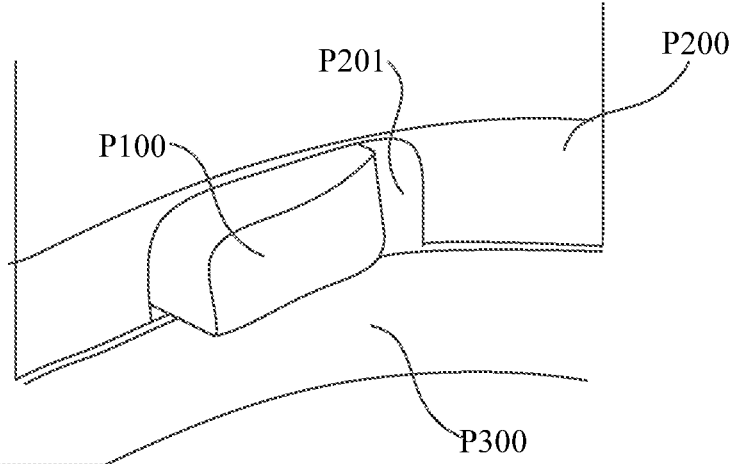
FIG. 4A is a schematic structural diagram in which a cover plate opens a first opening and a radar device extends out of a fender from the first opening in an embodiment of the present invention.

In an embodiment, FIG. 4A is a schematic structural diagram in which a cover plate opens a first opening and a radar device extends out of a fender from the first opening in an embodiment of the present invention.

As an embodiment of another radar integrated system according to the present invention, as shown in FIG. 4A, the present embodiment provides a radar integrated system P100 with a radar capable of being turned over, which is provided at a fender P200 of a vehicle. In an embodiment, the vehicle has plural fenders P200, and in a typical car, four fenders P200 are provided and located above four tires respectively. A first opening P201 is provided at each fender P200, and the first opening is located above a wheel brow P300. One radar integrated system P100 with a radar capable of being turned over may be provided at each first opening P201. The following description is given by taking one radar integrated system P100 with a radar capable of being turned over as an example.

Figure 4B:
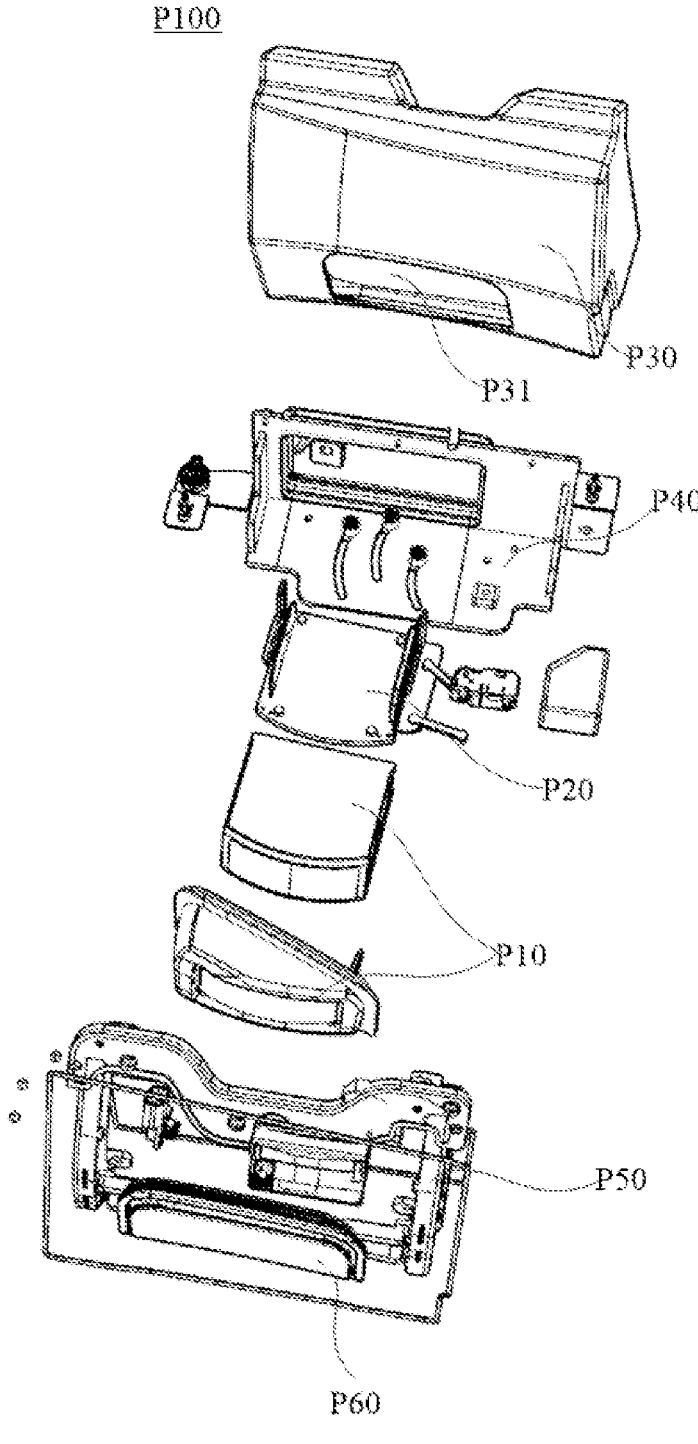
FIG. 4B is a schematic exploded diagram of a radar integrated system with a radar capable of being turned over according to an embodiment of the present invention.
Figure 4C:
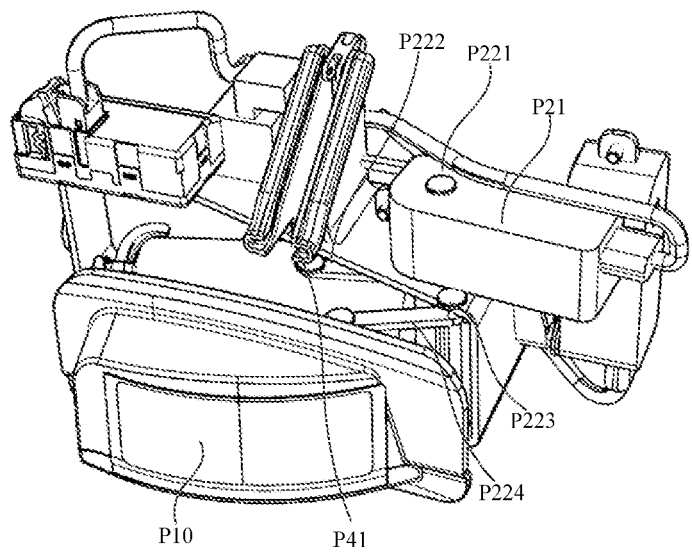
FIG. 4C is a schematic structural diagram of connection of the radar device and a radar driving mechanism in an embodiment of the present invention.
Figure 4D:
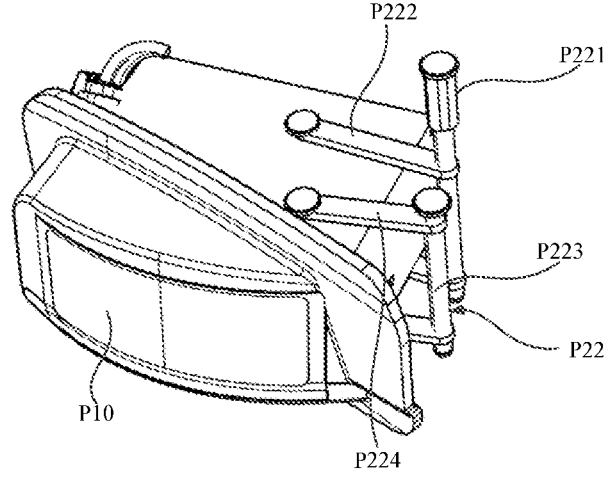
FIG. 4D is a schematic structural diagram of connection of the radar device and a double-connecting-rod mechanism in an embodiment of the present invention.

FIG. 4B is a schematic exploded diagram of the radar integrated system with a radar capable of being turned over according to an embodiment of the present invention; FIG. 4C is a schematic structural diagram of connection of the radar device and a radar driving mechanism in an embodiment of the present invention; FIG. 4D is a schematic structural diagram of connection of the radar device and a double-connecting-rod mechanism in an embodiment of the present invention. In an embodiment, as shown in FIGS. 4B to 4D, the radar integrated system P100 with a radar capable of being turned over may include a radar device P10 and a radar driving mechanism P20. The radar device P10 is located near the first opening P201. The radar driving mechanism P20 may include a radar driving motor P21 and a double-connecting-rod mechanism P22, the double-connecting-rod mechanism P22 has one end rotatably connected with the radar device P10 and the other end rotatably connected with the fender P200, and when the radar driving motor P21 controllably drives the double-connecting-rod mechanism P22 to move, the double-connecting-rod mechanism P22 drives the radar device P10 to be turned over relative to the fender P200 to extend out of or retract into the fender P200 from the first opening P201.

In the present embodiment, the radar integrated system P100 with a radar capable of being turned over can include the radar device P10 and the radar driving mechanism P20, the radar driving mechanism P20 can include the radar driving motor P21 and the double-connecting-rod mechanism P22, the double-connecting-rod mechanism P22 is driven to move by the radar driving motor P21, and the double-connecting-rod mechanism P22 drives the radar device P10 to move, such that the radar device P10 can rotate relative to the fender P200 to extend out of or retract into the fender P200 from the first opening P201. Therefore, in the present embodiment, the radar device P10 is driven to move and rotate by the radar driving motor P21, and when the radar device P10 is located at the first opening P201, the radar device P10 may be driven to rotate by the radar driving motor P21, thereby increasing a detection angle of the radar device P10. Furthermore, the radar driving motor P21 can also allow the radar device P10 to extend out of the fender P200 from the first opening P201 when required and retract into the fender P200 from the first opening P201 when not required, thereby avoiding that the radar device P10 is exposed outside the fender P200 all the time and dirtied to affect use and sensitivity.

As a specific embodiment of the present invention, the double-connecting-rod mechanism P22 may include a first rotating shaft P221, a first swing arm P222, a second rotating shaft P223 and a second swing arm P224. The first rotating shaft P221 is rotatably connected with the fender P200, and the first rotating shaft P221 is connected with the radar driving motor P21 to rotate under driving of the radar driving motor P21. The first swing arm P222 has one end fixedly connected with the first rotating shaft P221 to rotate around an axis of the first rotating shaft P221 when the first rotating shaft P221 rotates, and the other end rotatably connected with the radar device P10. The second rotating shaft P223 is rotatably connected with the fender P200 and provided in parallel with the first rotating shaft P221. The second swing arm P224 has one end rotatably connected with the radar device P10 and the other end fixedly connected with the second rotating shaft P223. When the first rotating shaft P221 is driven by the radar driving motor P21 to rotate, the radar device P10 is driven to be turned over under a combined action of the first swing arm P222, the second swing arm P224 and the second rotating shaft P223.

In the present embodiment, the double-connecting-rod mechanism P22 only includes the first rotating shaft P221, the first swing arm P222, the second rotating shaft P223 and the second swing arm P224, and has a simple structure and a clear movement process. Furthermore, the double-connecting-rod mechanism P22 is connected with the radar device P10, and the double-connecting-rod mechanism P22 can drive the radar device P10 to move under driving of the radar driving motor P21, thus realizing simultaneous movement and rotation of the radar device P10, ensuring that the detection angle of the radar device P10 meets requirements, and meanwhile achieving the purpose of hiding the radar device P10.

As a specific embodiment of the present invention, two first swing arms P222 are provided, the two first swing arms P222 are arranged in parallel, and the two first swing arms P222 are rotatably connected with an upper side surface and a lower side surface of the radar device P10 respectively.

In an embodiment, the two first swing arms P222 are both fixedly connected with the first rotating shaft P221 and arranged up and down. When the first rotating shaft P221 rotates, the two first swing arms P222 move simultaneously, thereby pushing the radar device P10 to move.

As a specific embodiment of the present invention, two second swing arms P224 are provided, the two second swing arms P224 are arranged in parallel, and the two second swing arms P224 are rotatably connected with the upper side surface and the lower side surface of the radar device P10 respectively.

In an embodiment, the two second swing arms P224 are located on sides of the two first swing arms P222 respectively, and when the first swing arms P222 are driven by a driving device to move, the first swing arms P222 drive the radar device P10 to move, the radar device P10 then drives the second swing arms P224 to move, and the second swing arms P224 rotate relative to the second rotating shaft P223, thereby realizing turnover of the radar device P10.

As a specific embodiment of the present invention, a length of the second swing arm P224 is different from a length of the first swing arm P222, or a distance between the first rotating shaft P221 and the second rotating shaft P223 is different from a target distance, and the target distance is a distance between a hinged point of the first swing arm P222 and the radar mechanism and a hinged point of the second swing arm P224 and the radar mechanism.

Since a double-hinge mechanism is finally required to realize the turnover of the radar device P10, when the length of the first swing arm P222 is equal to the length of the second swing arm P224, the distance between the first rotating shaft P221 and the second rotating shaft P223 cannot be equal to the target distance. Or, when the distance between the first rotating shaft P221 and the second rotating shaft P223 is equal to the target distance, the length of the first swing arm P222 cannot be equal to the length of the second swing arm P224. If the length of the first swing arm P222 is equal to the length of the second swing arm P224 and the distance between the first rotating shaft P221 and the second rotating shaft P223 is equal to the target distance, the radar device P10 can only translate but not rotate.

Furthermore, the motion track of the radar device P10 is related to not only the lengths of the swing arms and a distance between end portions of the swing arms, but also relative positions of the radar device P10, the rotating shaft and the first opening P201. For example, in the present embodiment, the radar device P10 is located on a left side of the first rotating shaft P221, and when the first rotating shaft P221 rotates counterclockwise, the radar device P10 moves towards the outside of the fender P200 as a whole, and when the first rotating shaft P221 rotates clockwise, the radar device P10 moves towards the inside of the fender P200 as a whole. If the radar device P10 is located on a right side of the first rotating shaft P221, when the first rotating shaft P221 rotates counterclockwise, the radar device P10 moves towards the inside of the fender P200 as a whole, and when the first rotating shaft P221 rotates clockwise, the radar device P10 moves towards the outside of the fender P200 as a whole.

In an embodiment, the length of the first swing arm P222 is greater than the length of the second swing arm P224, and the distance between the first rotating shaft P221 and the second rotating shaft P223 is smaller than the target distance.

In the present embodiment, since the length of the first swing arm P222 is greater than the length of the second swing arm P224, when the first swing arm P222 rotates counterclockwise as viewed from top to bottom, the radar device P10 moves outwards from the inside of the fender P200, and meanwhile, the radar device P10 also rotates counterclockwise as viewed from top to bottom.

As a specific embodiment of the present invention, the radar integrated system P100 with a radar capable of being turned over may further include a housing P30 and a fixed frame P40. The housing P30 is provided with a second opening P31, the housing P30 is fixedly provided on the inner side of the fender P200, and the second opening P31 is provided corresponding to the first opening P201. The fixed frame P40 is provided in the housing P30, and the first rotating shaft P221 and the second rotating shaft P223 are rotatably connected with the fixed frame P40.

In the present embodiment, since the fixed frame P40 is provided in the housing P30 and the housing P30 is fixedly provided at the fender P200, rotatable connection of the first rotating shaft P221 and the second rotating shaft P223 relative to the fixed frame P40 equivalently means that the first rotating shaft P221 and the second rotating shaft P223 are rotatably connected with the fender P200 through the fixed frame P40 and the housing P30.

Figure 4E:
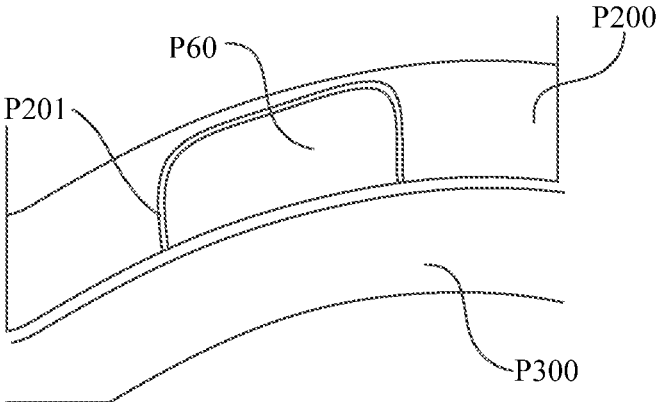
FIG. 4E is a schematic structural diagram of the radar integrated system with a radar capable of being turned over according to an embodiment of the present invention provided at the fender.
Figure 4F:
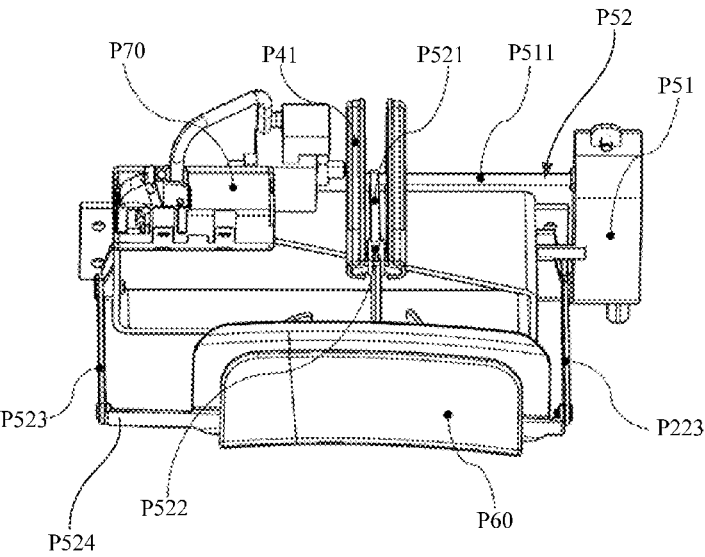
FIG. 4F is a schematic structural diagram of connection of the cover plate and a cover plate driving mechanism in an embodiment of the present invention.

FIG. 4E is a schematic structural diagram of the radar integrated system with a radar capable of being turned over according to an embodiment of the present invention provided at the fender; FIG. 4F is a schematic structural diagram of connection of the cover plate and a cover plate driving mechanism in an embodiment of the present invention. In an embodiment, as shown in FIGS. 4E and 4F, the radar integrated system P100 with a radar capable of being turned over according to the present embodiment may further include the cover plate P60 and the cover plate driving mechanism P50. The cover plate driving mechanism P50 is located in the housing P30, and the cover plate driving mechanism P50 is connected with the cover plate P60 and configured to controllably move to drive the cover plate P60 to open or close the first opening P201.

In an embodiment, as shown in FIGS. 4E and 4F, a sliding groove P41 is provided at the fixed frame P40. The cover plate driving mechanism P50 includes a cover plate driving motor P51 and a moving mechanism P52, one end of the moving mechanism P52 is connected with the cover plate driving motor P51 and driven by the cover plate driving motor P51, the other end of the moving mechanism P52 is connected with the cover plate P60, and the moving mechanism N32 is driven by the cover plate driving motor P51 to drive the cover plate P60 to move along the sliding groove P41 and meanwhile drive the cover plate P60 to rotate to open and close the first opening P201.

In an embodiment, due to existence of the first opening P201, when the radar device P10 is driven by the radar driving mechanism P20 to move to the inner side of the fender P200, some dust, or the like, can still enter to reach the radar device P10 from the first opening P201, and therefore, through a design of the cover plate P60 and the cover plate driving mechanism P50 in the present embodiment, when the radar device P10 is required to extend out of the fender P200 from the first opening P201, the cover plate driving mechanism P50 drives the cover plate P60 to close the first opening P201, and when the radar device P10 retracts into the fender P200 from the first opening P201, the cover plate driving mechanism P50 drives the cover plate P60 to close the first opening P201, such that normal use and detection of the radar device P10 are not hindered, and the radar device P10 is prevented from being contaminated by dust or sewage entering the fender P200 from the first opening P201 in an unused state.

As a specific embodiment of the present invention, the moving mechanism P52 may include a crank P521 and a first connecting rod P522. The crank P521 has one end fixedly connected with an output shaft P511 of the cover plate driving motor P51 to rotate with the output shaft P511. The first connecting rod P522 has one end rotatably connected with an end of the crank P521 apart from the output shaft P511 and the other end connected with the cover plate P60, and a rotating axis of the first connecting rod P522 is parallel to a rotating axis of the crank P521. A side edge of the first connecting rod P522 is provided with a cam, the cam is clamped at the sliding groove P41, and when the crank P521 rotates with the output shaft P511, the cam moves along the sliding groove P41, such that the cover plate P60 runs along a track parallel to the sliding groove P41.

The output shaft P511 of the cover plate driving motor P51 in the present embodiment is directly and fixedly connected with one end of the crank P521, and the crank P521 rotates with the output shaft P511. One end of the first connecting rod P522 is rotatably connected with the other end of the crank P521, and the other end of the first connecting rod P522 is connected with the cover plate P60, such that when the output shaft P511 of the cover plate driving motor P51 rotates, the cover plate M10 is driven by the crank P521 and the first connecting rod P522 to move. Since the cam is provided at the first connecting rod P522 and restricted by the sliding groove P41, the cover plate P60 also moves along a track parallel to the sliding groove P41. When the sliding groove P41 just extends from the first opening P201 into the fender P200, the cover plate P60 is driven by the crank P521 and the first connecting rod P522 to reciprocate between the first opening P201 and the inside of the fender P200.

In an embodiment, two sliding grooves P41 are provided, the two sliding grooves P41 are oppositely arranged in a mirrored mode, and the first connecting rod P522 is located between the two sliding grooves P41. Two cams are provided and arranged on two opposite side surfaces of the first connecting rod P522 facing the two sliding grooves P41, and each cam is provided corresponding to one sliding groove P41.

The design of the two sliding grooves P41 and the two cams in the present embodiment is more beneficial to stability of movement of the cover plate P60, and avoids tilting or jamming in the movement process.

As a specific embodiment of the present invention, the moving mechanism P52 may further include a second connecting rod P523, one end of the second connecting rod P523 is rotatably connected with the fixed frame P40, and the other end of the second connecting rod is rotatably connected with the cover plate P60. A second axis of the second connecting rod P523 is parallel to a first axis of the first connecting rod P522, such that the cover plate P60 rotates under an action of the second connecting rod P523 when the cover plate P60 moves along the sliding groove P41 under driving of the cover plate driving motor P51; the second axis is an axis of a rotating shaft at a rotatable connection position of the second connecting rod P523 and the cover plate P60, and the first axis is an axis of a rotating shaft at a rotatable connection position of the first connecting rod P522 and the cover plate P60.

Since the cover plate P60 is driven by the second connecting rod P523 to be turned over in the present embodiment, the cover plate P60 cannot move if the first axis coincides with the second axis, and therefore, the first axis and the second axis have to be provided in parallel in the present embodiment.

In the present embodiment, under a combined action of the first connecting rod P522 and the second connecting rod P523, the cover plate P60 is driven by the cover plate driving motor P51 to be turned over while moving along the track parallel to the sliding groove P41, such that the cover plate P60 conveniently opens and closes the first opening P201.

As a specific embodiment of the present invention, the radar integrated system P100 with a radar capable of being turned over may further include a hinge rod P524 which is fixedly connected with the cover plate P60 and extends along a direction parallel to the axis of the rotating shaft of the second connecting rod P523, and one end portion of the second connecting rod P523 is rotatably connected with one end of the hinge rod P524, such that the cover plate P60 and the hinge rod P524 rotate together relative to the second connecting rod P523. The hinge rod P524 is located on one side of the cover plate P60, such that when the cover plate P60 closes the first opening P201, the hinge rod P524 is located inside the fender P200.

In an embodiment, two second connecting rods P523 are provided, the two second connecting rods P523 are parallel to each other and are located at two ends of the hinge rod P524 respectively, and the two second connecting rods P523 and the hinge rod P524 form a U-shaped structure.

In the present embodiment, the hinge rod P524 is laterally provided on the inner side of the cover plate P60, the two second connecting rods P523 are rotatably connected to left and right end portions of the hinge rod P524 respectively, the first connecting rod P522 is rotatably connected to the middle of the inner side of the cover plate P60, and a plane where the first connecting rod P522 is located is parallel to a plane where the second connecting rods P523 are located. The cover plate P60 is more stable in the process of movement and turnover through the design of the two connecting rods.

Figure 4G:
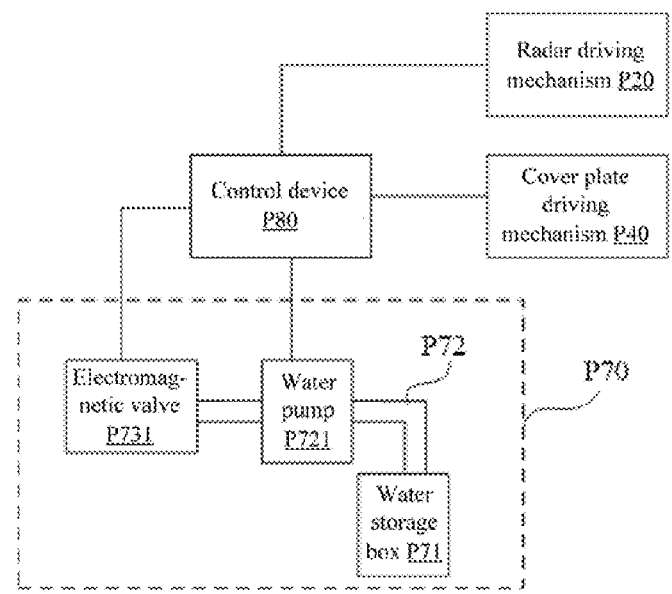
FIG. 4G is a schematic structural diagram of connection of a control device and controlled devices in an embodiment of the present invention.

FIG. 4G is a schematic structural diagram of connection of a control device and controlled devices in an embodiment of the present invention. As a specific embodiment of the present invention, as shown in FIG. 4G, the radar integrated system P100 with a radar capable of being turned over may further include a cleaning device P70 provided in the housing P30, located on a side of the radar device P10 apart from the fender P200, and configured to be controllably started to clean the radar device P10.

In the present embodiment, when retracting into the fender P200, the radar device P10 also rotates to the inner side of the fender P200. If dirtied by dust, sewage, or the like, in a use process, the radar device P10 can be cleaned by the cleaning device P70, thereby ensuring that the radar device P10 can better detect an environment around the vehicle, and avoiding erroneous judgment, or the like.

As a specific embodiment of the present invention, the cleaning device P70 may include a water storage box P71, a duct P72 and a nozzle (not shown). The water storage box P71 is configured to store cleaning liquid required for cleaning the radar device P10. The duct P72 has one end communicated with the water storage box P71 and located in the cleaning liquid. The nozzle is connected with the other end of the duct P72, a water pump P721 and an electromagnetic valve P731 are provided at the nozzle, the water pump P721 and the electromagnetic valve P731 are controllably started to spray the cleaning liquid in the water storage box P71 at the radar device P10.

In the present embodiment, the nozzle faces the radar device P10, and when the radar device P10 is required to be cleaned, the radar device P10 may further rotate to a position facing the nozzle, so as to ensure that the liquid sprayed from the nozzle can smoothly reach the radar device P10.

In an embodiment, the radar integrated system may further include a control device P80, and the control device P80 receives instructions to control the movement of the radar driving mechanism P20, the cover plate driving mechanism P50 and the cleaning device P70.

As a specific embodiment of the present invention, the present embodiment further provides a vehicle which may include the above radar integrated system P100 with a radar capable of being turned over.

Figure 5A:
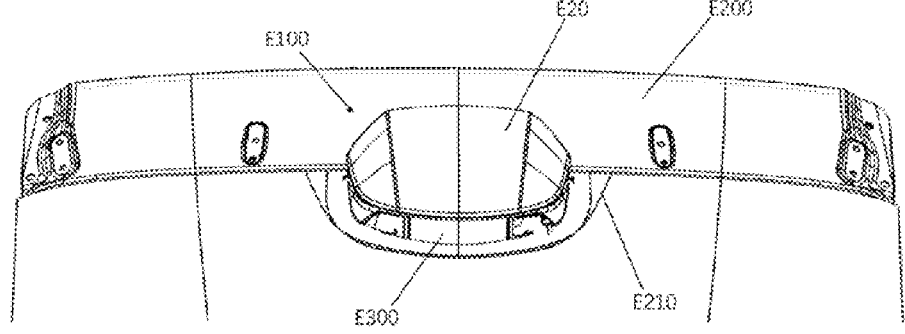
FIG. 5A is a schematic structural diagram of a turnover radar integrated box according to an embodiment of the present invention when mounted on a vehicle.
Figure 5B:
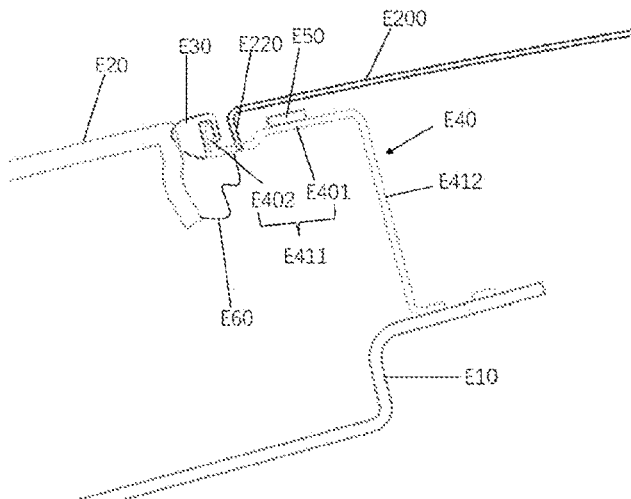
FIG. 5B is a partial sectional view of the turnover radar integrated box according to an embodiment of the present invention when mounted on the vehicle.

In an embodiment, FIG. 5A is a schematic structural diagram of a turnover radar integrated box E100 according to an embodiment of the present invention when mounted on a vehicle. FIG. 5B is a partial sectional view of the turnover radar integrated box E100 according to an embodiment of the present invention when mounted on the vehicle. As still another specific embodiment of the radar integrated system according to the present invention, the present embodiment provides a turnover radar integrated box E100 provided at a preset opening E210 (see FIG. 5A) of a target vehicle body E200, the target vehicle body E200 here can be a part of the vehicle on which a radar E300 is required to be mounted, such as a roof, a fender, or the like, and the radar E300 here can be a laser radar. As shown in FIG. 5B, in an embodiment, the turnover radar integrated box E100 includes a tray E10, a protective shell E20, a mounting fixed base (not shown) and a rotating mechanism (not shown). The tray E10 is connected with the target vehicle body E200 and located below the preset opening E210, and the tray E10 may be located right below the preset opening E210, and mounted to the vehicle body by fasteners for fixation. In an embodiment, when the target vehicle body E200 is the roof of the vehicle, the tray E10 is connected to a roof crossrail assembly of the vehicle by fasteners (for example, bolts). The protective shell E20 is matched with the preset opening E210; that is, a size of a circumference side of the protective shell E20 is matched with a size of the preset opening E210, such that the protective shell E20 can be in a state of being relatively closely matched with the preset opening E210, i.e., a closed state of the turnover radar integrated box E100. A side of the protective shell E20 facing the inside of the vehicle is fixedly connected with the radar E300, and the protective shell E20 is located at a top of the radar E300 and can shield and protect the radar E300. The mounting fixed base is fixed to the tray E10 and pivotally connected with the protective shell E20 or the radar E300, and since the protective shell E20 and the radar E300 are fixed, only one of the protective shell E20 and the radar E300 needs to be pivotally connected with the mounting fixed base. The rotating mechanism is mounted at the mounting fixed base and configured to controllably drive the radar E300 and the protective shell E20 to rotate relative to the mounting fixed base, so as to expose the radar E300 outside the vehicle (i.e., an open state) or hide the radar E300 in the vehicle (i.e., a closed state). The rotating mechanism may be any one of driving mechanisms for realizing pivoting between two components in the prior art, for example, hydraulic jacking on one side, rotation of a rotating shaft between the protective shell E20 and the mounting fixed base by a motor, or the like, which is not limited herein. The rotating mechanism may be connected with a controller of the vehicle, or a controller independently provided in the radar integrated box 100, so as to be controlled to be turned on and off according to user instructions. Certainly, in other embodiments, the radar E300 and the protective shell E20 may be directly lifted out of the vehicle through the preset opening E210 by a lifting mechanism.

The present embodiment provides the turnover radar integrated box E100 including the protective shell E20 for fixing the radar E300, the protective shell E20 and the radar E300 can be both turned over relative to the fixed mounting fixed base, and the protective shell E20 is matched with the preset opening E210 of the vehicle body, such that a state in which the protective shell and the vehicle body are of an integral appearance can be formed in the closed state, so as to improve attractiveness and an aerodynamic performance of the vehicle; dust is not prone to be accumulated, and the radar E300 and the protective shell E20 can be controlled to be turned out to an outer side of the vehicle body in use, thereby facilitating adjustment of an angle of the radar E300.

As shown in FIG. 5B, in an embodiment, the turnover radar integrated box E100 further includes an outer sealing assembly, and the outer sealing assembly includes an outer sealing support E40 and an outer sealing strip E30. The outer sealing support E40 is hermetically connected with the target vehicle body E200 and configured to mount the outer sealing strip E30. The outer sealing strip E30 is located between the protective shell E20 and the target vehicle body E200 and configured to seal a gap between the protective shell E20 and the sealing support. As shown in FIG. 5B, the outer sealing strip E30 here may be located at a position approximately flush with the target vehicle body E200, which is equivalent to an arrangement of the outer sealing strip D30 around the preset opening E210. The arrangement of the outer sealing strip E30 can achieve a sealing effect when the radar integrated box E100 is in the closed state.

Figure 5C:
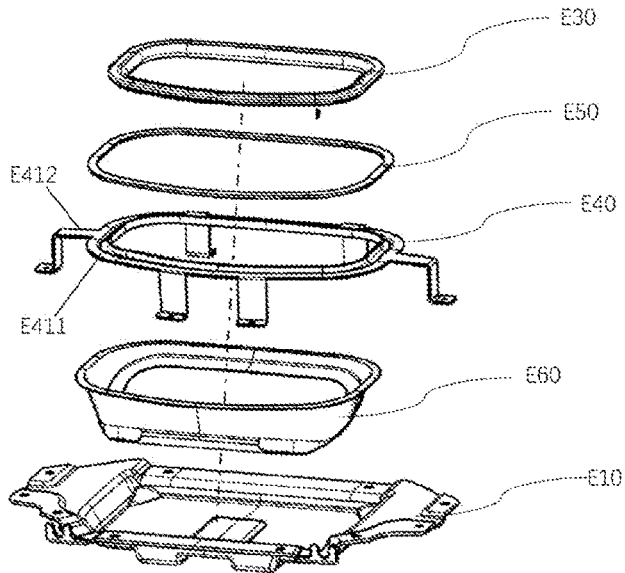
FIG. 5C is a schematic exploded diagram of the turnover radar integrated box according to an embodiment of the present invention.

FIG. 5C is a schematic exploded diagram of the turnover radar integrated box E100 according to an embodiment of the present invention, and the protective shell E20 is not shown in FIG. 5C. In an embodiment, as shown in FIG. 5C, the outer sealing support E40 includes an annular main body E411 and connecting legs E412 connected with the main body E411, the main body E411 is hermetically connected with the target vehicle body E200, and fixedly connected with the outer sealing strip E30, one end of the outer sealing strip E30 abuts against the protective shell E20, and a bottom end of each connecting leg E412 is connected with the tray E10. In an embodiment, as shown in FIG. 5B, the main body E411 includes a flat plate portion E401 provided parallel to the target vehicle body, and the flat plate portion E401 is bonded to the target vehicle body E200; for example, by an annular adhesive tape E50, the outer sealing support E40 is bonded to an inner side of the target vehicle body E200.

As shown in FIG. 5B, the main body E411 further includes a vertical clamping portion E402 configured to clamp the outer sealing strip E30, the vertical clamping portion E402 is connected to a side of the flat plate portion E401 close to the protective shell E20 and is perpendicular to the flat plate portion E401, a bent portion E220 pointing to the flat plate portion E401 is formed at the preset opening E210 of the target vehicle body E200, the flat plate portion E401 abuts against the bent portion E220, and a vertical portion is located between the bent portion E220 and the protective shell E20. Such a staggered structure formed by the bent portion E220 of the target vehicle body E200 and the vertical clamping portion E402 of the outer sealing support E40 can further achieve the sealing effect in cooperation with the above annular adhesive tape E50.

As shown in FIG. 5B, the turnover radar integrated box E100 further includes a flexible waterproof film E60 provided between a bottom of the main body E411 and an outer side of the protective shell E20 and configured to form a sealed space between the main body E411 and the protective shell E20. Since the protective shell E20 can be turned over, the waterproof film E60 connected thereto is configured to be flexible to better follow the protective shell E20. In an embodiment, the protective shell E20 can be turned over, and so the protective shell cannot be kept in a state of tightly abutting against the outer sealing strip E30 in real time, for example, in the open state; by providing the waterproof film E60 between the protective shell E20 and the outer sealing support E40, water can be effectively prevented from flowing into the vehicle, thereby achieving a perfect sealing effect.

Figure 5D:
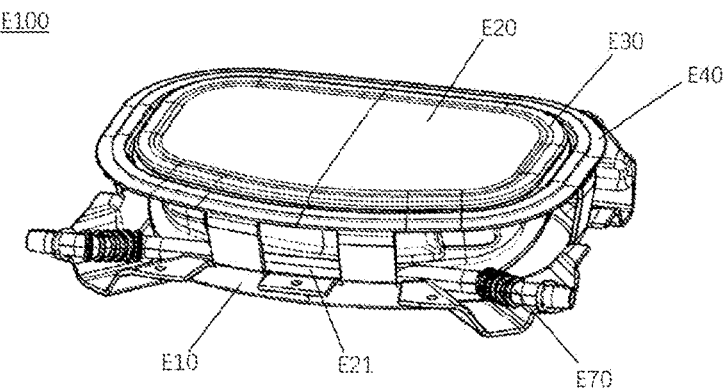
FIG. 5D is a schematic structural diagram of the turnover radar integrated box according to an embodiment of the present invention.

FIG. 5D is a schematic structural diagram of the turnover radar integrated box E100 according to an embodiment of the present invention, and the waterproof film E60 is not shown in FIG. 5D. As shown in FIG. 5D, in an embodiment, the protective shell E20 is further provided with a water flowing pipe E21, and the water flowing pipe E21 is communicated with the sealed space; for example, a communication port is provided on a side of the water flowing pipe E21, and the water flowing pipe E21 is located at a lowest position of the sealed space. The water flowing pipe E21 is communicated with a drain pipe of the vehicle through a hose E70.

The arrangement of the water flowing pipe E21 and the hose E70 can ensure that water in the waterproof film E60 can be discharged through a drainage system of the vehicle, such that water is prevented from being accumulated in the waterproof film E60. The water flowing pipe E21 is fixedly provided on the protective shell E20 and can thus move with the protective shell E20, and the water flowing pipe E21 is communicated with the drain pipe of the vehicle by providing the hose E70, such that a moving condition of the water flowing pipe E21 can be adapted.

The present invention further provides a vehicle including the turnover radar integrated box E100 according to any one or combinations of the above embodiments.

The vehicle is provided with the turnover radar integrated box E100 including the protective shell E20 for fixing the radar, the protective shell E20 and the radar can be both turned over relative to the fixed mounting fixed base, and the protective shell E20 is matched with the preset opening E210 of the vehicle body, such that the state in which the protective shell and the vehicle body are of an integral appearance can be formed in the closed state, so as to improve the attractiveness and the aerodynamic performance of the vehicle; dust is not prone to be accumulated, and the radar and the protective shell E20 can be controlled to be turned out to the outer side of the vehicle body in use, thereby facilitating adjustment of the angle of the radar.

Figure 6A:
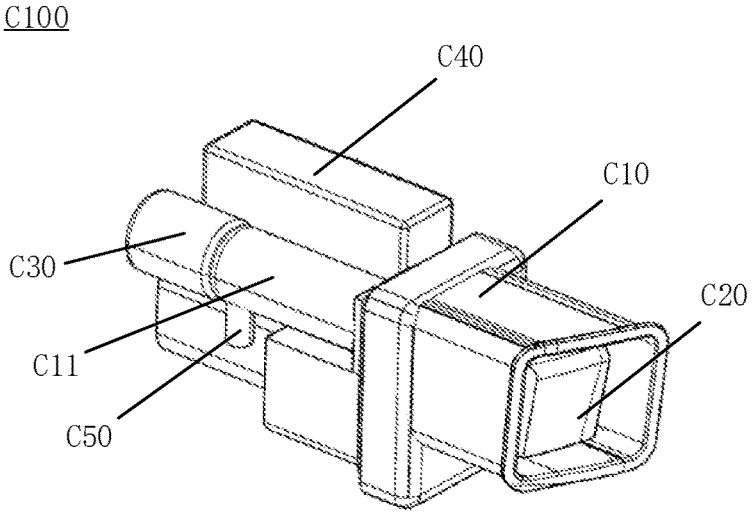
FIG. 6A is a schematic structural diagram of a cleaning device for a radar according to an to embodiment of the present invention.
Figure 6B:
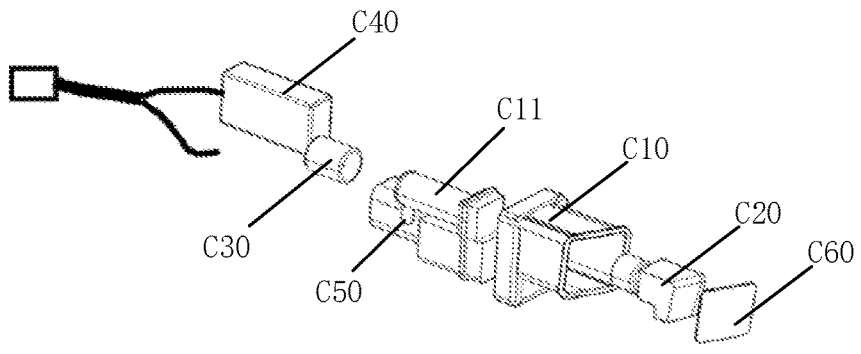
FIG. 6B is a schematic exploded diagram of the cleaning device shown in FIG. 6A.

In an embodiment, FIG. 6A is a schematic structural diagram of a cleaning device C100 for a radar according to an embodiment of the present invention, and FIG. 6B is a schematic exploded diagram of the cleaning device C100 shown in FIG. 6A. As a specific embodiment of the cleaning device for the radar integrated system according to the present invention, as shown in FIGS. 6A and 6B, in an embodiment, the cleaning device C100 for a radar includes a housing C10, a nozzle C20, an electromagnetic valve C30, and a water pump (not shown), a liquid channel C11 is provided in the housing C10, and one end of the liquid channel C11 is connected with a water supply device (not shown). The nozzle C20 is provided at an end of the liquid channel C11 apart from the water supply device, at least part of the nozzle C20 is located in the housing C10, and the nozzle C20 is configured to spray water to a mirror surface of the radar. The electromagnetic valve C30 is provided on the liquid channel C11 and configured to open or close the liquid channel C11 under control, so as to allow the cleaning device C100 to be in a water spraying state or an off state. The water pump is connected with the liquid channel C11 and configured to be started cooperatively when the electromagnetic valve C30 is opened, so as to drive liquid of the liquid channel C11 to flow and allow the liquid to be sprayed out of the nozzle C20.

In the present invention, when the radar is required to be cleaned, only the electromagnetic valve C30 and the water pump are required to be started simultaneously, automatic cleaning of the radar can be realized, and manual cleaning after parking is not required, thus guaranteeing continuity of automatic driving.

In a preferred embodiment, the nozzle C20 is configured to be extendable and retractable so that the nozzle is located in the housing C10 when the cleaning device C100 is in the off state, and at least part of the nozzle C20 extends out of the housing C10 when the cleaning device C100 is in the water spraying state. In the present embodiment, the nozzle C20 is configured to be extendable and retractable, such that the nozzle C20 can extend out of the housing C10 when the radar is required to be cleaned, and the nozzle C20 can be located inside the housing C10 when the radar is not required to be cleaned, and dust or rainwater contamination can be avoided.

In an embodiment, a sliding block is provided on the nozzle C20, and a sliding groove fitted with the sliding block is formed in the housing C10, such that the sliding block slides along the sliding groove when a water pressure in the liquid channel C11 reaches a preset water pressure, thereby causing the nozzle C20 to extend out of the housing C10. The preset water pressure here can be set according to specific requirements. That is, a certain thrust of water flow is required to push the nozzle C20 to extend out of the housing C10; when the thrust of the water flow is less than a certain value, the nozzle C20 retracts into the housing C10 due to a reduction of the thrust. In other embodiments, a motor C50 may be provided to drive the nozzle C20 to extend out of the housing C10 or retract into the housing C10.

Further, a baffle C60 is provided on the housing C10, and the baffle C60 is configured to be controllably turned over and opened when the radar is required to be cleaned, such that the nozzle C20 can extend out of the housing C10. After cleaning of the radar is finished and the nozzle retracts into the housing C10, the baffle C60 is controlled to be turned over and closed, such that dust or rainwater is prevented from entering the housing C10.

Further, a plurality of water spraying holes are formed in a side of the nozzle C20 apart from the liquid channel C11, such that the liquid flowing out of the liquid channel C11 is sprayed out from the plurality of water spraying holes. The present embodiment is equivalent to splitting a water spraying hole with a larger cross sectional area into a plurality of water spraying holes with smaller cross sectional areas, which reduces the cross sectional area, thereby increasing a water spraying pressure and further improving a cleaning performance. In an embodiment, the nozzle C20 has a square cross section. The plurality of water spraying holes may be arranged on the nozzle C20 at intervals.

Further, the cleaning device C100 for a radar further includes a control unit C40 fixedly connected with the housing C10, connected with the electromagnetic valve C30 and configured to control the electromagnetic valve C30 to be opened or closed. Here, the control unit C40 is further connected with the water pump, and controls the water pump to be turned on while controlling the electromagnetic valve C30 to be opened.

Further, the cleaning device C100 for a radar further includes a detection unit connected with the control unit C40 and configured to detect whether an outer surface of the radar is dirty. Here, the detection unit may be a camera, and when capturing dirt on the mirror surface of the radar, the camera sends a signal to the control unit C40, and after receiving the signal, the control unit C40 controls the electromagnetic valve C30 and the water pump to be turned on simultaneously. The control unit C40 is further connected with the baffle C60, and the control unit C40 controls the baffle C60 to be turned over and opened after receiving the signal, and controls the baffle C60 to be turned over and closed when the nozzle C20 retracts into the housing C10. In addition, the control unit C40 is also configured to control the baffle C60 to be turned over when receiving a voice signal sent by a vehicle voice system, and to control the electromagnetic valve C30 and the water pump to be turned on to clean the mirror surface of the radar by the nozzle C20. The voice signal here can be sent by a driver, and intelligence and humanization of the cleaning device C100 are further improved through the design.

According to an object of a second aspect of the present invention, the present invention further provides a radar system for a vehicle provided with a radar and the above cleaning device C100.

Further, two cleaning devices C100 are provided, and the two cleaning devices C100 are arranged on two sides of the radar respectively.

The present invention further provides a vehicle having the radar system according to any one of the above embodiments mounted thereon. The radar system is not repeated herein.

In the present invention, when the mirror surface of the radar is detected to be dirty, the cleaning device C100 can be automatically controlled to clean the radar at any time and any place, manual cleaning of the radar after parking is not required, the radar can be cleaned in an automatic driving process without interrupting automatic driving, and convenience and intelligence are realized.

Figure 7A:
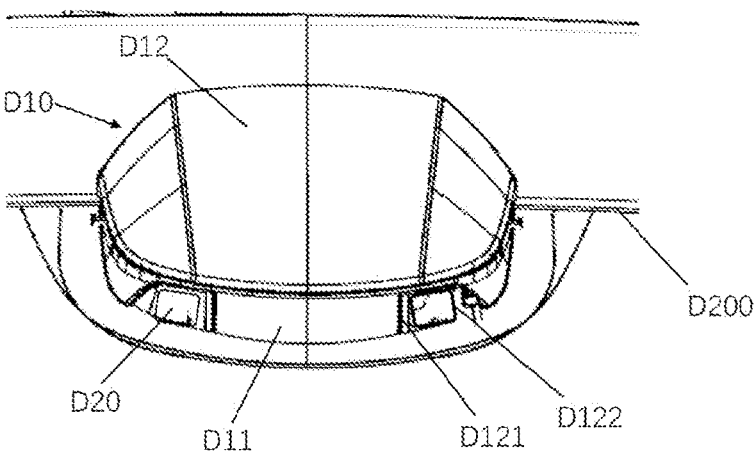
FIG. 7A is a schematic structural diagram of a vehicle-borne radar system according to an embodiment of the present invention when mounted on a vehicle.

In an embodiment, FIG. 7A is a schematic structural diagram of a vehicle-borne radar system according to an embodiment of the present invention when mounted on a vehicle. As a specific embodiment of still another cleaning device for the radar system according to the present invention, as shown in FIG. 7A, the vehicle-borne radar system according to the present embodiment includes a radar assembly D10, a driving mechanism (not shown) and a cleaning unit D20. The radar assembly D10 includes a radar D11 which may be a laser radar. The driving mechanism is connected with the radar assembly D10 and configured to controllably drive the radar assembly D10 to rotate or lift relative to a vehicle body, so as to expose an emission end of the radar D11 outside a vehicle (i.e., a state in FIG. 7A) or hide the radar assembly D10 in the vehicle. The driving mechanism here may be any mechanism capable of realizing lifting or turnover in the prior art, such as an electric lifting platform, a hydraulic turnover platform, or the like, which is not limited herein. The cleaning unit D20 is configured to controllably extend out when the emission end is exposed out of the vehicle and spray cleaning liquid to a mirror surface of the emission end. Here, operations of the driving mechanism and the cleaning unit D20 can be controlled by specially providing an integrated box controller D50 of the vehicle-borne radar system.

The vehicle-borne radar system according to the present embodiment can realize the turnover or lifting of the radar assembly D10 relative to the vehicle body, such that the radar D11 can be controlled to extend out of the vehicle for detection work, or hidden in the vehicle, and dust is not prone to be accumulated. In addition, the vehicle-borne radar system further includes the cleaning unit D20, and the mirror surface of the radar D11 can be cleaned, thus further guaranteeing cleanness of the radar D11, so as to guarantee accuracy of intelligent driving.

As shown in FIG. 7A, the radar assembly D10 further includes a radar box D12, a first opening D121 and a second opening D122 are formed in a side of the radar box D12 where the emission end of the radar D11 is, the first opening D121 is configured to expose the emission end, and the second opening D122 is configured to provide an extending/retracting passage for the cleaning unit D20.

Figure 7B:
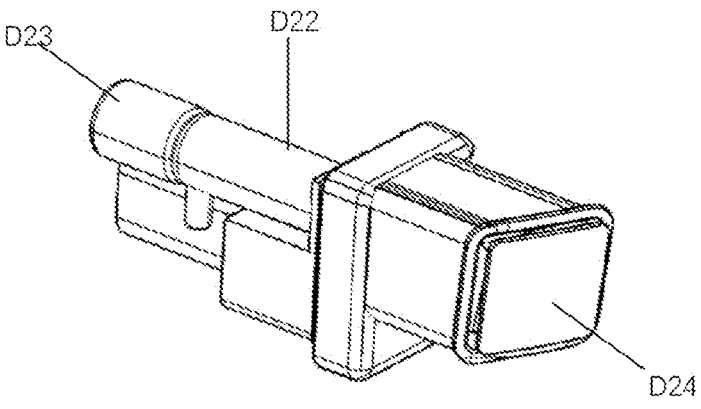
FIG. 7B is a schematic structural diagram of a cleaning unit of the vehicle-borne radar system according to an embodiment of the present invention.
Figure 7C:
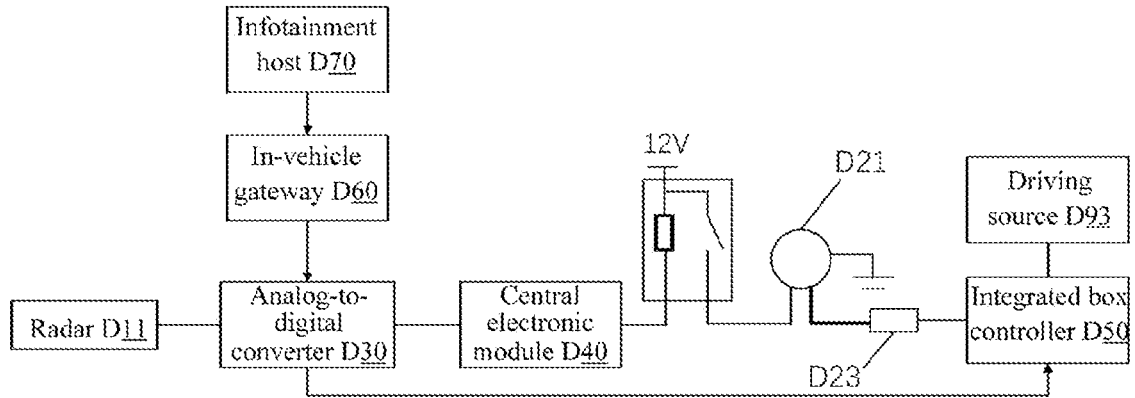
FIG. 7C is a connection block diagram of the vehicle-borne radar system according to an embodiment of the present invention.

FIG. 7B is a schematic structural diagram of the cleaning unit D20 of the vehicle-borne radar system according to an embodiment of the present invention. FIG. 7C is a connection block diagram of the vehicle-borne radar system according to an embodiment of the present invention. As shown in FIG. 7B, in the present embodiment, the cleaning unit D20 includes a washing kettle (not shown), a washing pump D21 (see FIG. 7C), an extendable and retractable cleaning actuator D22 and a cover plate D24. The washing kettle is configured to store cleaning liquid. The washing pump D21 is connected with the washing kettle through a first water pipe and configured to pump out the cleaning liquid in the washing kettle. The cleaning actuator D22 is provided in the radar box D12 and includes a nozzle connected with the washing pump D21 through a second water pipe, the nozzle is configured to spray the cleaning liquid to the mirror surface, and the second water pipe is provided with an electromagnetic valve D23 configured to control opening or closing of the second water pipe. The cover plate D24 is connected with the nozzle, matched with the second opening D122 and configured to close the second opening D122 when the cleaning actuator D22 retracts into the inside of the radar box D12. The cleaning actuator D22 here includes a telescopic mechanism connected with the nozzle, and the telescopic mechanism may be a mechanism which is automatically ejected by a water pressure after the electromagnetic valve D23 is opened, or may be an electric telescopic mechanism as long as the nozzle can be automatically extended and retracted.

The cleaning unit D20 in the present embodiment includes the cover plate D24 matched with the second opening D122; that is, the second opening D122 of the radar box D12 can be closed through the structure of the cleaning unit D20 without additionally providing an opening-closing door, such that a structure is simple and a cost is low.

In an embodiment, a first sealing strip is provided on a periphery of the cover plate D24 and configured to seal the cover plate D24 and the second opening D122. Due to the arrangement of the sealing strip, when the cleaning structure does not work, leakproofness of the radar box D12 can be guaranteed to prevent rainwater and dust from entering the radar box D12.

As shown in FIG. 7C, the vehicle-borne radar system further includes an analog-to-digital converter D30, as well as a central electronic module D40 and an integrated box controller D50 connected with the analog-to-digital converter D30. The analog-to-digital converter D30 is also connected with the radar D11. The radar D11 in the present embodiment has a dirt detection function, the radar D11 is configured to send an analog signal to the analog-to-digital converter D30 when the mirror surface is detected to be dirty, the analog-to-digital converter D30 processes the analog signal into a digital signal and then sends the digital signal to the central electronic module D40 and the integrated box controller D50, the central electronic module D40 is configured to generate a first control signal according to the digital signal and send the first control signal to the washing pump D21, so as to control the washing pump D21 to work, and the integrated box controller D50 is configured to generate a second control signal according to the digital signal and send the second control signal to the electromagnetic valve D23, so as to control the electromagnetic valve D23 to be opened. Here, the analog-to-digital converter D30 transmits the signal to the central electronic module D40 through FlexRay, the central electronic module D40 compiles the signal and informs the washing pump D21 to work, and meanwhile, the analog-to-digital converter D30 translates a Lin signal and transmits the Lin signal to the integrated box controller D50 through a wiring harness, the integrated box controller D50 controls the electromagnetic valve D23 to open a water path, and the water pressure makes the nozzle extend.

In the present embodiment, automatic control of a working process of the cleaning unit D20 is realized through communication among the radar D11, the analog-to-digital converter D30, the central electronic module D40 and the integrated box controller D50. Certainly, this process is generally performed when the radar D11 is in an exposed working state during intelligent driving.

In an embodiment, as shown in FIG. 7C, the integrated box controller D50 is further connected with the driving mechanism, i.e., with a driving source D93 of the driving mechanism and configured to control an action of the driving mechanism, and the analog-to-digital converter D30 is further connected with an infotainment host D70 of a vehicle through an in-vehicle gateway D60, such that when the infotainment host D70 receives a signal for starting an intelligent driving function, the integrated box controller D50 controls the driving mechanism to drive the radar assembly D10 to act, so as to expose the emission end of the radar D11 outside the vehicle. The infotainment host D70 may enable the intelligent driving function by a touch operation of a touch screen or by voice interaction.

In the present embodiment, the infotainment host D70 of the vehicle is in communication connection with the vehicle-borne radar system, thus realizing automatic control of the movement of the radar assembly D10.

Figure 7D:
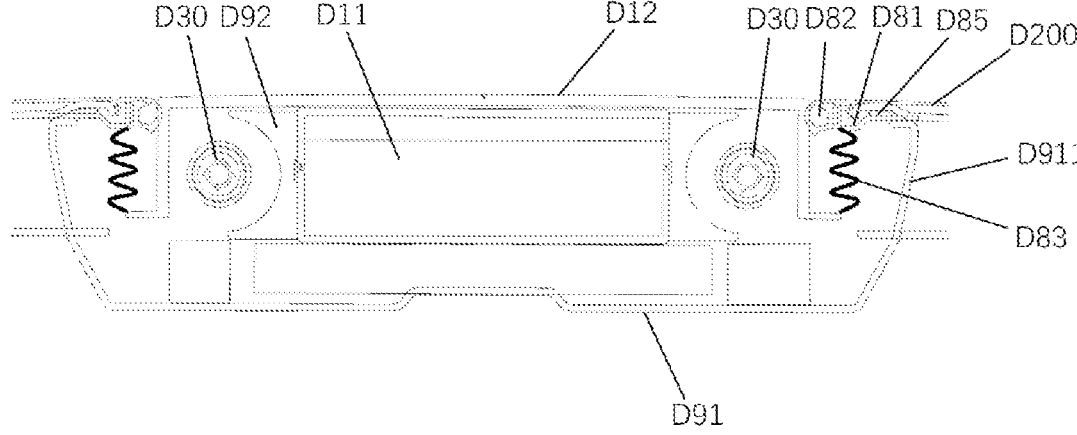
FIG. 7D is a schematic sectional diagram of the vehicle-borne radar system according to an embodiment of the present invention when mounted on the vehicle.

FIG. 7D is a schematic sectional diagram of the vehicle-borne radar system according to an embodiment of the present invention when mounted on the vehicle. As shown in FIG. 7D, in the present embodiment, the vehicle-borne radar system further includes a sealing structure including a mounting support D81 and a second sealing strip D82. The mounting support D81 is fixedly connected with the vehicle body, for example, bonded to the vehicle body D200 by double-sided adhesive tape D85. The second sealing strip D82 is connected with the mounting support D81 and located between the radar box D12 and a third opening of the vehicle body D200, and the radar box D12 has a shape matched with a shape of the third opening and moves out of the vehicle through the third opening. Certainly, the second sealing strip D82 is provided around the radar box D12, thereby achieving a complete sealing effect.

In the present embodiment, by providing the second sealing strip D82, a sealing function can be achieved when the radar assembly D10 does not work, so as to prevent rainwater outside the vehicle from entering the vehicle-borne radar system.

Figure 7E:
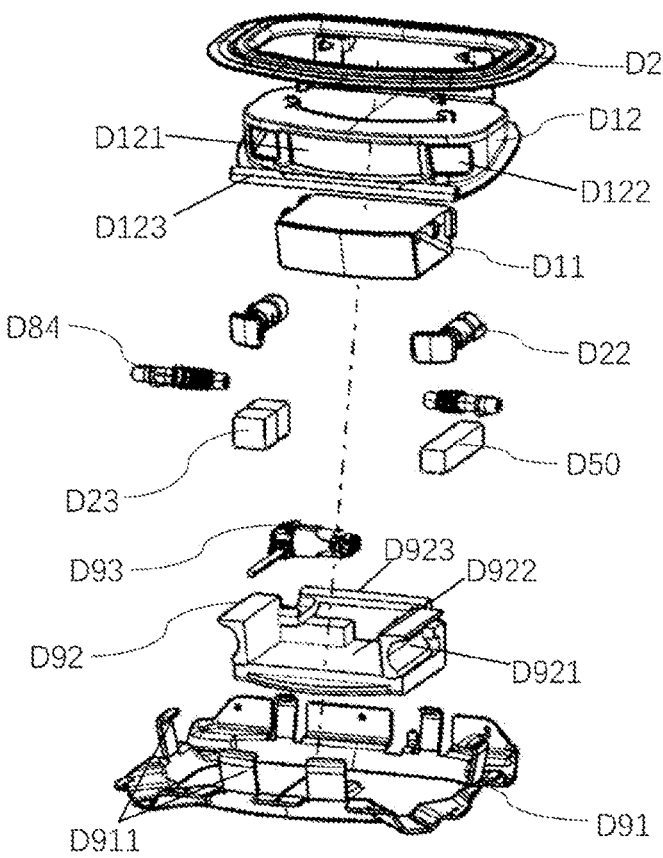
FIG. 7E is a schematic exploded diagram of the vehicle-borne radar system according to an embodiment of the present invention.

FIG. 7E is a schematic exploded diagram of the vehicle-borne radar system according to an embodiment of the present invention, and a sealing film D83 is not shown in FIG. 7E. As shown in FIG. 7D, in an embodiment, the sealing structure further includes a soft sealing film D83 and a water outlet D84 (see FIG. 7E). The sealing film D83 is provided around the radar box D12, and both ends of the sealing film D83 are connected with a side wall of the radar box D12 and a lower side of the mounting support D81 respectively, such that when the radar assembly D10 moves to the working state relative to the vehicle body, the third opening is partially opened, and rainwater can be further prevented from entering the vehicle body by the sealing film D83. The water outlet D84 penetrates through the sealing film D83, and a side of the water outlet apart from the radar box D12 is communicated with a drain pipe of the vehicle. The water outlet D84 is provided to drain liquid falling into the sealing film D83 to keep the sealing film dry and clean. In an embodiment, a duct structure D123 connected with the water outlet D84 is formed on the radar box D12, and the duct structure D123 is provided with a communication port communicated with a space inside the sealing film D83.

As shown in FIG. 7D, the vehicle-borne radar system further includes a fixed bottom plate and a fixed base D92. The fixed bottom plate D91 has a bottom fixedly connected with the vehicle body and an edge provided with a plurality of connecting arms D911 extending upwards (see also FIG. 7E), the connecting arms D911 being connected with a bottom of the mounting support D81. The fixed base D92 is provided at the fixed bottom plate D91 and configured to place the cleaning unit D20 and the driving source D93 of the driving mechanism, such as a motor.

As shown in FIG. 7E, in an embodiment, arc-shaped recesses D921 matched with the cleaning actuator D22 are formed on two sides of the fixed base D92, and configured to place the cleaning actuator D22, a recess D922 for placing the radar D11 is formed in a middle of the fixed base D92, and a rotating shaft D923 pivotally connected with the radar D11 is provided at a rear of the fixed base D92, such that the fixed base D92 in the present embodiment becomes a mounting base with comprehensive functions.

The present invention further provides a vehicle including the vehicle-borne radar system according to any one or combinations of the above embodiments.

The vehicle-borne radar system of the vehicle can realize the turnover or lifting of the radar assembly D10 relative to the vehicle body, such that the radar can be controlled to extend out of the vehicle for detection work, or hidden in the vehicle, and dust is not prone to be accumulated. In addition, the vehicle-borne radar system further includes the cleaning unit D20, and the mirror surface of the radar can be cleaned, thus further guaranteeing cleanness of the radar, so as to guarantee accuracy of intelligent driving.

Figure 8A:
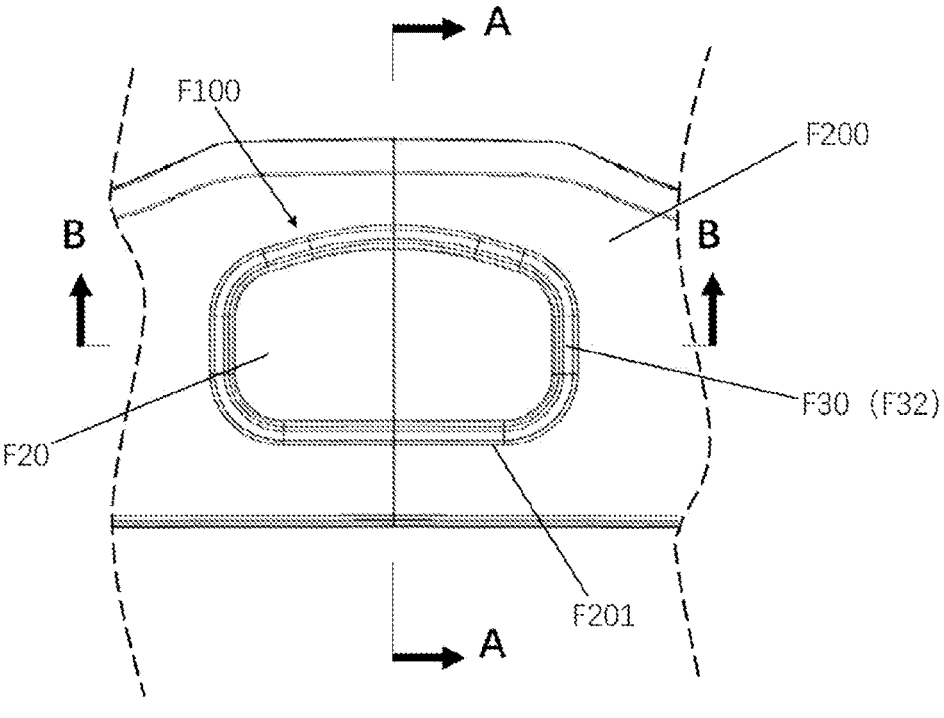
FIG. 8A is a top view of a hidden vehicle-borne radar mounting assembly according to an embodiment of the present invention when mounted on a vehicle.
Figure 8B:
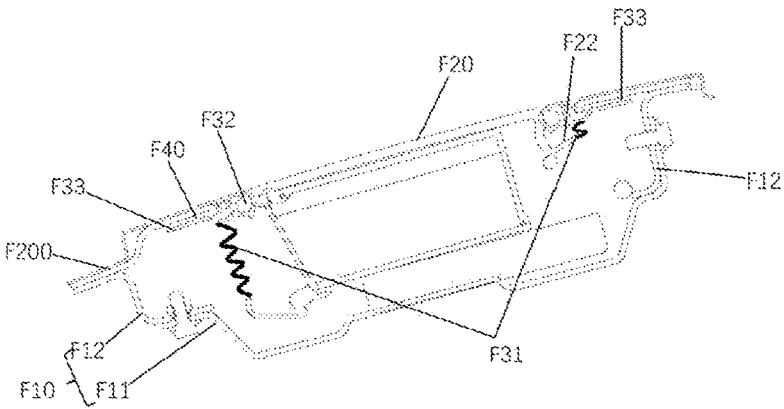
FIG. 8B is a sectional view taken along section line A-A of FIG. 8A.
Figure 8C:
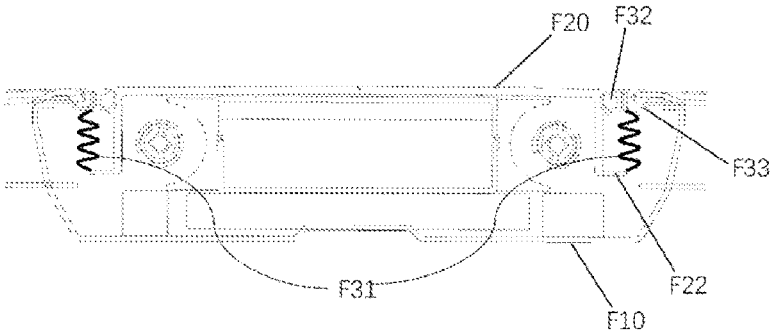
FIG. 8C is a sectional view taken along section line B-B of FIG. 8A.
Figure 8D:
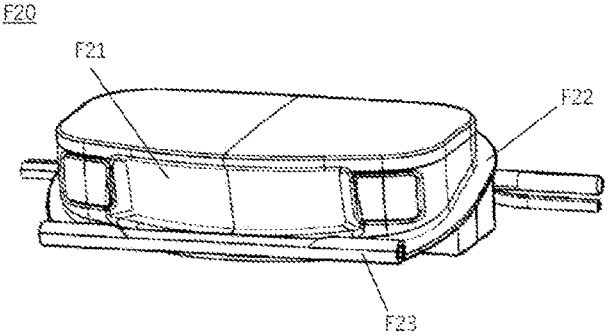
FIG. 8D is a schematic structural diagram of a radar enclosure of the hidden vehicle-borne radar mounting assembly according to an embodiment of the present invention.

In an embodiment, FIG. 8A is a top view of a hidden vehicle-borne radar mounting assembly F100 according to an embodiment of the present invention when mounted on a vehicle. FIG. 8B is a sectional view taken along section line A-A of FIG. 8A. FIG. 8C is a sectional view taken along section line B-B of FIG. 8A. FIG. 8D is a schematic structural diagram of a radar enclosure F20 of the hidden vehicle-borne radar mounting assembly F100 according to an embodiment of the present invention. As a specific embodiment of the radar device in the present invention, as shown in FIG. 8A, the hidden vehicle-borne radar mounting assembly F100 according to the present invention is provided at a mounting opening F201 of a vehicle body F200, the vehicle body F200 here can be a position of a vehicle where a radar is required to be mounted, such as a roof, a front wall, a side wing, or the like, and the radar here can be a laser radar. As shown in FIG. 8B, the vehicle-borne radar mounting assembly F100 includes a fixed assembly F10, a radar enclosure F20 and a sealing assembly F30. The fixed assembly F10 is connected with the vehicle body F200 and configured as a recess. The radar enclosure F20 is provided in the recess and pivotally connected at the fixed assembly F10. Here, rotation of the radar enclosure F20 may be implemented by a driving source, such as a motor, a hydraulic assembly, or the like, and the driving source may be connected with a control unit of the vehicle to realize automatic control of turnover of the radar. The radar enclosure F20 is provided therein with an accommodating space for placing the radar; for example, a recess opening towards the inside of the vehicle is formed in the radar enclosure, and this recess is the aforementioned accommodating space. A window F21 (see FIG. 8D) for revealing the radar is provided at a side wall of the radar enclosure F20, such that a signal of an emission end of the radar can be directly emitted through the window F21. The radar enclosure F20 is configured to form a closed state (see FIG. 8B) where the radar enclosure F20 is hidden in the recess and an open state (not shown) where the window F21 of the radar enclosure F20 is completely exposed out of the recess during rotation relative to the fixed assembly F10. The sealing assembly F30 includes a flexible sealing film F31, the sealing film F31 is provided around the radar enclosure F20 and has one side hermetically connected with a target vehicle body F200 directly or indirectly and the other side hermetically connected with an outer side of the radar enclosure F20, so as to form a sealed water storage space between the target vehicle body and the radar enclosure F20, and the target vehicle body is a part of the vehicle body F200 on a peripheral side of the mounting opening F201. A lowest position of the sealing film F31 when the radar enclosure F20 is in the closed state is communicated with a drain pipe of the vehicle, so as to drain liquid in the water storage space. Since the sealing film F31 has one end fixed to the radar enclosure F20 and the radar enclosure F20 rotates relative to the fixed assembly F10, i.e., rotates relative to the vehicle body F200, the sealing film F31 also rotates, and therefore, the lowest position of the sealing film F31 here is defined when the radar enclosure F20 is in the closed state, and liquid leaking into the water storage space can be prevented from being accumulated as long as the lowest position of the sealing film F31 in the closed state can be guaranteed to be connected with the drain pipe of the vehicle.

The present embodiment provides the hidden radar mounting assembly, the radar enclosure F20 with the radar can be turned out of the vehicle when the radar is required to be used, so as to expose the emission end from the window F21 of the radar enclosure F20, and the radar enclosure F20 is restored to the position inside the vehicle when the radar is not required to be used, thus guaranteeing attractiveness of an appearance of the vehicle.

Further, the radar mounting assembly is further provided with the sealing assembly F30 following the radar enclosure F20, such that the sealing assembly can adapt to the turnover radar enclosure F20, so as to achieve a real-time waterproof sealing effect. In addition, since the sealing film F31 of the sealing assembly F30 is communicated with the drain pipe of the vehicle, and the communicated position is the lowest position of the sealing film F31 when the radar enclosure F20 is in the closed state, accumulated water can be drained in the closed state, and the sealing film F31 is prevented from being soaked in water for a long time.

As shown in FIG. 8A, in an embodiment, the sealing assembly F30 further includes a sealing strip F32 provided around the radar enclosure F20 and between the target vehicle body and the radar enclosure F20. Due to the arrangement of the sealing strip F32, when the radar enclosure F20 is in the closed state, the gap between the radar enclosure F20 and the target vehicle body is sealed, a waterproof effect is achieved when the radar is not used, and rainwater or other liquid is prevented from entering the assembly.

As shown in FIG. 8B, in the present embodiment, the sealing assembly F30 further includes a sealing support F33 having one side connected with the target vehicle body and the other side configured to fix the sealing film F31. Optionally, the sealing support F33 is bonded to a bottom of the target vehicle body by double-sided adhesive tape F40.

The sealing strip F32 can be mounted by providing the sealing support F33, a special mounting portion is not required to be machined on the vehicle body F200 to mount the sealing strip F32, and bonding by the double-sided adhesive tape has a certain waterproof effect on the one hand and simplifies a mounting process on the other hand.

As shown in FIG. 8D, an annular flange F22 extending out from an outer wall of the radar enclosure F20 is provided at the outer wall of the radar enclosure F20, and two ends of the sealing film F31 are connected with the sealing support F33 and the annular flange F22 respectively (see FIG. 8B or 8C).

In an embodiment, as shown in FIG. 8B, a height of a side of the outer wall of the radar enclosure F20 provided with the window F21 is larger than that of the opposite side, and the annular flange F22 is provided at a bottom of the outer wall of the radar enclosure F20. As shown in FIG. 8D, a bottom of the radar enclosure F20 is formed as a slope. With this arrangement, on the one hand, it is considered that one side of the radar enclosure F20 is a pivot connection side, the other side thereof is a turn-out side (i.e., the side provided with the window F21), and since the turn-out side has a large movement displacement, the sealing film F31 with a large displacement amount is required to follow the movement, and in addition, the pivot connection side is provided with the outer wall with a small height to save a space, and other components, such as a driving motor for driving the radar enclosure F20 to rotate, can be provided between a lower portion of the outer wall of the pivot connection side and the fixed assembly F10.

As shown in FIG. 8D, a drainage duct F23 communicated with the water storage space and the drain pipe is formed in the radar enclosure F20, and the sealing film F31 is provided with a channel through which the drainage duct F23 passes. Both ends of the drainage duct F23 may be communicated with two drain pipes through two flexible ducts, so as to adapt to a change in a position of the drainage duct F23 when the radar enclosure F20 rotates.

Figure 8E:
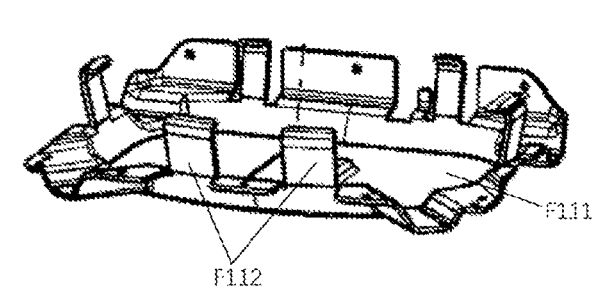
FIG. 8E is a schematic structural diagram of a fixed bottom plate of the hidden vehicle-borne radar mounting assembly according to an embodiment of the present invention.

In another embodiment, as shown in FIG. 8E, the fixed assembly F10 includes a fixed bottom plate F11 and a plurality of connecting supports F12. Both ends of each connecting support F12 are connected with the target vehicle body and a periphery of the fixed bottom plate F11 respectively. The connecting support F12 and the target vehicle body can be connected by welding, bonding or fasteners, and the connecting support F12 and the fixed bottom plate F11 are detachably connected.

FIG. 8E is a schematic structural diagram of the fixed bottom plate F11 of the hidden vehicle-borne radar mounting assembly F100 according to an embodiment of the present invention. As shown in FIG. 8E, in the present embodiment, the fixed bottom plate F11 includes a flat plate portion F111 and a plurality of connecting legs F112 located at a periphery of the flat plate portion F111. Each connecting leg F112 extends towards the target vehicle body and is connected with the connecting support F12. As shown in FIG. 8B, the connecting leg F112 and the connecting support F12 are partially overlapped and connected by a bolt, and after the connecting support F12 is fixed on the target vehicle body, the fixed bottom plate F11 and the connecting support F12 can be connected by a fastener, and assembly is convenient.

The present invention further provides a vehicle including the hidden vehicle-borne radar mounting assembly F100 according to any one or combinations of the above embodiments.

The hidden radar mounting assembly is mounted on the vehicle, the radar enclosure F20 with the radar can be turned out of the vehicle when the radar is required to be used, so as to expose the emission end from the window F21 of the radar enclosure F20, and the radar enclosure F20 is restored to the position inside the vehicle when the radar is not required to be used, thus guaranteeing the attractiveness of the appearance of the vehicle.

Further, the radar mounting assembly is further provided with the sealing assembly F30 following the radar enclosure F20, such that the sealing assembly can adapt to the turnover radar enclosure F20, so as to achieve a real-time waterproof sealing effect. In addition, since the sealing film F31 of the sealing assembly F30 is communicated with the drain pipe of the vehicle, and the communicated position is the lowest position of the sealing film F31 when the radar enclosure F20 is in the closed state, accumulated water can be drained in the closed state, and the sealing film F31 is prevented from being soaked in water for a long time.

It may be understood that in some of the embodiments described below, there may be certain structures or features which satisfy the following conditions.

First, the names and/or numbers of a structure may vary in different embodiments, but may actually represent the same structural feature, which should be understood in conjunction with the corresponding drawings and the description of the corresponding embodiment.

Second, structures or features having the same name and/or number in different embodiments may or may not be identical in meaning, which should be understood in conjunction with the corresponding drawings and the description of the corresponding embodiment.

It is to be understood that the various embodiments described above may be combined with one another.

For example, in the above embodiments, implementations of various radar boxes, various cleaning devices, cleaning structures, cleaning mechanisms, or the like, having the cleaning function, various lifting structures, lifting devices, lifting mechanisms, or the like, for lifting the radar, and various sealing structures, sealing devices, sealing mechanisms, or the like, have been described. It is to be understood that the present invention is not limited thereto.

Any one or more of the above radar boxes, any one or more of the cleaning devices, cleaning structures, cleaning mechanisms, or the like, any one or more of the lifting structures, lifting devices, lifting mechanisms, or the like, and any one or more of the sealing structures, sealing devices, sealing mechanisms, or the like, may be combined with one another. Even if there exists that an embodiment of a certain feature is only combined with a certain feature in the above description of the embodiment, the certain feature can still be combined with corresponding features in other embodiments according to the comprehensive understanding of the specification and the drawings of the specification, and the combined technical solutions are still within the protection scope of the present invention.

So far, those skilled in the art should be aware that, although exemplary embodiments of the present invention have been shown and described herein in detail, a lot of other variations or modifications conforming to the principle of the present invention can still be directly determined or derived from the contents disclosed in the present invention without departing from the spirit and scope of the present invention. Therefore, the scope of the present invention should be understood and deemed as covering all of these other variations or modifications.

What is claimed is:

1. A radar integrated system provided at a fender of a vehicle, the fender being provided with a first opening, the radar integrated system comprising:

a cover plate (Q10, P60, N20, M10);

a cover plate driving mechanism (Q30, P50, N30, M20) connected with the cover plate and configured to controllably move to drive the cover plate to open or close the first opening;

a radar device (Q60, P10, N41, M30) located near the first opening;

a radar driving mechanism (Q50, P20, N42, M40) connected with the radar device and configured to controllably move to drive the radar device to extend out of or retract into the fender from the first opening; and a control device connected with the cover plate driving mechanism, the radar driving mechanism and the radar device;

wherein the cover plate driving mechanism is configured to drive the cover plate to open the first opening, and drive the cover plate to close the first opening; and the radar driving mechanism is configured to drive the radar device to extend out of the fender from the first opening, and drive the radar device to retract into the fender from the first opening;

wherein the radar integrated system further comprises a cleaning device (Q40, P70, M80, C100) configured to be controllably started to clean the radar device;

wherein the cleaning device comprises a nozzle (M83, C20, Q43) which is extendable and retractable, and a housing (C10), a duct being provided in the housing, one end of the duct being connected with a water supply device, and the other end of the duct being connected with the nozzle;

wherein the cleaning device is located inside the housing when it is in an off state, and at least part of the nozzle extends out of the housing when the cleaning device is in a water spraying state;

wherein a sliding block is provided on the nozzle, and a first sliding groove fitted with the sliding block is formed in the housing, such that the sliding block slides along the first sliding groove when a water pressure in the duct reaches a preset water pressure, thereby causing the nozzle to extend out of the housing.

2. The radar integrated system according to claim 1, wherein a preset angle is formed between a vertical line of a plane where a motion track of the radar device is located and a vertical line of a plane where a motion track of the cover plate is located, and the preset angle is 90±15 degrees.

3. The radar integrated system according to claim 1, wherein a water pump is provided on the duct, an electromagnetic valve is provided at the nozzle, and the water pump and the electromagnetic valve are controllably started to spray cleaning liquid in the water supply device to the radar device.

4. The radar integrated system according to claim 3, wherein the control device is further connected with both the water pump and the electromagnetic valve, and the control device is configured to control the electromagnetic valve and the water pump to be started after receiving an instruction that the radar device is required to be cleaned, such that the cleaning liquid is sprayed from the nozzle, and to control the water pump and the electromagnetic valve to be stopped after a preset time.

5. The radar integrated system according to claim 3, wherein a flow sensor is further provided at the nozzle, and the flow sensor is connected with the control device and configured to detect a flow rate of the liquid flowing through the nozzle;

the radar integrated system further comprises an alarm device connected with the control device;

the control device is configured to control the alarm device to give an alarm when the flow sensor monitors that the flow rate of the liquid flowing through the nozzle is less than a preset flow rate.

6. The radar integrated system according to claim 1, further comprising a detection unit connected with the control device and configured to detect whether an outer surface of the radar device is dirty.

7. The radar integrated system according to claim 1, further comprising a fixed frame, the cover plate driving mechanism and the radar driving mechanism being provided at the fixed frame.

8. The radar integrated system according to claim 7, wherein a second sliding groove is formed in the fixed frame, and the cover plate driving mechanism comprises a driving motor and a moving mechanism;

the moving mechanism is driven by the driving motor to drive the cover plate to move along the second sliding groove and meanwhile drive the cover plate to rotate to open and close the first opening.

9. The radar integrated system according to claim 8, wherein the moving mechanism comprises:

a crank having one end fixedly connected with an output shaft of the driving motor to rotate with the output shaft; and a first connecting rod having one end rotatably connected with an end of the crank apart from the output shaft and the other end connected with the cover plate, a rotating axis of the first connecting rod being parallel to a rotating axis of the crank; a side edge of the first connecting rod being provided with a cam, the cam being clamped at the second sliding groove, and when the crank rotates with the output shaft, the cam moving along the second sliding groove, such that the cover plate moves along a track parallel to the second sliding groove.

10. The radar integrated system according to claim 8, wherein the moving mechanism is a double-connecting-rod mechanism; the double-connecting-rod mechanism has one end rotatably connected with the radar device and the other end rotatably connected with the fender, and when the driving motor controllably drives the double-connecting-rod mechanism to move, the double-connecting-rod mechanism drives the radar device to be turned over relative to the fender to extend out of or retract into the fender from the first opening.

11. The radar integrated system according to claim 10, wherein the double-connecting-rod mechanism comprises:

a first rotating shaft rotatably connected with the fender, the first rotating shaft being connected with the driving motor to rotate under driving of the driving motor;

a first swing arm having one end fixedly connected with the first rotating shaft to rotate around an axis of the first rotating shaft when the first rotating shaft rotates, and the other end rotatably connected with the radar device;

a second rotating shaft rotatably connected with the fender and provided in parallel with the first rotating shaft; and a second swing arm having one end rotatably connected with the radar device and the other end fixedly connected with the second rotating shaft;

when the first rotating shaft is driven by the driving motor to rotate, the radar device is driven to be turned over under a combined action of the first swing arm, the second swing arm and the second rotating shaft.

12. The radar integrated system according to claim 1, further comprising a sealing assembly and a radar enclosure (E20, D12, F20), the sealing assembly comprising a sealing strip (E30, F32) provided around the radar enclosure.

13. The radar integrated system according to claim 12, wherein the sealing assembly further comprises a sealing support (E40, F33) hermetically connected with the fender;

wherein the sealing support is used for mounting the sealing strip, and the sealing strip is located between the radar enclosure and the fender and used for sealing a gap between the radar enclosure and the sealing support;

the sealing support and the fender are bonded by double-sided adhesive tape.

14. The radar integrated system according to claim 13, wherein the sealing support comprises an annular main body and connecting legs connected with the main body, the main body is hermetically connected with the fender and fixedly connected with the sealing strip, and one end of the sealing strip abuts against the radar enclosure.

15. The radar integrated system according to claim 12, wherein the sealing assembly further comprises a flexible sealing film (F31, E60), the sealing film is provided around the radar enclosure and has one side hermetically connected with the fender directly or indirectly and the other side hermetically connected with an outer side of the radar enclosure, so as to form a sealed water storage space between the fender and the radar enclosure.

16. The radar integrated system according to claim 15, wherein a lowest position of the sealing film when the radar enclosure is in a closed state is communicated with a drain pipe of the vehicle, so as to drain liquid in the water storage space.

17. A vehicle comprising the radar integrated system according to claim 1.

18. A radar integrated system provided at a fender of a vehicle, the fender being provided with a first opening, the radar integrated system comprising:

a cover plate (Q10, P60, N20, M10);

a cover plate driving mechanism (Q30, P50, N30, M20) connected with the cover plate and configured to controllably move to drive the cover plate to open or close the first opening;

a radar device (Q60, P10, N41, M30) located near the first opening;

a radar driving mechanism (Q50, P20, N42, M40) connected with the radar device and configured to controllably move to drive the radar device to extend out of or retract into the fender from the first opening; and a control device connected with the cover plate driving mechanism, the radar driving mechanism and the radar device;

wherein the cover plate driving mechanism is configured to drive the cover plate to open the first opening, and drive the cover plate to close the first opening; and the radar driving mechanism is configured to drive the radar device to extend out of the fender from the first opening, and drive the radar device to retract into the fender from the first opening;

wherein the radar integrated system further comprises a sealing assembly and a radar enclosure (E20, D12, F20), the sealing assembly comprising a sealing strip (E30, F32) provided around the radar enclosure;

wherein the sealing assembly further comprises a sealing support (E40, F33) hermetically connected with the fender;

wherein the sealing support is used for mounting the sealing strip, and the sealing strip is located between the radar enclosure and the fender and used for sealing a gap between the radar enclosure and the sealing support.

* * * * *